United States Patent
Suzuki et al.

(10) Patent No.: US 8,246,737 B2
(45) Date of Patent: *Aug. 21, 2012

(54) CELLULOSE ESTER OPTICAL FILM, POLARIZING PLATE AND LIQUID CRYSTAL DISPLAY USING THE SAME, METHOD OF MANUFACTURING CELLULOSE ESTER OPTICAL FILM, AND COPOLYMER

(75) Inventors: Takayuki Suzuki, Tokyo (JP); Takatugu Suzuki, Tokyo (JP); Issei Nakahara, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 88 days.

This patent is subject to a terminal disclaimer.

(21) Appl. No.: 12/528,498

(22) PCT Filed: Mar. 24, 2008

(86) PCT No.: PCT/JP2008/055396
§ 371 (c)(1),
(2), (4) Date: Aug. 25, 2009

(87) PCT Pub. No.: WO2008/120596
PCT Pub. Date: Oct. 9, 2008

(65) Prior Publication Data
US 2010/0069535 A1  Mar. 18, 2010

(30) Foreign Application Priority Data

Apr. 3, 2007 (JP) ................................. 2007-097135
Aug. 21, 2007 (JP) ................................. 2007-214620

(51) Int. Cl.
| | |
|---|---|
| *C08L 1/00* | (2006.01) |
| *C09D 4/00* | (2006.01) |
| *C09D 101/00* | (2006.01) |
| *C09D 201/00* | (2006.01) |
| *C09J 4/00* | (2006.01) |
| *C09J 201/00* | (2006.01) |
| *C09J 101/00* | (2006.01) |
| *B28B 11/08* | (2006.01) |
| *B29C 49/08* | (2006.01) |
| *B29C 55/00* | (2006.01) |
| *C08G 73/02* | (2006.01) |

(52) U.S. Cl. ............ 106/170.1; 106/168.01; 106/170.42; 264/291; 525/185

(58) Field of Classification Search .................. 264/291; 524/37, 38, 39, 41; 525/185; 106/168.01, 106/170.1, 170.42

See application file for complete search history.

(56) References Cited

U.S. PATENT DOCUMENTS 4,533,397 A * 8/1985 Wingler et al. ............... 514/162
(Continued)

FOREIGN PATENT DOCUMENTS

JP        2000212224 A  *  8/2000
(Continued)

OTHER PUBLICATIONS

Machine Translation of JP 2000212224 A.*

*Primary Examiner* — Liam Heincer

(74) *Attorney, Agent, or Firm* — Lucas & Mercanti, LLP

(57) ABSTRACT

Disclosed is a cellulose ester optical film containing cellulose ester, a polymer (a) below and a compound (b) below:
(a) a polymer obtained by copolymerization of an ethylenically unsaturated monomer having in the molecule a partial structure represented by formula (1) below with at least one ethylenically unsaturated monomer, and (b) at least one compound selected from the group consisting of a compound represented by formula (2) below and a compound represented by formula (3) below, $$\begin{array}{c} R_1 \\ \diagdown \\ N-\overset{\displaystyle O}{\overset{\|}{C}}-R_3 \\ \diagup \\ R_2 \end{array} \quad (1)$$

$$Q_1-Q_2-OH \quad (2)$$

$$Q_{11}-\overset{\displaystyle O}{\overset{\|}{C}}-Q_{12}-OH. \quad (3)$$

10 Claims, 5 Drawing Sheets

U.S. PATENT DOCUMENTS

| | | | | |
|---|---|---|---|---|
| 5,326,507 | A * | 7/1994 | Starzewski | 264/1.35 |
| 5,611,930 | A * | 3/1997 | Nguyen et al. | 210/640 |
| 7,718,761 | B2 * | 5/2010 | Yoshida | 528/480 |
| 2004/0077752 | A1 * | 4/2004 | Matsufuji et al. | 524/37 |
| 2004/0080693 | A1 * | 4/2004 | Kuzuhara et al. | 349/117 |
| 2006/0045992 | A1 * | 3/2006 | Michihata et al. | 428/1.31 |
| 2007/0128380 | A1 * | 6/2007 | Miura et al. | 428/1.31 |
| 2007/0227652 | A1 * | 10/2007 | Kawabe et al. | 156/249 |
| 2007/0254115 | A1 * | 11/2007 | Murakami et al. | 428/1.31 |
| 2008/0003443 | A1 * | 1/2008 | Oya | 428/532 |
| 2008/0032067 | A1 * | 2/2008 | Sakurazawa et al. | 428/1.5 |
| 2008/0057227 | A1 * | 3/2008 | Suzuki et al. | 428/1.1 |
| 2008/0118668 | A1 * | 5/2008 | Sasata | 428/1.1 |
| 2008/0173215 | A1 * | 7/2008 | Sakurazawa et al. | 106/168.01 |
| 2008/0199637 | A1 * | 8/2008 | Ushiyama et al. | 428/1.31 |
| 2009/0022970 | A1 * | 1/2009 | Miyachi | 428/220 |
| 2009/0081388 | A1 * | 3/2009 | Takeda et al. | 428/1.1 |
| 2009/0122237 | A1 * | 5/2009 | Fukagawa et al. | 349/96 |
| 2009/0155495 | A1 * | 6/2009 | Suzuki et al. | 428/1.31 |
| 2009/0226641 | A1 * | 9/2009 | Nakamura et al. | 428/1.33 |
| 2009/0233008 | A1 * | 9/2009 | Higuchi et al. | 428/1.31 |
| 2009/0264638 | A1 * | 10/2009 | Otoshi | 536/56 |
| 2009/0290100 | A1 * | 11/2009 | Haruta et al. | 349/75 |
| 2009/0306361 | A1 * | 12/2009 | Kawabe et al. | 536/63 |
| 2010/0003426 | A1 * | 1/2010 | Suzuki | 428/1.31 |
| 2010/0040806 | A1 * | 2/2010 | Suzuki et al. | 428/1.31 |
| 2010/0055354 | A1 * | 3/2010 | Sasada et al. | 428/1.1 |
| 2010/0069535 | A1 * | 3/2010 | Suzuki et al. | 524/37 |
| 2010/0103352 | A1 * | 4/2010 | Suzuki et al. | 349/96 |
| 2010/0104775 | A1 * | 4/2010 | Suzuki et al. | 428/1.31 |
| 2010/0137578 | A1 * | 6/2010 | Kataoka et al. | 536/63 |
| 2010/0143613 | A1 * | 6/2010 | Nimura et al. | 428/1.31 |
| 2010/0157206 | A1 * | 6/2010 | Oka et al. | 349/96 |
| 2010/0164141 | A1 * | 7/2010 | Miura et al. | 264/299 |
| 2010/0182548 | A1 * | 7/2010 | Suzuki et al. | 349/96 |
| 2010/0188622 | A1 * | 7/2010 | Suzuki et al. | 349/96 |
| 2010/0222567 | A1 * | 9/2010 | Otoshi | 536/69 |
| 2010/0236713 | A1 * | 9/2010 | Kawabe et al. | 156/324 |
| 2010/0239786 | A1 * | 9/2010 | Takeda et al. | 428/1.1 |

FOREIGN PATENT DOCUMENTS

WO  WO 2006101242 A1 *  9/2006

* cited by examiner

CELLULOSE ESTER OPTICAL FILM, POLARIZING PLATE AND LIQUID CRYSTAL DISPLAY USING THE SAME, METHOD OF MANUFACTURING CELLULOSE ESTER OPTICAL FILM, AND COPOLYMER

CROSS REFERENCE TO RELATED APPLICATION

This is a U.S. National Phase Application under 35 U.S.C. 371 of International Application PCT/JP2008/055396, filed Mar. 24, 2009, which claims the priority of Japanese Application Nos. 2007-097135, filed Apr. 3, 2007 and JP-2007-214620 filed Aug. 21, 2007, the entire content of all three Applications are hereby incorporated by reference.

TECHNICAL FIELD

The present invention relates to cellulose ester optical film, a polarizing plate and a liquid crystal display using the cellulose ester optical film, a method of manufacturing the cellulose ester optical film, a manufacturing method of a cellulose ester optical film, and a copolymer.

TECHNICAL BACKGROUND

Liquid crystal displays (LCD's) are widely used as display devices in products such as word processors and personal computers, television sets, monitors, and mobile information terminals because they can be directly connected to an IC circuit, operated at low voltage and low power consumption, and formed into thin devices. The basic structure of the LCD is comprised, for example, of a polarizing plate provided on both sides of a liquid crystal cell.

Incidentally, the polarizing plate only allows light of a fixed direction in the polarizing plane to pass. The LCD thus has the important role of making visible the changes in the orientation of the liquid crystal caused by an electric field. In other words, the performance of the polarizing plate greatly affects the performance of the LCD. A polarizing plate has a structure in which a transparent resin layer is provided on both sides of a polarizing film composed of a stretched polyvinyl alcohol film on which iodine or a dye is adsorbed. As the transparent resin layer, a film of cellulose ester such as tri-acetyl cellulose is suitable for a protective film on account of small birefringence, and widely used.

In recent years, a crystal liquid display with large size and high image quality has been developed as a monitor in place of CRT. In accordance with the development, requirement for a protective film for a polarizing plate has been severe, and it is required that a polarizing plate protective film have high quality such as excellent transparency, flatness, flexibility, dimensional stability and mechanical strength and no defects due to foreign matter in view of its usage.

As a cellulose ester film manufacturing method, a solution casting method is generally carried out. The method comprises the steps of casting a so-called dope, in which cellulose ester is dissolved in a solvent such as a halogen-containing solvent, on a rotating endless belt as a support to form a film; evaporating a part of the solvent in the film on the support to obtain a dried and solidified film; peeling the resulting film from the support, and further drying the peeled film, whereby a cellulose ester film is obtained.

It is required in this method that a solvent remaining within the film be removed. Therefore, investment cost for fecilities such as a drying line, drying energy, a solvent recovery apparatus and a solvent reproduction apparatus or manufacturing cost is high. It is important to reduce the cost.

As a means to solve the above problem, a cellulose ester optical film manufactured according to a melt casting method is disclosed in Patent Document 1. This provides an optical film which excels in optical stability, physical stability or dimensional stability, however, the optical film is insufficient in compatibility with various additives, which has problems in storage stability (durability) for long period.

In Patent Document 2 is disclosed a polymer or copolymer of an ethylenically unsaturated monomer having an amido bond, which improves compatibility with cellulose ester and exhibits excellent flexibility, non-volatility and nonmobility. However, it has been found that such a polymer is insufficient in non-volatility and nonmobility to a several tens of µ thick optical film and has a serious problem in slitting property described later. In Patent Document 3 is disclosed a cellulose ester film containing a polymer of an ethylenically unsaturated monomer having an ester bond and a retardation adjusting agent. Similarly, the cellulose ester film is insufficient in non-volatility and nonmobility and has a serious problem in slitting property.

Generally, when a cellulose ester optical film is manufactured, the knurling portions on both ends of the film are trimmed off, the portions at which the film is gripped during stretching in the transverse direction are removed, and the wide web film is slitted to a predetermined width. However, it has been found that methods disclosed in Patent Documents 1 through 3 produce the fault that the section of the film after slitting is roughend and cracked, resulting in lowering of productivity. Further, minute waste film produced during film slitting is floated in air in the film manufacturing process and adheres to the film surface, resulting in faults. Improvement is required.

When a polarizing film protective film is adhered to a polarizing film to obtain a polarizing plate, a cellulose ester film is immersed in an alkaline solution with high concentration at high temperature, i.e., subjected to saponification treatment for surface hydrophilization so as to easily coat an adhesive on the surface, and then the film surface is coated with the adhesive and the resulting film is adhered to a polarizing film through the adhesive. However, it has found that the methods disclosed in Patent Documents 1 through 3 have problems in durability of film after saponification, resulting in abstraction to continuous production of polarizing plates.

Generally, a cellulose ester optical film provided with a functional layer such as a hard coat layer, an antireflection layer or an antistatic layer is provided on the outermost surface of an LCD. However, it has been found that the methods disclosed in Patent Documents 1 through 3 lower layer strength of the cellulose ester optical film provided with the functional layer as above.

Patent Document 1: Japanese Patent O.P.I. Publication No. 2000-352620
Patent Document 2: Japanese Patent O.P.I. Publication No. 2000-212224
Patent Document 3: Japanese Patent O.P.I. Publication No. 2007-119737

DISCLOSURE OF THE INVENTION

An object of the invention is to provide a cellulose ester optical film excellent in a slitting property, durability after saponification and layer strength, and a polarizing plate and crystal liquid display using the cellulose ester optical film. Another object of the invention is to provide a method of manufacturing a cellulose ester optical film which minimizes a manufacturing load, a facility load and an environmental load, each resulting from evaporation or recovery of solvents on film manufacture.

One of the embodiments of the invention to attain the above object is a cellulose ester optical film containing cellulose ester, a polymer (a) below and a compound (b) below.

(a) a polymer obtained by copolymerization of an ethylenically unsaturated monomer having in the molecule a partial structure represented by formula (1) below with at least one ethylenically unsaturated monomer, (b) at least one compound selected from the group consisting of a compound represented by formula (2) below and a compound represented by formula (3) below.

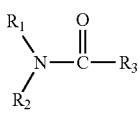

Formula (1)

wherein $R_1$, $R_2$ and $R_3$ independently represent a substituted or unsubstituted aliphatic group, a substituted or unsubstituted aromatic group or a substituted or unsubstituted heterocyclic group, provided that two of $R_1$, $R_2$ and $R_3$ combine with each other to form a 5- to 7-member ring together with the nitrogen atom or with both of the nitrogen atom and the carbon atom.

$Q_1$-$Q_2$-OH      Formula (2)

wherein $Q_1$ represents a substituted or unsubstituted nitrogen-containing aromatic heterocyclic group, and $Q_2$ represents a substituted or unsubstituted aromatic group.

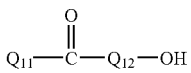

Formula (3)

wherein $Q_{11}$ and $Q_{12}$ independently represent a substituted or unsubstituted aromatic group.

BRIEF EXPLANATION OF THE DRAWINGS

FIG. 3(*b*) is a sectional view showing one embodiment of a main portion of a casting die.

PREFERRED EMBODIMENT OF THE INVENTION

Figure 1:
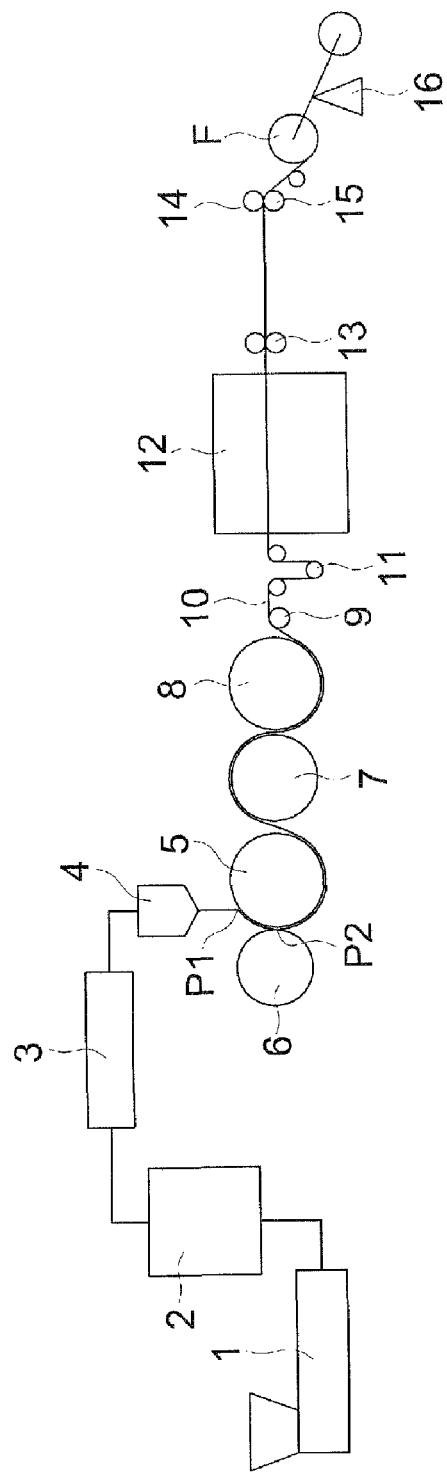
FIG. 1 is a schematic flow sheet showing one embodiment of the apparatus for conducting the cellulose ester optical film manufacturing method of the present invention.

The above object of the invention can be attained by the following constitution.

1. A cellulose ester optical film containing cellulose ester, a polymer (a) below and a compound (b) below (a) a polymer obtained by copolymerization of an ethylenically unsaturated monomer having in the molecule a partial structure represented by formula (1) below with at least one ethylenically unsaturated monomer,

Formula (1)

wherein $R_1$, $R_2$ and $R_3$ independently represent a substituted or unsubstituted aliphatic group, a substituted or unsubstituted aromatic group or a substituted or unsubstituted heterocyclic group, provided that two of $R_1$, $R_2$ and $R_3$ combine with each other to form a 5- to 7-member ring together with the nitrogen atom or with both of the nitrogen atom and the carbon atom.

(b) at least one compound selected from the group consisting of a compound represented by formula (2) below and a compound represented by formula (3) below, $Q_1$-$Q_2$-OH      Formula (2)

wherein $Q_1$ represents a substituted or unsubstituted nitrogen-containing aromatic heterocyclic group, and $Q_2$ represents a substituted or unsubstituted aromatic group,

Formula (3)

wherein $Q_{11}$ and $Q_{12}$ independently represent a substituted or unsubstituted aromatic group.

2. The cellulose ester optical film of item 1 above, wherein the weight average molecular weight of the polymer (a) is from 1000 to 70000.

3. The cellulose ester optical film of item 1 or 2 above, wherein the ethylenically unsaturated monomer having in the molecule a partial structure represented by formula (1) is N-vinyl pyrrolidone, N-acryloyl morpholine or a mixture thereof.

4. The cellulose ester optical film of any one of items 1 through 3 above, wherein the cellulose ester optical film contains at least one kind of plasticizers.

5. The cellulose ester optical film of any one of items 1 through 4 above, wherein the cellulose ester satisfies the following relationship:

$2.4 \leq A+B \leq 3.0$      Relationship (1)

$0 \leq A \leq 2.1$      Relationship (2)

$0 < B \leq 3.0$      Relationship (3)

wherein A represents a degree of substitution of an acetyl group, and B represents the sum of a degree of substitution of an acyl group having a carbon atom number of from 3 to 5.

6. The cellulose ester optical film of any one of items 1 through 5 above, wherein the cellulose ester optical film contains at least one kind of fine particles.

7. A polarizing plate employing the cellulose ester optical film of any one of items 1 through 6 above.

8. A liquid crystal display employing the cellulose ester optical film of any one of items 1 through 6 above or the polarizing plate of item 7 above.

9. A method of manufacturing a cellulose ester optical film, the method comprising the steps of melting a composition containing cellulose ester, a polymer (a) below and a compound (b) below, and forming a film from the melted composition.

(a) a polymer obtained by copolymerization of an ethylenically unsaturated monomer having in the molecule a partial structure represented by formula (1) below with at least one ethylenically unsaturated monomer,

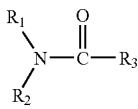

Formula (1)

wherein $R_1$, $R_2$ and $R_3$ independently represent a substituted or unsubstituted aliphatic group, a substituted or unsubstituted aromatic group or a substituted or unsubstituted heterocyclic group, provided that two of $R_1$, $R_2$ and $R_3$ combine with each other to form a 5- to 7-member ring together with the nitrogen atom or with both of the nitrogen atom and the carbon atom.

(b) at least one compound selected from the group consisting of a compound represented by formula (2) below and a compound represented by formula (3) below,

Formula (2)

wherein $Q_1$ represents a substituted or unsubstituted nitrogen-containing aromatic heterocyclic group, and $Q_2$ represents a substituted or unsubstituted aromatic group,

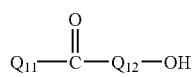

Formula (3)

wherein $Q_{11}$ and $Q_{12}$ independently represent a substituted or unsubstituted aromatic group.

10. The method of manufacturing a cellulose ester optical film of item 9 above, wherein the cellulose ester optical film contains at least one kind of plasticizers.

11. The method of manufacturing a cellulose ester optical film of item 9 or 10 above, wherein the method comprises stretching a cellulose ester optical film after extrusion in one direction at a stretching magnification of 1.0 to 4.0 and in the direction perpendicular to the one direction at a stretching magnification of 1.01 to 4.0.

12. A copolymer having a weight average molecular weight of from 3000 to 30000, wherein the copolymer is obtained by copolymerization of N-acryloyl morpholine with at least methyl (meth)acrylate.

Next, the preferred embodiment in the invention will be explained in detail, but the invention is not limited thereto.

There are mainly two manufacturing methods of cellulose ester optical film. One is a solution casting method which casts a solution in which cellulose ester is dissolved in a solvent, evaporates the solvent and dries to form a film. This method requires removal of a solvent remaining within the film, and therefore, requires large equipment investment in manufacturing line such as a drying line, drying energy, a solvent recovery apparatus and a solvent reproduction apparatus, resulting in increase of manufacturing cost. This is a serious problem to be solved. In contrast, a melt casting method does not give a drying load or a facility load as described above, since a solvent for providing a cellulose solution as in the solution casting method is not used. Accordingly, a melt casting method is preferable to a solution casting method, and in the invention, a melt casting method is especially preferably used.

The present inventors have made an extensive study, and as a result, they have found that a melt film formation from a mixture of cellulose ester, a polymer having a specific cyclic amide structure and an aromatic compound having a specific substituent show a surprising result of greatly improving a slitting property. Further, it has proved that durability of the film after saponification is improved, and the film strength is improved. The reason is not clear, but it is considered that a network is formed from three compounds, cellulose ester, the polymer (a) and the compound (b), resulting in synergic result.

Next, various kinds used in the invention will be explained in detail.

(Polymer (a))

The cellulose ester optical film of the invention contains at least one polymer obtained by copolymerization of an ethylenically unsaturated monomer having in the molecule a partial structure represented by formula (1) with at least one ethylenically unsaturated monomer.

In formula (1), $R_1$, $R_2$ and $R_3$ independently represent a substituted or unsubstituted aliphatic group, a substituted or unsubstituted aromatic group, or a substituted or unsubstituted heterocyclic group, provided that any two of $R_1$, $R_2$ and $R_3$ combine with each other to form a 5- to 7-membered heterocyclic ring together with a nitrogen atom or with both nitrogen atom and carbon atom. The aliphatic group, aromatic group or heterocyclic group represented by $R_1$, $R_2$ and $R_3$ is not specifically limited. Examples thereof include an alkyl group for example, a methyl group, an ethyl group, a propyl group, an isopropyl group, a t-butyl group, a pentyl group, a hexyl group, an octyl group, a dodecyl group, or a trifluoromethyl group), a cycloalkyl group (for example, a cyclopentyl group or a cyclohexyl group), an aryl group (for example, a phenyl group, or a naphthyl group), an acylamino group (for example, an acetylamino group, or a benzoylamino group), an alkylthio group (for example, a methylthio group, or an ethylthio group), an arylthio group (for example, a phenylthio group or a naphthylthio group), an alkenyl group (for example, a vinyl group, 2-propenyl group, a 3-butenyl group, a 1-methyl-3-propenyl group, a 3-pentenyl group, a 1-methyl-3-butenyl group, a 4-hexenyl group or a cyclohexenyl group), a halogen atom (for example, fluorine, chlorine, bromine, iodine), an alkinyl group (for example, a propargyl group), a heterocyclic group (for example, pyridyl group, a thiazolyl group, an oxazolyl group or an imidazolyl group), an alkylsulfonyl group (for example, a methylsulfonyl group or an ethylsulfonyl group), an arylsulfonyl group (for example, a phenylsulfonyl group or a naphthylsulfonyl group), an alkylsulfinyl group (for example, a methylsulfinyl group), an arylsulfonyl group (a phenylsulfinyl group), a phosphono group, an acyl group (for example, an acetyl group, a pivaloyl group or a benzoyl group), a carbamoyl group (for example, an aminocarbonyl group, a methylaminocarbonyl group, a dimethylaminocarbonyl group, a butylaminocarbonyl group, a cyclohexylaminocarbonyl group, a phenylaminocarbonyl group, or a 2-pyridylaminocarbonyl group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group or a 2-pyridylaminosulfonyl group), a sulfonamide group (for example, a methanesulfonamide group or a benzene sulfonamide group), a cyano group, an alkoxy group (for example, a methoxy group, an ethoxy group, or a propoxy group), an aryloxy group (for example, a phenoxy group or a naphthyloxy group), a heterocycle oxy group, a siloxy group, an acyloxy group (for example, an acetyloxy group, or a benzoyloxy group), a sulfonic acid group, a sulfonate group, an aminocarbonyloxy group, an amino group (for example, an amino group, an ethylamino group, a dimethylamino group, a butylaminocarbonyl group, a cyclopentylamino group, a 2-ethylhexylamino group, or a dodecylamino group), an anilino group (for example, a phenylamino group, a chlorophenylamino group, a toluidino group, an anisidino group, a naphthylamine group or a 2-pyridylamino group), an imino group, a ureido group (for example, a methylureido group, an ethylureido group, a pentylureido group, a cyclohexylureido group, an octylureido group, a dodecylureido group, a phenylureido group, a naphthylureido group, or a 2-pyridylureido group), an alkoxycarbonylamino group (for example, a methoxycarbonylamino group, or a phenoxycarbonylamino group), an alkoxycarbonyl group (for example, a methoxycarbonyl group an ethoxycarbonyl group, or a phenoxycarbonyl group), an aryloxycarbonyl group (for example, a phenoxycarbonyl group), a heterocyclicthio group, a thioureido group, a carboxyl group, a salt of carboxylic acid group, a hydroxyl group, a mercapto group, and a nitro group. These groups may further have a substituent, and examples of such a substituent are the same as those denoted above in $R_1$, $R_2$ and $R_3$.

In the invention, any two of $R_1$, $R_2$ and $R_3$ combine with each other to form a 5- to 7-membered heterocyclic ring together with a nitrogen atom or with both nitrogen atom and carbon atom. The heterocyclic ring may have in the ring an additional nitrogen atom, a surfur atom or an oxygen atom. As the heterocyclic ring there is mentioned a saturated or unsaturated monocyclic, polycyclic or condensed ring. Examples thereof include heterocyclic rings such as a pyrrolidine ring, a piperidine ring, a piperazine ring, a pyrrole ring, a morpholine ring, a thiamorphoine ring, an imidazole ring, a pyrazole ring, a pyrrolidone ring and a piperidone ring. These rings may have the same substituent as those denoted above in $R_1$, $R_2$ and $R_3$.

In the invention, the ethylenically unsaturated monomer having in the molecule a partial structure represented by formula (1) has in the molecule an ethylenically unsaturated bond. In formula (1), at least one of $R_1$, $R_2$ and $R_3$ represents an alkenyl group as a group having an ethylenically unsaturated bond or at least one of $R_1$, $R_2$ and $R_3$ has an ethylenically unsaturated bond as a partial structure. Examples of the ethylenically unsaturated group include a vinyl group, an allyl group, an acryloyl group, a methacryloyl group, a styryl group, an acrylamide group, a methacrylamide group, a cyanovinyl group, a 2-cyanoacryloxy group, 1,2-epoxy group, a vinylbenzyl group, and a vinyl ether group. The ethylenically unsaturated group is preferably a vinyl group, an acryloyl group, a methacryloyl group, an acrylamide group or a methacrylamide group.

Examples of the ethylenically unsaturated monomer having in the molecule a partial structure represented by formula (1) above used in the invention will be listed below, but the invention are not limited thereto.

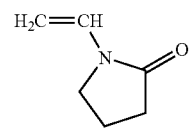

AM-1

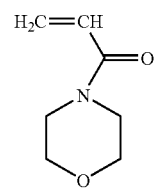

AM-2

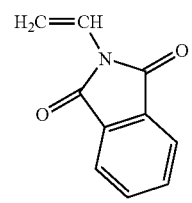

AM-3

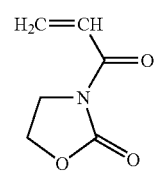

AM-4

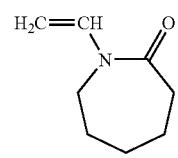

AM-5

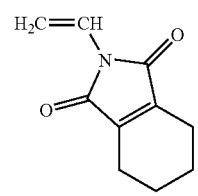

AM-6

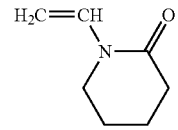

AM-7

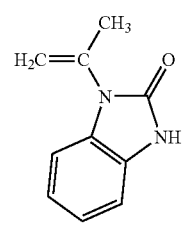

AM-8

AM-9 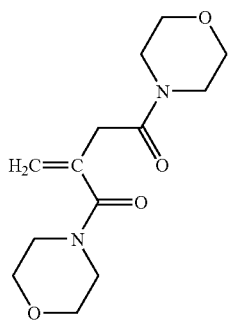
AM-10 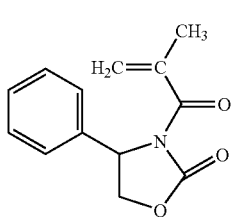
AM-11 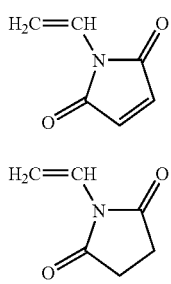
AM-12 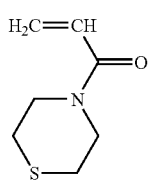
AM-13 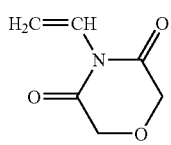
AM-14 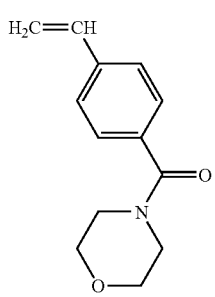
AM-15 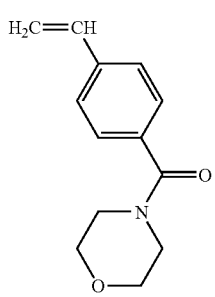
AM-16 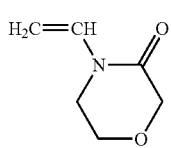
AM-17 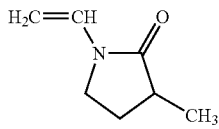
AM-18 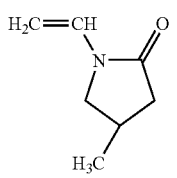
AM-19 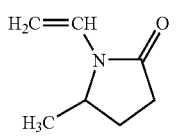
AM-20 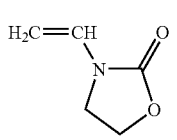
AM-21 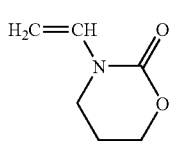
AM-22 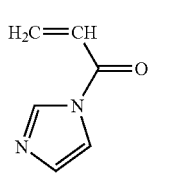
AM-23 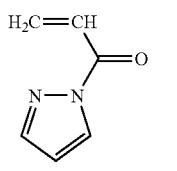
AM-24 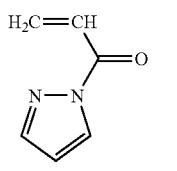
AM-25 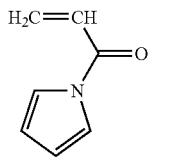
AM-26 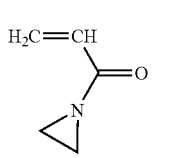

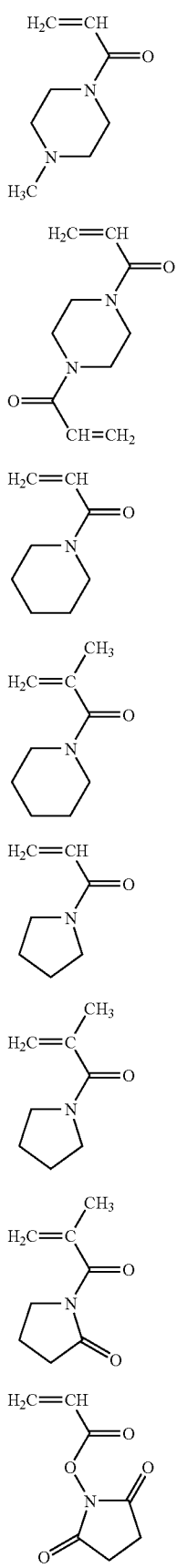
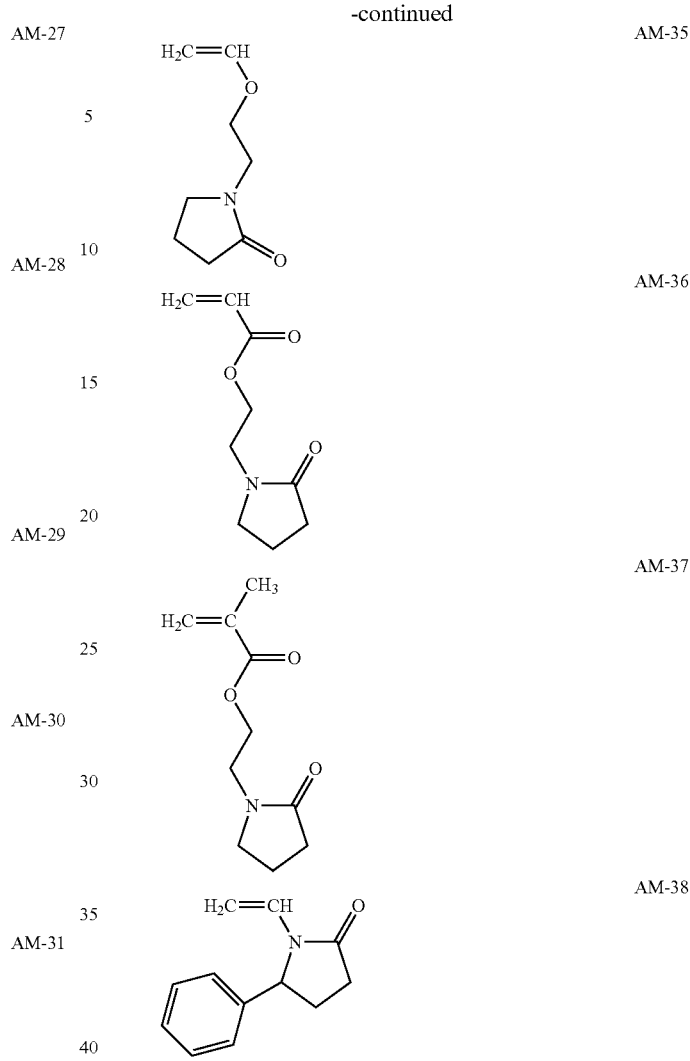

The ethylenically unsaturated monomer having in the molecule a partial structure represented by formula (1) may be used singly or as an admixture of two or more kinds thereof. N-vinylpyrrolidone, N-acryloylmorpholine, N-vinylpiperidone, N-vinylcaprolactam or their mixture is preferred, N-vinylpyrrolidone, N-acryloylmorpholine or their mixture is more preferred, and N-acryloylmorpholine is most preferred.

The ethylenically unsaturated monomer having in the molecule a partial structure represented by formula (1) used in the invention is available on the market or can be synthesized according to a method disclosed in the well known literature.

An ethylenically unsaturated monomer capable of copolymerizing with the ethylenically unsaturated monomer having in the molecule a partial structure represented by formula (1) may be the ethylenically unsaturated monomer having in the molecule a partial structure represented by formula (1), but is preferably a monomer other than it. Examples of the latter monomer include unsaturated compounds such as methacrylic acid or its derivatives (for example, methyl methacrylate, ethyl methacrylate, propyl methacrylate, butyl methacrylate, isobutyl methacrylate, t-butyl methacrylate, octyl methacrylate, cyclohexyl methacrylate, 2-hydroxyethyl methacrylate, 2-hydroxypropyl methacrylate, tetrahydrofurfuryl methacrylate, benzyl methacrylate, dimethylaminoethyl methacrylate and diethylaminoethyl methacrylate);

acrylic acid or its derivatives (for example, methyl acrylate, ethyl acrylate, propyl acrylate, butyl acrylate, isobutyl acrylate, t-butyl acrylate, octyl acrylate, cyclohexyl acrylate, 2-hydroxyethyl acrylate, 2-hydroxypropyl acrylate, tetrahydrofurfuryl acrylate, 2-ethoxyethyl acrylate, diethylene glycol ethoxylate acrylate, 3-methoxybutyl acrylate, benzyl acrylate, dimethylaminoethyl acrylate and diethylaminoethyl acrylate); alkyl vinyl ethers (for example, methyl vinyl ether, ethyl vinyl ether and butyl vinyl ether); alkyl vinyl esters (for example, vinyl formate, vinyl acetate, vinyl butyrate, vinyl caproate and vinyl stearate); styrene derivatives (for example, styrene, α-methylstyrene, o-methylstyrene, m-methylstyrene, p-methylstyrene and vinyl naphthalene); chrotonic acid; maleic acid; fumaric acid; itaconic acid; acrylonitrile; methacrylonitrile; vinyl chloride; vinylidene chloride; acrylamide; N,N-dimethylacrylamide; and methacrylamide. One or two or more of these monomers may be copolymerized with the ethylenically unsaturated monomer having in the molecule a partial structure represented by formula (1).

Among these ethylenically unsaturated monomers, acrylic acid esters or methacrylic acid esters (for example, methyl methacrylate, ethyl methacrylate, propyl methacrylate, butyl methacrylate, methyl acrylate, ethyl acrylate, propyl acrylate, butyl acrylate); alkyl vinyl esters (for example, vinyl formate, vinyl acetate, vinyl butyrate, vinyl caproate and vinyl stearate); styrene derivatives (for example, styrene, α-methylstyrene, o-methylstyrene, m-methylstyrene, p-methylstyrene and vinyl naphthalene) are preferred, methyl methacrylate and methyl acrylate are more preferred, and methyl methacrylate is most preferred.

The polymer (a) used in the invention has a weight average molecular weight (Mw) of preferably from 1000 to 70000, more preferably from 2000 to 50000, and still more preferably from 3000 to 30000. In the polymer (a), the ratio of the weight average molecular weight Mw/number average molecular weight Mn is preferably from 1.5 to 10.0, and more preferably from 1.5 to 5.0.

The polymer (a) used in the invention is most preferably a copolymer having a weight average molecular weight of from 3000 to 30000, obtained from copolymerization of N-acryloyl morpholine and at least methyl (meth)acrylate. Examples of N-acryloyl morpholine include AM-2 described above, and methyl (meth)acrylate is methyl methacrylate or methyl acrylate.

The Mn and Mw/Mn are determined according to Gel permeation chromatography under the following conditions.

The measurement conditions are as follows:
Solvent: Tetrahydrofuran
Apparatus: HLC-8220 (produced by Toso Co., Ltd.)
Column: TSK gel Super HM-M (produced by Toso Co., Ltd.)
Column temperature: 40° C.
Sample concentration: 0.1% by weight
Injection amount: 10 µl
Flow rate: 0.6 ml/min.
Calibration curve: One obtained employing 9 samples of PS-1 (produced by Polymer Laboratories Corporation) having an Mw of from 2,560,000 to 580.

The content of the ethylenically unsaturated monomer having in the molecule a partial structure represented by formula (1) in the polymer (a) used in the invention is selected considering an influence on compatibility of a copolymer obtained with a transparent resin or transparency or mechanical strength of an optical film. The content in the copolymer of the ethylenically unsaturated monomer having in the molecule a partial structure represented by formula (1) is preferably from 5 to 80% by weight, and more preferably from 10 to 50% by weight.

Polymerization methods obtaining a polymer (a) are not specifically limited, and examples thereof include radical polymerization, anion polymerization, and cation polymerization. Examples of a radical polymerization initiator used in the radical polymerization include azo compounds and peroxides such as azobisisobutyronitrile (AIBN), azobisisobutyric acid diester derivative, benzoyl peroxide and hydrogen peroxide. Solvents used in the polymerization are not particularly limited and examples thereof include an aromatic hydrocarbon solvent such as toluene or chlorobenzene, a halogenated hydrocarbon solvent such as dichloroethane or chloroform, an ether solvent such as tetrahydrofuran or dioxane, an amide solvent such as dimethyl formamide, an alcohol solvent such as methanol, an ester solvent such as methyl acetate or ethyl acetate, a ketone solvent such as acetone, cyclohexane or methylethyl ketone, and an aqueous solvent. A solution polymerization reacted in homogenous system, a precipitation polymerization in which polymer precipitates are generated, an emulsion polymerization polymerized in micelle state, or a suspension polymerization polymerized in suspension state is carried out employing an appropriate dsolv, and a bulk polymerization can be carried out as necessary.

The weight average molecular weight of the polymer above can be adjusted by a molecular weight regulating method well known in the art. Such a molecular weight regulating method includes a method to incorporate a chain transfer agent such as carbon tetrachloride, lauryl mercaptan or octyl thioglycolate. Further, polymerization temperature is generally from room temperature to 130° C. and preferably 50 to 110° C.

The polymer (a) is added in an amount of preferably from 0.1 to 50% by weight, and more preferably from 5 to 30% by weight, based on the cellulose ester resin for forming an optical film. The haze of the optical film formed is not limited as far as it is 1.0 or less, and is preferably 0.5 or less, and more preferably 0.3 or less.

(Compound (b))
(Compound Represented by Formula (2))

$Q_1$ represents a nitrogen-containing aromatic heterocyclic ring group, preferably a 5- to 7-member nitrogen-containing aromatic heterocyclic ring group, and more preferably a 5- or 6-member nitrogen-containing aromatic heterocyclic ring group. The nitrogen-containing aromatic heterocyclic ring is preferably an imidazole ring, a pyrazole ring, a triazole ring, a tetrazole ring, a thiazole ring, an oxazole ring, a selenazole ring, a benzotriazole ring, a benzothiazole ring, a benzoxazole ring, a benzoselenazole ring, a thiadiazole ring, an oxadiazole ring, a naphthothiazole ring, a naphthoxazole ring, an azabenzimidazole ring, a purine ring, a pyridine ring, a pyrazine ring, a pyrimidine ring, a pyridazine ring, a triazine ring, a triazaindene ring or a tetraazaindene ring; more preferably an imidazole ring, a pyrazole ring, a triazole ring, a tetrazole ring, a thiazole ring, an oxazole ring, a benzotriazole ring, a benzothiazole ring, a benzoxazole ring, a thiadiazole ring, an oxadiazole ring or a triazine ring; still more preferably a benzotriazole ring or a triazine ring; and most preferably a benzotriazole ring.

The nitrogen-containing aromatic heterocyclic ring group represented by $Q_1$ may further have a substituent. Examples of the substituent include the same as those denoted above in $R_1$, $R_2$ and $R_3$. When there are a plurality of substituents, they may combine with each other to further form a ring.

The aromatic group represented by $Q_2$ may be an aromatic hydrocarbon ring group or an aromatic heterocyclic ring group. The ring may be a single ring or may combine with another ring to form a condensed ring.

The aromatic hydrocarbon ring is preferably a single or bicyclic aromatic hydrocarbon ring having a carbon atom number of from 6 to 30 (for example, a benzene ring or a naphthalene ring), more preferably an aromatic hydrocarbon ring having a carbon atom number of from 6 to 20, still more preferably an aromatic hydrocarbon ring group having a carbon atom number of from 6 to 12, and most preferably a benzene ring.

The aromatic heterocyclic ring is preferably an aromatic heterocyclic ring containing a nitrogen atom or a surfur atom. Examples of the aromatic heterocyclic ring include a thiophene ring, an imidazole ring, a pyrazole ring, a pyridine ring, a pyrazine ring, a pyridazine ring, a triazole ring, a triazine ring, an indole ring, an indazole ring, a purine ring, a thiazoline ring, a triazole ring, a thiadiazole ring, an oxazoline ring, an oxazole ring, an oxadiazole ring, a quinoline ring, an isoquinoline ring, a phthalazine ring, a naphthyridine ring, a quinoxaline ring, a quinazoline ring, a cinnoline ring, a pteridine ring, an acridine ring, a phenanthoroline ring, a phenazine ring, a tetrazole ring, a benzimidazole ring, a benzoxazole ring, a benzothiazole ring, a benzotriazole ring, and a tetrazaindene ring. A pyridine ring, a triazine ring and a quinoline ring are preferred.

The aromatic ring represented by $Q_2$ is preferably an aromatic hydrocarbon ring, more preferably a naphthalene ring or a benzene ring, and still more preferably a benzene ring. $Q_2$ may have further a substituent, and examples of the substituent include the same as those denoted above in $R_1$, $R_2$ and $R_3$. When there are a plurality of substituents, they may combine with each other to further form a ring.

The compound represented by formula (2) above is preferably a compound represented by the following formula (2-A).

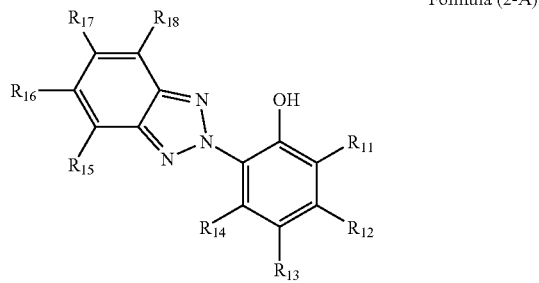

Formula (2-A)

(wherein $R_{11}$ through $R_{18}$ independently represent a hydrogen atom or a substituent.)

$R_{11}$ through $R_{10}$ independently represent a hydrogen atom or a substituent, and examples of the substituent include the same as those denoted above in $R_1$, $R_2$ and $R_3$. These substituents may further have diffrent substituents, which may combine with each other to form a ring. The adjacent substituents among $R_{11}$ through $R_{18}$ may combine with each other to form a ring.

$R_{11}$ and $R_{13}$ independently represent preferably a hydrogen atom, an alkyl group, an alkenyl group, an alkinyl group, an aryl group, a substituted or unsubstituted amino group, an alkoxy group, an aryloxy group, a hydroxyl group or a halogen atom; more preferably a hydrogen atom, an alkyl group, an aryl group, an alkoxy group, an aryloxy group or a halogen atom; sill more preferably a hydrogen atom or an alkyl group having a carbon atom number of from 1 to 12; and most preferably an alkyl group having a carbon atom number of from 1 to 12 (preferably from 4 to 12).

$R_{12}$ and $R_{14}$ independently represent preferably a hydrogen atom, an alkyl group, an alkenyl group, an alkinyl group, an aryl group, a substituted or unsubstituted amino group, an alkoxy group, an aryloxy group, a hydroxyl group or a halogen atom; more preferably a hydrogen atom, an alkyl group, an aryl group, an alkoxy group, an aryloxy group or a halogen atom; sill more preferably a hydrogen atom or an alkyl group having a carbon atom number of from 1 to 12; further still more preferably a hydrogen atom or a methyl group; and most preferably a hydrogen atom.

$R_{15}$ and $R_{19}$ independently represent preferably a hydrogen atom, an alkyl group, an alkenyl group, an alkinyl group, an aryl group, a substituted or unsubstituted amino group, an alkoxy group, an aryloxy group, a hydroxyl group or a halogen atom; more preferably a hydrogen atom, an alkyl group, an aryl group, an alkoxy group, an aryloxy group or a halogen atom; sill more preferably a hydrogen atom or an alkyl group having a carbon atom number of from 1 to 12; further still more preferably a hydrogen atom or a methyl group; and most preferably a hydrogen atom.

$R_{16}$ and $R_{17}$ independently represent preferably a hydrogen atom, an alkyl group, an alkenyl group, an alkinyl group, an aryl group, a substituted or unsubstituted amino group, an alkoxy group, an aryloxy group, a hydroxyl group or a halogen atom; more preferably a hydrogen atom, an alkyl group, an aryl group, an alkoxy group, an aryloxy group or a halogen atom; sill more preferably a hydrogen atom or a halogen atom; and most preferably a hydrogen atom or a chlorine atom.

Another preferred compound of the compound represented by formula (2) is a compound represented by the following formula (2-B).

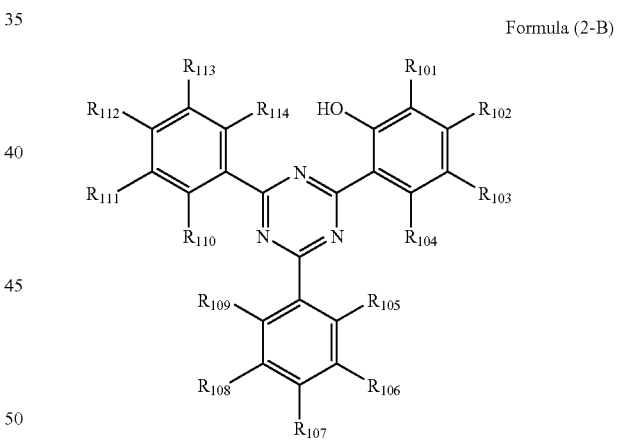

Formula (2-B)

(wherein $R_{101}$ through $R_{114}$ independently represent a hydrogen atom or substituent.)

$R_{101}$ through $R_{114}$ independently represent a hydrogen atom or a substituent, and examples of the substituent include the same as those denoted above in $R_1$, $R_2$ and $R_3$. These substituents may further have different substituents, which may combine with each other to form a ring. The adjacent substituents among $R_{101}$ through $R_{114}$ may combine with each other to form a ring.

$R_{101}$ through $R_{114}$ independently represent preferably a hydrogen atom, an alkyl group, an alkenyl group, an alkinyl group, an aryl group, a substituted or unsubstituted amino group, an alkoxy group, an aryloxy group, a hydroxyl group or a halogen atom; and more preferably a hydrogen atom, an alkyl group, an alkoxy group or a hydroxyl group.

Typical examples of the compound represented by formula (2) will be listed below, but the invention is not specifically limited thereto.
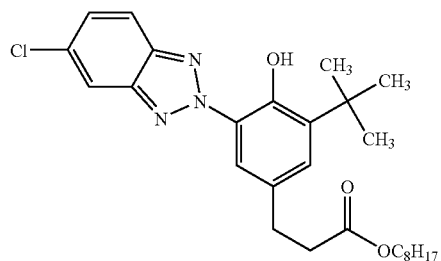
2-1
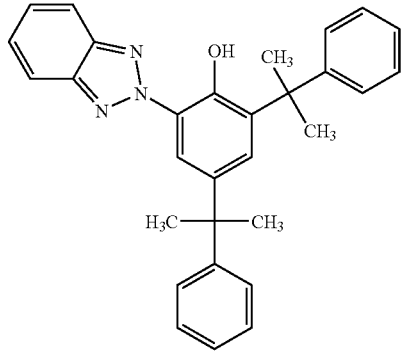
2-2
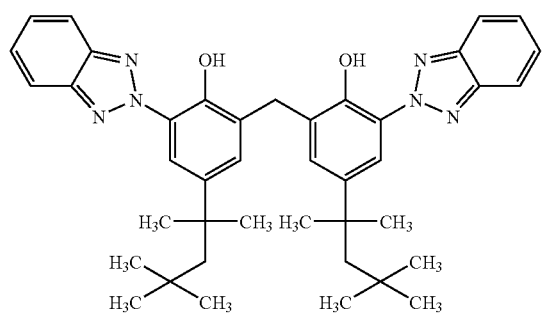
2-3
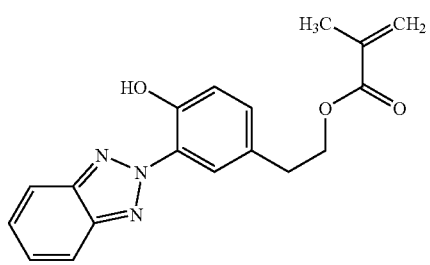
2-4
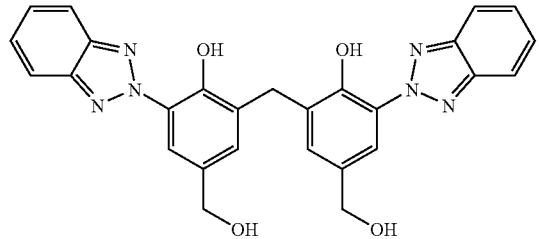
2-5
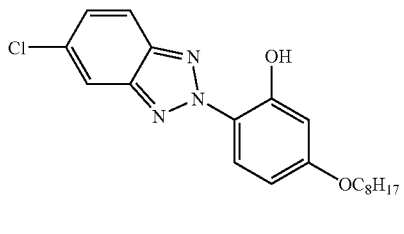
2-6
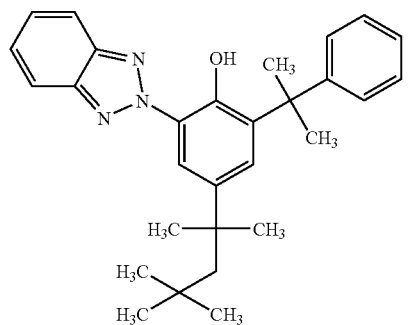
2-7
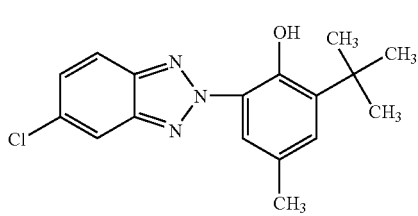
2-8
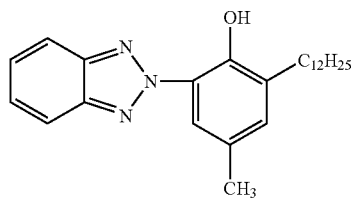
2-9
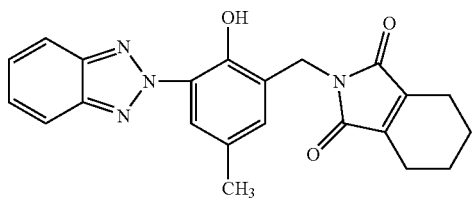
2-10

-continued
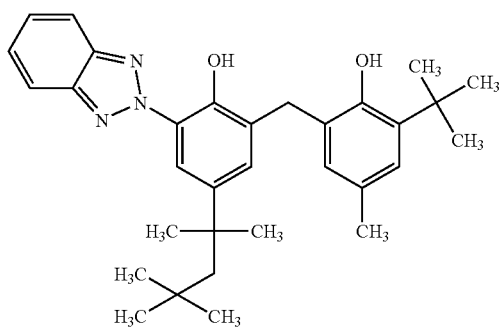
2-11
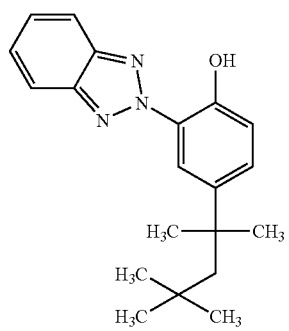
2-12
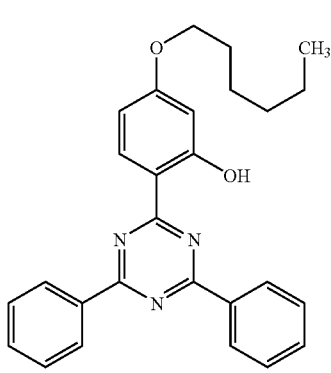
2-13
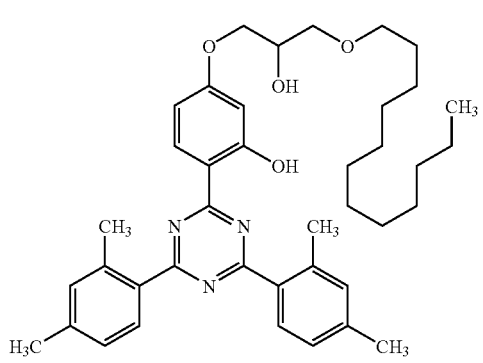
2-14
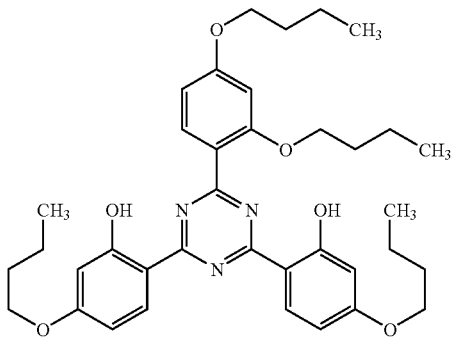
2-15
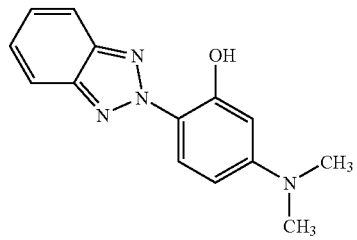
2-16
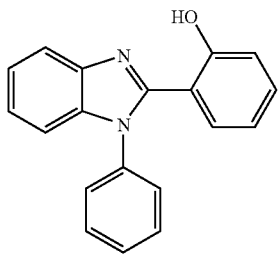
2-17
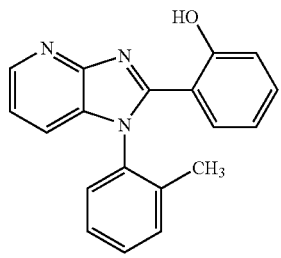
2-18
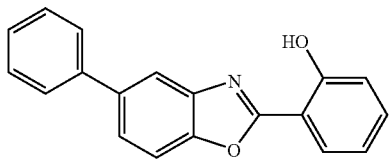
2-19
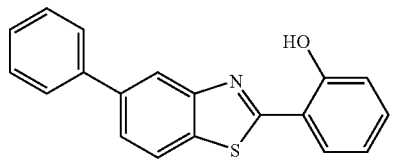
2-20

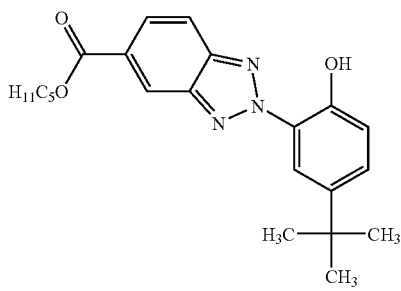
2-21

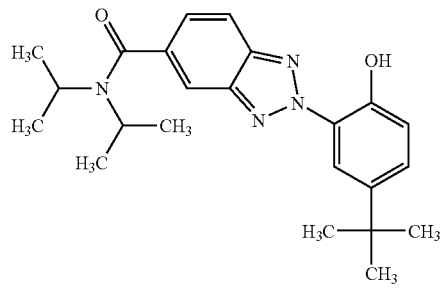
2-22

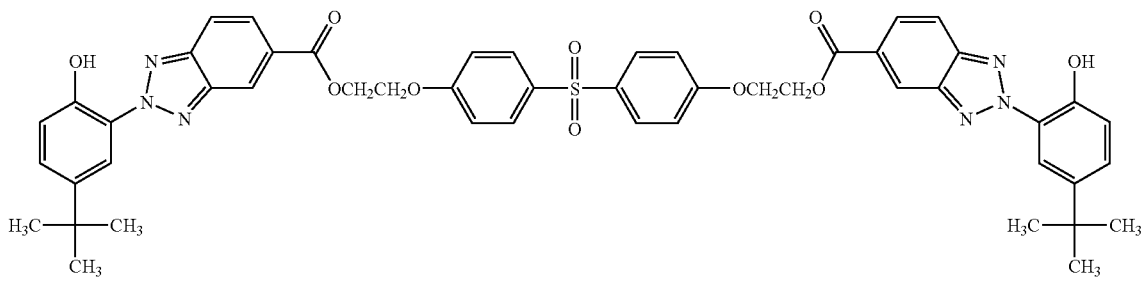
2-23

(Compound Represented by Formula (3))

The aromatic ring group represented by $Q_{11}$ and $Q_{12}$ may be an aromatic hydrocarbon ring group or an aromatic heterocyclic ring group. The ring may be a single ring or may combine with another ring to form a condensed ring.

The aromatic hydrocarbon ring represented by $Q_{11}$ and $Q_{12}$ is preferably a single or bicyclic aromatic hydrocarbon ring having a carbon atom number of from 6 to 30 (for example, a benzene ring or a naphthalene ring), more preferably an aromatic hydrocarbon ring having a carbon atom number of from 6 to 20, still more preferably an aromatic hydrocarbon ring group having a carbon atom number of from 6 to 12, and most preferably a benzene ring.

The aromatic heterocyclic ring represented by $Q_{11}$ and $Q_{12}$ is preferably an aromatic heterocyclic ring containing any one of an oxygen atom, a nitrogen atom and a surfur atom. Examples of the aromatic heterocyclic ring include a furane ring, a pyrrole ring, a thiophene ring, an imidazole ring, a pyrazole ring, a pyridine ring, a pyrazine ring, a pyridazine ring, a triazole ring, a triazine ring, an indole ring, an indazole ring, a purine ring, a thiazoline ring, a thiazole ring, a thiadiazole ring, an oxazoline ring, an oxazole ring, an oxadiazole ring, a quinoline ring, an isoquinoline ring, a phthalazine ring, a naphthyridine ring, a quinoxaline ring, a quinazoline ring, a cinnoline ring, a pteridine ring, an acridine ring, a phenanthoroline ring, a phenazine ring, a tetrazole ring, a benzimidazole ring, a benzoxazole ring, a benzothiazole ring, a benzotriazole ring, and a tetrazaindene ring. A pyridine ring, a triazine ring and a quinoline ring are preferred as the aromatic heterocyclic ring.

The aromatic ring represented by $Q_{11}$ or $Q_{12}$ is preferably an aromatic hydrocarbon ring, more preferably an aromatic hydrocarbon ring having a carbon atom number of from 6 to 10, and still more preferably a substituted or unsubstituted benzene ring.

$Q_{11}$ or $Q_{12}$ may have further a substituent, and examples of the substituent include the same as those denoted above in $R_1$, $R_2$ and $R_3$. These substituents may further have different substituents, which may combine with each other to form a ring.

A preferred compound of the compound represented by formula (3) is a compound represented by the following formula (3-A).

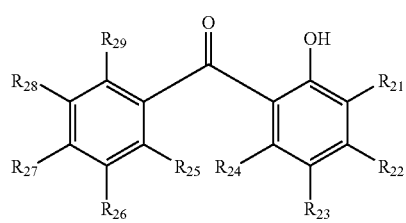
Formula (3-A)

(wherein $R_{21}$ through $R_{29}$ independently represent a hydrogen atom or a substituent.)

$R_{21}$ through $R_{29}$ independently represent a hydrogen atom or a substituent, and examples of the substituent include the same as those denoted above in $R_1$, $R_2$ and $R_3$. These substituents may further have different substituents, which may combine with each other to form a ring. The adjacent substituents among $R_{101}$ through $R_{114}$ may combine with each other to form a ring.

$R_{21}$, $R_{23}$, $R_{24}$, $R_{25}$, $R_{25}$, $R_{28}$ and $R_{29}$ independently represent preferably a hydrogen atom, an alkyl group, an alkenyl group, an alkinyl group, an aryl group, a substituted or unsubstituted amino group, an alkoxy group, an aryloxy group, a hydroxyl group or a halogen atom; more preferably a hydrogen atom, an alkyl group, an aryl group, an alkoxy group, an aryloxy group or a halogen atom; still more preferably a hydrogen atom or an alkyl group having a carbon atom number of from 1 through 12; further still more preferably a hydrogen atom or a methyl group; and most preferably a hydrogen atom.

$R_{22}$ represents preferably a hydrogen atom, an alkyl group, an alkenyl group, an alkinyl group, an aryl group, a substituted or unsubstituted amino group, an alkoxy group, an aryloxy group, a hydroxyl group or a halogen atom; more preferably a hydrogen atom, an alkyl group having a carbon atom number of from 1 to 20, an amino group having a carbon atom number of from 0 to 20, an alkoxy group having a carbon atom number of from 1 to 12, an aryloxy group having a carbon atom number of from 6 to 12 or a hydroxyl group; still more preferably an alkoxy group having a carbon atom number of from 1 to 20; and most preferably an alkoxy group having a carbon atom number of from 1 to 12.

$R_{27}$ represents preferably a hydrogen atom, an alkyl group, an alkenyl group, an alkinyl group, an aryl group, a substituted or unsubstituted amino group, an alkoxy group, an aryloxy group, a hydroxyl group or a halogen atom; more preferably a hydrogen atom, an alkyl group having a carbon atom number of from 1 to 20, an amino group having a carbon atom number of from 0 to 20, an alkoxy group having a carbon atom number of from 1 to 12, an aryloxy group having a carbon atom number of from 6 to 12 or a hydroxyl group; still more preferably a hydrogen atom or an alkyl group having a carbon atom number of from 1 to 20 (preferably from 1 to 12, more preferably from 1 to 8, and most preferably a methyl group); and most preferably a hydrogen atom or a methyl group.

Typical examples of the compound represented by formula (3) will be listed below, but the invention is not specifically limited thereto.

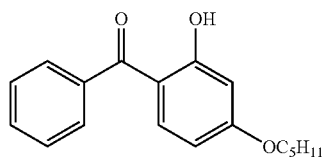
3-1

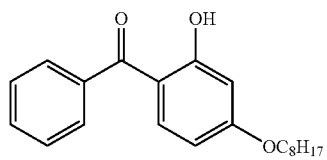
3-2

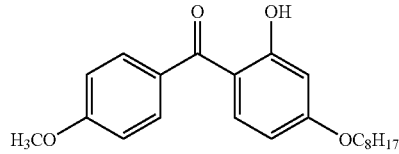
3-3

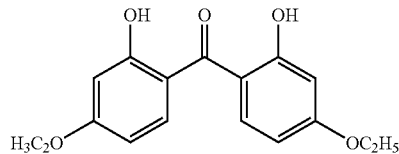
3-4

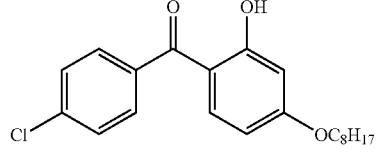
3-5

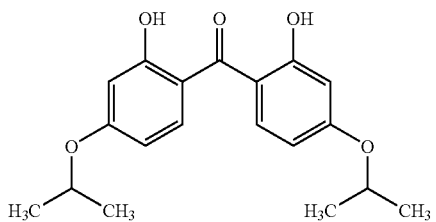
3-6

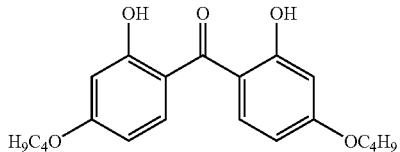
3-7

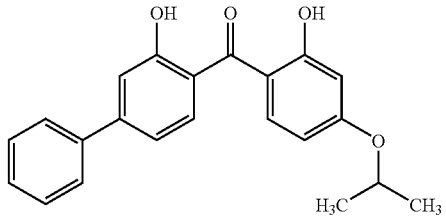
3-8

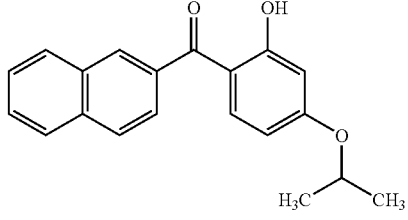
3-9

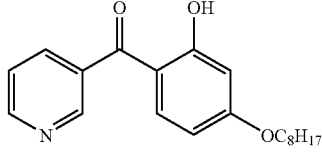
3-10

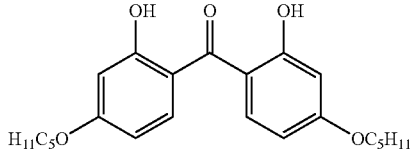
3-11

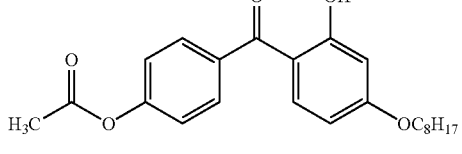
3-12

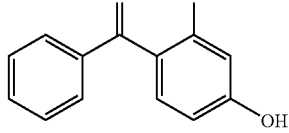
3-13

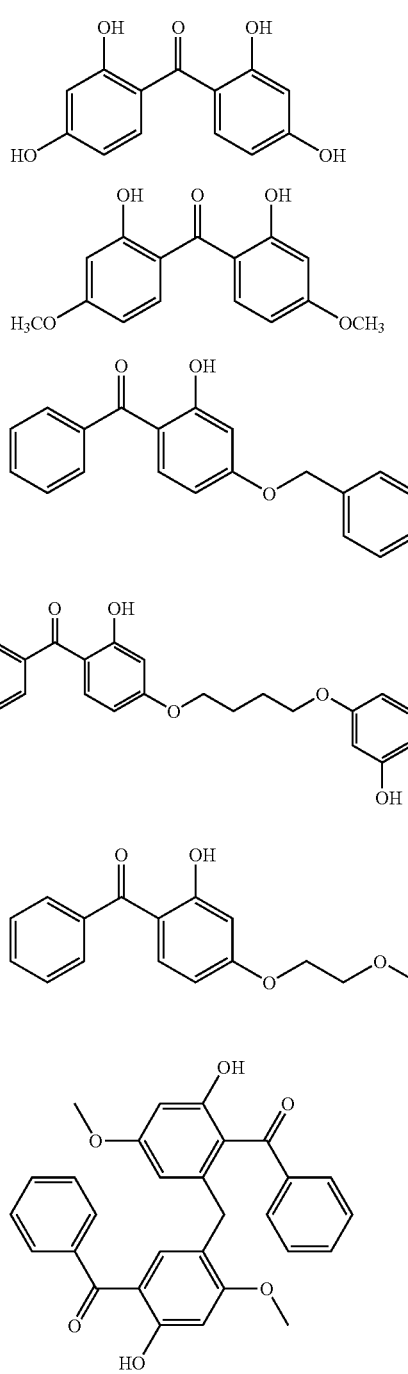

(Cellulose Ester)

The cellulose ester constituting the optical film of the invention is not specifically limited as far as it is a cellulose ester capable of forming a film by melting. For example, an aromatic carboxylic acid ester of cellulose is used, but a lower aliphatic acid ester of cellulose is preferably used in view of film properties such as optical property.

In the invention, the lower aliphatic acid in the lower aliphatic acid ester of cellulose implies a lower aliphatic acid having a carbon atom number of not more than 5. Preferred examples thereof include a lower aliphatic acid such as cellulose acetate, cellulose propionate, cellulose butyrate or cellulose pivalate.

Cellulose ester with an aliphatic acid having a carbon atom number of not less than 6 has good melt film formation property, but an optical film obtained therefrom is low in mechanical property, and therefore, such a cellulose ester is substantially difficult to use as an optical film.

In order to meet both mechanical property and melt film formation property, a mixed acid ester of cellulose such as cellulose acetate propionate or cellulose acetate butyrate disclosed, for example, in Japanese Patent O.P.I. Publication Nos. 10-45804 and 8-231761 and U.S. Pat. No. 2,319,052 may be used.

Acetyl cellulose having only an acetyl group, which is cellulose ester generally used in a solution casting film formation method, has a decomposition temperature lower than a melting point and provides high viscosity at melting, and therefore, it is difficult to use in the melt film formation method.

Among the cellulose esters described above, cellulose acetate propionate or cellulose acetate butyrate is preferably used.

Next, a degree of substitution of acyl group in the cellulose ester used in the invention will be explained.

Cellulose is formed from a glucose having in the molecule one hydroxy group at each of the 2, 3 and 6 positions, three hydroxyl groups in total. Degree of substitution of acyl group means the average number of an acyl group with which the hydrogen atom of one glucose unit is substituted.

Accordingly, maximum degree of substitution is three. The acyl group may be averagely substituted at the 2, 3 and 6 positions of the glucose unit, or substituted with a certain distribution.

Regarding the mixed aliphatic acid esters, lower aliphatic acid esters such as cellulose acetate propionate and cellulose acetate butyrate, which are preferred as the mixed aliphatic acid cellulose ester, have an acyl group having 2 to 4 carbon atoms as the substituent. The preferred cellulose ester resin comprises cellulose ester satisfying relationships (1), (2) and (3) described later, wherein X represents a degree of substitution of the acetyl group, and Y represents a degree of substitution of the propionyl group or the butyryl group.

The degree of substitution of an acetyl group or another acyl group is determined according to ASTM-D817-96.

$$2.4 \leq A+B \leq 3.0 \quad \text{Relationship (1)}$$

$$0 \leq A \leq 2.1 \quad \text{Relationship (2)}$$

$$0 < B \leq 3.0 \quad \text{Relationship (3)}$$

A hydroxyl group is usually present at the portions which are not substituted with an acyl group. Among these, cellulose acetate propionate is preferably used.

In the cellulose ester used in the invention, the ratio of the weight average molecular weight Mw/number average molecular weight Mn is preferably from 1.5 to 5.5, and more preferably from 2.0 to 4.0.

The cellulose ester used in the invention has a number average molecular weight (Mn) of preferably from 50,000 to 150,000, more preferably from 55,000 to 120,000, and still more preferably from 60,000 to 100,000.

The Mn and Mw/Mn are determined according to Gel permeation chromatography under the following conditions.

The measurement conditions are as follows:
Solvent: Tetrahydrofuran
Apparatus: HLC-8220 (produced by Toso Co., Ltd.)
Column: TSK gel Super HM-M (produced by Toso Co., Ltd.)
Column temperature: 40° C.
Sample concentration: 0.1% by weight Injection amount: 10 μl
Flow rate: 0.6 ml/min
Calibration curve: One obtained employing 9 samples of PS-1 (produced by Polymer Laboratories Corporation) having an Mw of from 2,560,000 to 580.

Cellulose which is a raw material for the cellulose ester of the invention may be wood pulp or cotton linter, and the wood pulp may be that of a needle-leaf tree or a broad-leaf tree, but that of the broad-leaf tree is more preferable. Cotton linter is preferably used in view of peeling properties at the time of film formation. Cellulose esters made from these substances may be suitably blended or used alone.

For example, the proportion used of cellulose ester from cotton linter: cellulose ester from wood pulp (needle-leaf tree): cellulose ester from wood pulp (broad-leaf tree) may be 100:0:0, 90:10:0, 85:15:0, 50:50:0, 20:80:0, 10:90:0, 0:100:0, 0:0:100, 80:10:10, 85:0:15, and 40:30:30.

The cellulose ester can be obtained, for example, by substituting the hydroxyl group of the material cellulose by the acetic anhydride, anhydrous propionic acid and/or anhydrous butyric acid according to the normal method in such a way that the acetyl group, propionyl group and/or butyl group are kept within the aforementioned range. There is no restriction to the method of synthesizing such a cellulose ester. For example, it can be synthesized by using the method disclosed in Japanese Patent O.P.I. Publication Nos. 10-45804 and 6-501040.

The content of an alkali earth metal used in the cellulose ester of this invention is preferably 1 to 50 ppm. It is liable to increase of lip attaching stain, or to break at thermal stretching process or slitting process after thermal stretching at 50 ppm or more. It is also liable to break when the content being less than 1 ppm, the reason of which is not known. Load against washing process so as to make less than 1 ppm is too heavy, and therefore it is not preferable. The content of 1 to 30 ppm is more preferable. The alkali earth metal content herein refers a total amount of calcium and magnesium, which can be measured by employing X ray photoelectron spectrometric analysis (XPS).

The amount of the residual sulfuric acid contained in the cellulose ester used in the present invention is 0.1 to 45 ppm in terms of the sulfur element. They are considered to be included as salts. The amount of the residual sulfuric acid contained therein of not less than 45 ppm is not preferable since the deposition on the die lip at the time of heat-melting increases and the film tends to tear off at the time of thermal stretching or slitting subsequent to thermal stretching. The amount of the residual sulfuric acid contained therein should be reduced as much as possible, but when it is to be reduced below 0.1 ppm, the load on the cellulose ester washing process will be excessive and the material tends to be damaged easily. This should be avoided. This may be because an increase in the frequency of washing affects the resin, but the details are not yet clarified. Further, the preferred amount is in the range of 1 to 30 ppm. The amount of the residual sulfuric acid can be measured according to a method prescribed in ASTM-D817-96.

The total amount of the free acid in the cellulose ester used in this invention is preferably 1 to 500 ppm. When the amount exceeds 500 ppm, depositions on the die lip at the time of heat-melting increase and the film tends to tear off. It is difficult to make the free acid amount less than 1 ppm by washing. The free acid amount is more preferably 1 to 100 ppm, which increases resistance to tear. The free acid amount is still more preferably 1 to 70 ppm. The amount of free acid can be measured according to a method prescribed in ASTM-D817-96.

The amount of the residual acid can be kept within the aforementioned range if the synthesized cellulose ester is washed more carefully than in the case of the solution casting method. Then, when a film is manufactured by the melt casting, the amount of depositions on the lip portion will be reduced so that a film characterized by a high degree of flatness is produced. Such a film will be further characterized by excellent resistance to dimensional changes, mechanical strength, transparency, resistance to moisture permeation, Rt value and Ro value to be described later. Further, the cellulose ester can be washed using water as well as a poor solvent such as methanol or ethanol. It is also possible to use a mixture and a poor solvent and a good solvent if it is a poor solvent as a result. This will remove inorganic substances other than residual acid, and low-molecular organic impurities. The cellulose ester is washed preferably in the presence of an antioxidant such as a hindered amine and phosphorous acid ester. This will improve the heat resistance and film formation stability of the cellulose ester.

To improve the heat resistance, mechanical property and optical property of cellulose ester, a cellulose ester solution in which the cellulose ester is dissolved in a good solvent is re-precipitated in a poor solvent to purify the cellulose ester, which removes the low molecular weight components and other impurities in the cellulose ester. The reprecipitation is preferably carried out in the presence of an antioxidant in the same manner as in washing as above.

The cellulose ester obtained by the re-precipitation may be added with another polymer or a low molecular weight compound.

In the invention, besides the cellulose ester resin, cellulose ether resins, vinyl resins (such as polyvinyl acetate resin, polyvinyl alcohol resin), cyclic olefin resins, polyester resins (aromatic polyesters, aliphatic polyesters, or their copolymers), or acryl resins (including copolymers) can be added. The content of the resins other than the cellulose ester resin is preferably from 0.1 to 30% by weight.

However, it is preferable that the cellulose ester used in the invention provides a film having minimal foreign matter bright spots. "Foreign matter bright spots" refer to spots in which, when one side of a laminate in which two polarizing plates are arranged at right angles (crossed Nicols) and a cellulose ester optical film is arranged between them is exposed to light, and the laminate is viewed from the other side, leakage of the light is observed. At the time, it is desired that a polarizing plate employed for evaluation is composed of a protective film having no foreign matter bright spots, and one in which a glass plate is employed to protect a polarizer is preferably employed. It is assumed that the use of cellulose which has not been acetylated or cellulose with a low degree of acylation is one of the causes of the foreign matter bright spots. It is possible to remove the foreign matter bright spots by employing cellulose esters (for example, cellulose esters with a small variation of a degree of substitution) having minimal foreign matter bright spots, by filtering molten cellulose esters, or by filtering a solution of cellulose ester obtained at a final cellulose ester synthesis stage or a precipitation stage in the synthetic process. Since the molten resin has high viscosity, the latter method is more efficient.

However, minute foreign matter may not be completely removed by filtration. The present inventors have found that a melt film formation of a cellulose ester composition, in which cellulose ester is mixed with a polymer having a specific amide structure, a carbon radical trapping agent, a phenol compound and a phosphorous-containing compound, greatly reduces the foreign matter bright spots. The reason is not clear, but it is considered that cellulose ester with a low degree of acyl substitution is sufficiently melted.

As film thickness decreases, the number of foreign matter bright spots decreases, and as the content of cellulose esters contained in the film decreases, the foreign matter bright spots tend to decrease. The number of foreign matter bright spots with a spot diameter of not less than 0.01 mm is preferably 200/cm$^2$ or less, more preferably 100/cm$^2$ or less, still more preferably 50/cm$^2$ or less, further still more preferably 30/cm$^2$ or less, further still further more preferably 10/cm$^2$ or less, and most preferably 0. Further, the number of foreign matter bright spots with a spot diameter of from 0.005 to 0.01 mm is preferably 200/cm$^2$ or less, more preferably 100/cm$^2$ or less, still more preferably 50/cm$^2$ or less, further still more preferably 30/cm$^2$ or less, further still further more preferably 10/cm$^2$ or less, and most preferably 0.

When the foreign matter bright spots are removed via melt filtration, melt filtration of a cellulose ester composition containing plasticizers and antioxidants is preferred as compared with that of a composition composed of only cellulose esters, since removal efficiency of the foreign matter bright spots is higher. As a matter of course, the foreign matter bright spots can be reduced by filtration of a solution in which cellulose ester is dissolved in a solvent during the synthesis process of the cellulose ester. It is possible to filter a composition incorporating other additives. A molten composition containing cellulose esters to be filtered has a viscosity of preferably 10000 Pa·s or less, more preferably 5000 Pa·s, still more preferably 1000 Pa·s or less, and most preferably 500 Pa·s or less. As filter materials, preferably employed are conventional ones such as glass fibers, cellulose fibers, filter paper, or fluororesins such as ethylene tetrafluoride. Ceramics and metals are especially preferably employed. The absolute filtration accuracy of a filter employed is preferably 50 μm or less, more preferably 30 μm or less, still more preferably 10 μm or less, and most preferably 5 μm or less. These may be employed in appropriate combinations. A surface or depth type filter material may be employed, while the depth type is more preferably employed due to less clogging.

As another embodiment, a cellulose ester my be employed which is prepared in such a manner that after dissolving at least once raw material cellulose esters into solvents, solvents are dried. At that time, after dissolving cellulose esters together with at least one of the plasticizer, UV absorber, degradation inhibitor, antioxidant, and matting agent, it is possible to employ dried cellulose esters. As solvents employed may be a good solvent employed in the solution casting method such as methylene chloride, methyl acetate or dioxolanes, a poor solvent such as methanol, ethanol or butanol or their mixture. During the dissolution, cooling to at most −20° C. or heating to at least 80° C. may be carried out. Such cellulose esters can provide a molten composition with additives uniformly blended, and uniform optical properties.

(Plasticizer)

It is preferred that the optical film of the invention contains at least one plasticizer in addition to cellulose ester, the polymer (a), and the compound (b).

Generally, a plasticizer is an additive, which is added to a polymer to improve brittleness of the polymer and impart flexibility to the polymer. For example, in the cellulose ester of the invention, the plasticizer is preferably employed, since the melting temperature of materials constituting the film is lower that that of cellulose ester resin alone, and the melt viscosity of materials constituting the film is lower that that of cellulose ester resin alone at the same temperature.

The plasticizer can function as a moisture permeation preventive agent, which improves hydrophilicity of cellulose ester and improves a degree of moisture permeation of the optical film.

Herein, the melting temperature of the film constituting materials implies a temperature at which fluidity is developed when the materials are heated. In order to melt and fluidity cellulose ester, it is necessary to heat the cellulose ester to a temperature higher than that of the glass transition temperature.

Heat is absorbed at a temperature higher than the glass transition point, and a coefficient of elasticity or viscosity lowers, whereby fluidity is developed.

However, cellulose ester is melted at high temperature and at the same time thermally decomposed to cause lowering of the molecular weight, which may have an adverse effect on mechanical properties of the film. Accordingly, it is necessary to melt the cellulose ester at the lowest possible temperature.

A melting temperature of materials constituting the optical film can be lowered by addition of a plasticizer having a melting point or glass transition point lower than the glass transition point of cellulose ester. The optical film preferably used in the invention is an optical film containing a plasticizer in an amount of preferably from 1 to 25% by weight. This content range is preferred in exhibiting the effects of the invention more markedly.

The plasticizer content of the optical film is more preferably from 3 to 20% by weight, and still more preferably from 5 to 15% by weight.

In the invention, an ester plasticizer formed from a polyhydric alcohol and a monocarboxylic acid or an ester plasticizer formed from a polycarboxylic acid and a monohydric alcohol is preferred since it has high affinity to cellulose ester.

Examples of polyhydric alcohols, which are materials for ester plasticizers preferably used in the invention, include those listed below, but the invention is not limited thereto.

Examples thereof include adonitol, arabitol, ethylene glycol, glycerin, diglycerin, diethylene glycol, triethylene glycol, tetraethylene glycol, 1,2-propane dial, 1,3-propane diol, dipropylene glycol, tripropylene glycol, 1,2-butane dial, 1,3-butane diol, 1,4-butane diol, dibutylene glycol, 1,2,4-butane triol, 1,5-pentane diol, 1,6-hexane diol, hexane trial, galactitol, mannitol, 3-methylpentane-1,3,5-triol, pinacol, sorbitol, trimethyloipropane, ditrimethylolpropane, trimethylolethane, pentaerythritol, dipentaerythritol, and xylitol.

Particularly preferred are ethylene glycol, glycerin and trimethylolpropane.

Typical examples of the ethylene glycol ester plasticizer which is one of the polyhydric ester plasticizers include ethylene glycol alkyl ester plasticizers such as ethylene glycol diacetate and ethylene glycol dibutyrate; ethylene glycol cycloalkyl ester plasticizers such as ethylene glycol dicyclopropyl carboxylate, and ethylene glycol dicyclohexyl carboxylate; and ethylene glycol aryl ester plasticizers such as ethylene glycol dibenzoate and ethylene glycol di-4-methyl benzoate.

The alkylate groups, cycloalkylate groups or arylate groups in the ethylene glycol ester plasticizer may be the same or different and may further have a substituent.

The alkylate groups, cycloalkylate groups and arylate groups may be used in combination, and the substituents may be covalently bonded to each other.

Further, the ethylene glycol group may have a substituent. A partial structure of the ethylene glycol ester may constitute a part of a polymer, may be included in a polymer as a part of regularly distributed pendants in the polymer, or may be incorporated into a part of the molecular structure of additives such as an antioxidant and an acid scavenger.

Typical examples of the glycerin ester plasticizer, which is one of the polyhydric alcohol ester plasticizers, include glycerin alky esters such as triacetin, tributyrin, glycerin diacetate carboxylate and glycerin oleate propionate; glycerin cycloalkyl esters such as glycerin tricyclopropyl carboxylate, and glycerin tricyclohexyl carboxylate; glycerin aryl esters such as glycerin tribenzoate and glycerin-4-methylbenzoate; diglycerin alkyl esters such as diglycerin tetraacetylate, diglycerin tetrapropionate, diglycerin acetate tricaprylate and diglycerin tetralaurate; diglycerin cycloalkyl esters such as diglycerin tetracyclobutyl carboxylate and diglycerin tetracyclopentyl carboxylate; and diglycerin aryl esters such as diglycerin tetrabenzoate and diglycerin-3-methyl benzoate.

The alkylate groups, cycloalkylate groups or arylate groups in the glycerin ester plasticizer may be the same or different and may further have a substituent.

The alkylate groups, cycloalkylate groups and arylate groups may be used in combination, and the substituents may be covalently bonded to each other.

Further, the glycerin and diglycerin portions may have a substituent. A partial structure of the glycerin ester or diglycerin ester may constitute a part of a polymer, may be included in a polymer as a part of regularly distributed pendants in the polymer, or may be incorporated into a part of the molecular structure of additives such as an antioxidant and an acid scavenger.

Examples of other polyhydric alcohol ester plasticizers include those disclosed in paragraphs 30 to 33 of Japanese Patent O.P.I. Publication No. 2003-12823.

The alkylate groups, cycloalkylate groups or arylate groups in the plasticizers may be the same or different and may further have a substituent. The alkylate groups, cycloalkylate groups and arylate groups may be used in combination, and the substituents may be covalently bonded to each other.

Further, the polyhydric alcohol portions may have a substituent. A partial structure of the polyhydric alcohol ester may constitute a part of a polymer, may be included in a polymer as a part of regularly distributed pendants in the polymer, or may be incorporated into a part of the molecular structure of additives such as an antioxidant and an acid scavenger.

Among the ester plasticizers formed from the polyhydric alcohol and a monocarboxylic acid, a polyhydric alkanol aryl ester is preferred, and typical examples thereof include ethylene glycol dibenzoate, glycerin tribenzoate, diglycerin and tetrabenzoate, as describe above; and Exemplified compound 16 as disclosed in paragraph 31 of Japanese Patent O.P.I. Publication No. 2003-12823.

Typical examples of the dicarboxylic acid ester plasticizer which is one of the polycarboxylic acid esters include alkyl dicarboxylic acid alkyl ester plasticizers such as didodecyl malonate, dioctyl adipate and dibutyl sebacate; alkyl dicarboxylic acid cycloalkyl ester plasticizers such as dicyclopentyl succinate and dicyclohexyl adipate; alkyl dicarboxylic acid aryl ester plasticizers such as diphenyl succinate and di-4-methylphenyl glutarate, cycloalkyl dicarboxylic acid alkyl ester plasticizers such as dihexyl-1,4-cyclohexane dicarboxylate and didecyl bicyclo[2.2.1]heptane-2,3-dicarboxylate; cycloalkyl dicarboxylic acid cycloalkyl ester plasticizers such as dicyclohexyl-1,2-cyclobutane dicarboxylate and dicyclopropyl-1,2-cyclohexyl dicarboxylate; cycloalkyl dicarboxylic acid aryl ester plasticizers such as diphenyl-1,1-cyclopropyl dicarboxylate and di-2-naphtyl-1,4-cyclohexane dicarboxylate; aryl dicarboxylic acid alkyl ester plasticizers such as diethyl phthalate, dimethyl phthalate, dioctyl phthalate, dibutyl phthalate and di-2-ethylhexyl phthalate; aryl dicarboxylic acid cycloalkyl ester plasticizers such as dicyclopropyl phthalate and dicyclohexyl phthalate; and aryl dicarboxylic acid aryl ester plasticizers such as diphenyl phthalate and di-4-methylphenyl phthalate.

These alkoxy groups and cycloalkoxy groups may be the same or different, and may have a substituent. The substituent may be further substituted. The alkyl group and the cycloalkyl group may be used in combination, and the substituents may be covalently bonded to each other.

Furthermore, the aromatic ring of the phthalic acid may be substituted and may be a polymer such as a dimer, trimer or tetramer. A partial structure of the phthalic acid ester may constitute a part of a polymer, may be included in a polymer as a part of regularly distributed pendants in the polymer, or may be incorporated into a part of the molecular structure of additives such as an antioxidant and an acid scavenger.

Typical examples of other polycarboxylic acid ester plasticizers include alkyl polycarboxylic acid alkyl ester plasticizers such as tridodecyl tricarbalate and tributyl-meso-butane-1,2,3,4,-tetracarboxylate; alkyl polycarboxylic acid cycloalkyl ester plasticizers such as tricyclohexyl tricarbalate, and tricyclopropyl 2-hydroxy-1,2,3-propane tricarboxylate; alkyl polycarboxylic acid aryl ester plasticizers such as triphenyl 2-hydroxyl-1,2,3-propane tricarboxylate and tetra-3-methylphenyl tetrahydrofuran-2,3,4,5-tetracarboxylate; cycloalkyl polycarboxylic acid alkyl ester plasticizers such as tetrahexyl 1,2,3,4-cyclobutane tetracarboxylate and tetrabutyl 1,2,3,4-cyclopentane tetracarboxylate; cycloalkyl polycarboxylic acid cycloalkyl ester plasticizers such as tetracyclopropyl 1,2,3,4-cyclobutane tetracarboxylate and tricyclohexyl-1,3,5-cyclohexyl tricarboxylate; cycloalkyl polycarboxylic acid aryl ester plasticizers such as triphenyl 1,3,5-cyclohexyl tricarboxylate and hexa4-methylphenyl-1,2,3,4,5,6-cyclohexyl hexacarboxylate; aryl polycarboxylic acid alkyl ester plasticizers such as tridodecyl benzene-1,2,4-tricarboxylate and tetraoctyl benzene-1,2,4,5 tetracarboxylate; aryl polycarboxylic acid cycloalkyl ester plasticizers such as tricyclopentyl benzene-1,3,5-tricarboxylate and tetracyclohexyl benzene-1,2,3,5-tetracarboxylate; and aryl polycarboxylic acid aryl ester plasticizers such as triphenyl benzene-1,3,5-tetracarboxylate and hexa-4-methylphenyl benzene-1,2,3,4,5,6-hexacarboxylate.

These alkoxy groups and cycloalkoxy groups may be the same or different, and may have a substituent. The substituent may be further substituted.

The alkyl group and the cycloalkyl group may be used in combination, and the substituents may be covalently bonded to each other. Furthermore, the aromatic ring of the phthalic acid may be substituted and may be a polymer such as a dimer, trimer or tetramer.

A partial structure of the phthalic acid ester may incorporated as a part of a polymer structure, regularly in a polymer structure as a polymer pendant, or in a part of the molecular structure of additives such as an antioxidant and an acid scavenger.

Of the ester plasticizers formed from the polycarboxylic acid and the monohydric alcohol, alkyl dicarboxylic acid alkyl esters are preferred, and typical examples thereof include the foregoing dioctyl adipate.

As other plasticizers used in the invention, there are mentioned a phosphoric acid ester plasticizer and a carbohydrate ester plasticizer.

Examples of the phosphoric acid ester plasticizer include alkyl phosphate such as triacetyl phosphate or tributyl phosphate; cycloalkyl phosphate such as tricyclopentyl phosphate or cyclohexyl phosphate; and aryl phosphate such as triphenyl phosphate, tricresyl phosphate, cresyl phenyl phosphate, octyl diphenyl phosphate, biphenyl biphenyl phosphate, trioctyl phosphate, tributyl phosphate, trinaphthyl phosphate, trixylyl phosphate or trisortho-biphenyl phosphate. These substituents may be the same or different, and may further have a substituent. An alkyl group, a cycloalkyl group and an aryl group may be mixed and the substituents combine with each other through a covalent bond.

Examples of the phosphoric acid ester plasticizer include alkylenebis(dialkyl phosphate) such as ethylenebis(dimethyl phosphate) or butylenebis(diethyl phosphate); alkylenebis(diaryl phosphate) such as ethylenebis(diphenyl phosphate) or propylenebis(dinaphthyl phosphate); arylenebis(dialkyl phosphate) such as phenylenebis(dibutyl phosphate) or biphenylenebis(dioctyl phosphate); and arylenebis(diaryl phosphate) such as phenylenebis(diphenyl phosphate) or naphthylenebis(ditolyl phosphate).

These substituents may be the same or different, and may further have a substituent. An alkyl group, a cycloalkyl group and an aryl group may be mixed and the substituents combine with each other through a covalent bond.

A partial structure of the phosphate may be incorporated in a part of a polymer structure, regularly in a polymer structure as a polymer pendant, or in a part of the molecular structure of additives such as an antioxidant and an acid scavenger. Among the above compounds, aryl phosphate or arylenebis(diaryl phosphate) is preferred, and triphenyl phosphate or phenylenebis(diphenyl phosphate) is more preferred.

Next, a carbohydrate ester plasticizer will be explained.

The carbohydrate means monosaccharide, disaccharide or trisaccharide in which saccharide is present in the form of pyranose or furanose (6-member ring or 5-member ring). Unlimited examples of the carbohydrate include glucose, saccharose, lactose, cellobiose, mannose, xylose, ribose, galactose, arabinose, fructose, sorbose, cellotriose and raffinose.

The carbohydrate ester indicates an ester compound obtained by dehydration condensation of a carbohydrate and a carboxylic acid, and specifically indicates an aliphatic carboxylic ester or an aromatic carboxylic ester.

Examples of the aliphatic carboxylic acid include acetic acid and propionic acid, and examples of the aromatic carboxylic acid include benzoic acid, toluic acid and anisic acid.

A carbohydrate has a different hydroxyl group number according to kinds thereof, and either a part of the hydroxyl group thereof may react with a carboxylic acid to form an ester compound or the whole hydroxyl group and react with a carboxylic acid to form an ester compound.

In the invention, it is preferred that the whole hydroxyl group reacts with a carboxylic acid to form an ester compound.

Preferred examples of the carbohydrate ester plasticizers include glucose pentaacetate, glucose pentapropionate, glucose pentabutyrate, saccharose octaacetate and saccharose octabenzoate. Saccharose octaacetate and saccharose octabenzoate are more preferred among them, and saccharose octabenzoate is still more preferred.

Exemplified compounds of these compounds will be shown below, but are not limited thereto.

MONOPET SB and MONOPET SOA produced by Dai-Ichi Seiyaku Kogyo Co., Ltd.

The addition amount of other plasticizers is ordinarily from 0.1 to 50 parts by weight, and preferably from 1 to 30 parts by weight, and more preferably from 3 to 15 parts by weight based on 100 parts by weight of cellulose ester.

The optical film preferably used in the invention preferably contain 1 to 25% by weight of an ester plasticizer formed from a polyhydric alcohol and a monocarboxylic acid or an ester plasticizer formed from a polycarboxylic acid and a monohydric alcohol. However, other plasticizers may be used in combination.

A plasticizer preferably used in the optical film of the invention is more preferably an ester plasticizer formed from a polyhydric alcohol and a monocarboxylic acid. An ester type plasticizer formed from a tri- or higher hydric alcohol and a monocarboxylic acid is most preferable, since it can be added to cellulose ester due to its high compatibility with the cellulose ester, and when used in combination with other plasticizers or additives, its bleeding-out is minimized which renders it easy to use in combination with other plasticizers or additives.

The cellulose ester optical film of the invention, when colored, results in an adverse effect for optical use. The yellowing degree (yellow index, YI) of the film is preferably 3.0 or less, and more preferably 1.0 or less. The yellowing degree can be measured according to JIS-K7103.

Similarly to the afore-mentioned cellulose ester, the plasticizer preferably removes impurities such as residual acids, inorganic salts and organic low-molecules which were carried-in from the production stage or generated during storage, and the purity thereof is preferably not less than 99%. Residual acids and water are each preferably 0.01 to 100 ppm, whereby thermal deterioration is restrained in melt-casting a cellulose resin, resulting in enhancements of film formation stability and optical and mechanic properties of the film.

(Antioxidant)

The optical film of the invention can contain an antioxidant in order to prevent deterioration of the optical film itself, a polarizing film or a liquid crystal display. To the optical film is preferably added a carbon radical trapping agent, a phenol compound or a phosphorous-containing compound each described later.

(Carbon Radical Trapping Agent)

The carbon radical trapping agent implies a compound having a group (for example, an unsaturated group such as a double bond or a triple bond) capable of rapidly reacting with a carbon radical and providing a stable product such that after its addition reaction a subsequent reaction such as polymerization does not occur. As the carbon radical trapping agent, a compound having a radical polymerization inhibiting ability such as a compound having in the molecule a group (an unsaturated group such as (meth)acryloyl group or an allyl group) rapidly reacting with a carbon radical, a phenol compound or a lactone compound is useful, and a compound represented by formula (4) or (5) below is preferred.

Formula (4)

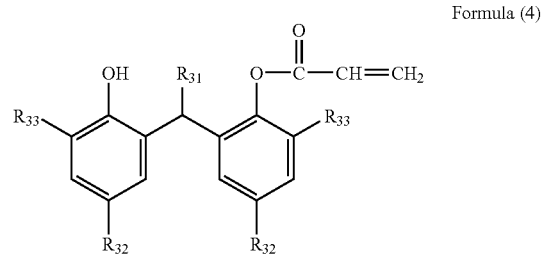

In formula (4), $R_{31}$ represents a hydrogen atom or an alkyl group having a carbon atom number of from 1 to 10. $R_{31}$ represents preferably a hydrogen atom or an alkyl group having a carbon atom number of from 1 to 4, and more preferably a hydrogen atom or a methyl group. $R_{32}$ and $R_{33}$ independently represent an alkyl group having a carbon atom number of from 1 to 8, and the alkyl may be straight-chained, branched or cyclic. $R_{32}$ and $R_{33}$ are preferably a quaternary carbon atom-containing group represented by the following formula,

wherein * represents the site bonding the aromatic (benzene) ring and R' represents an alkyl group having a carbon atom number of from 1 to 5. $R_{32}$ is preferably a tert-butyl group, a tert-amyl group, or a tert-octyl group. $R_{13}$ is preferably a tert-butyl group, or a tert-amyl group. Typical examples of the compound represented by formula (1) above include "SUMILIZER GM" (trade name), "SUMILIZER GS" (trade name), each being available from Sumitomo Chemical Co., Ltd. Next, examples of the compound represented by formula (4) will be listed below, but are not limited thereto.

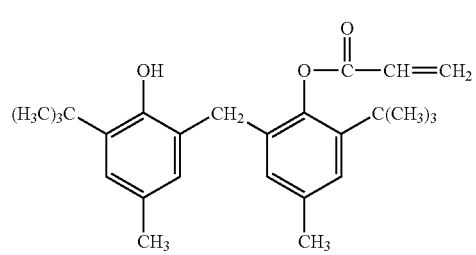
(4)-1

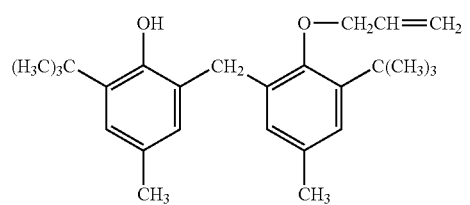
(4)-2

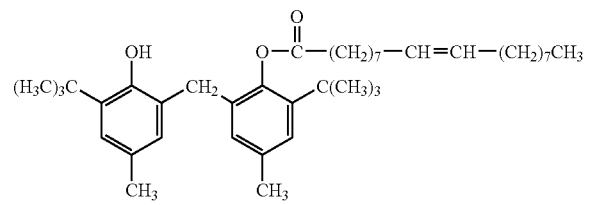
(4)-3

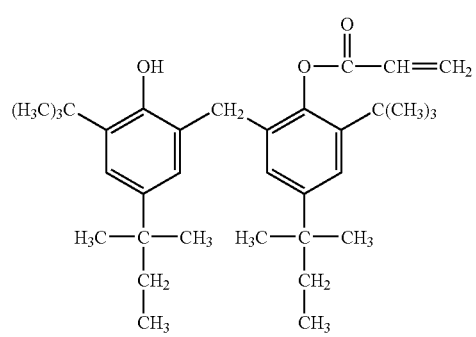
(4)-4

-continued

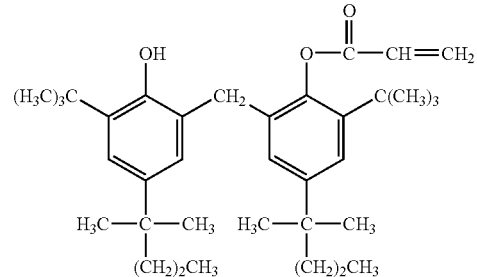
(4)-5

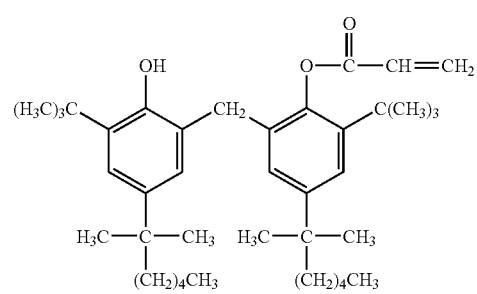
(4)-6

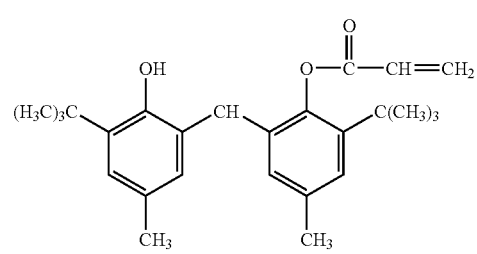
(4)-7

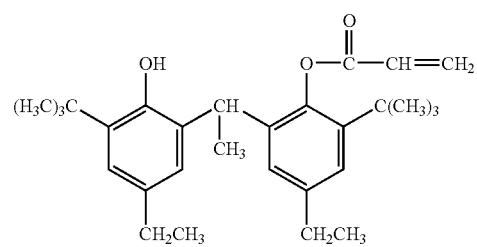
(4)-8

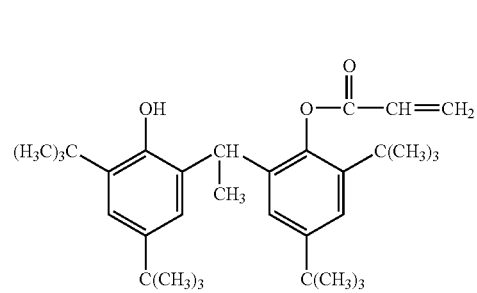
(4)-9

(4)-10
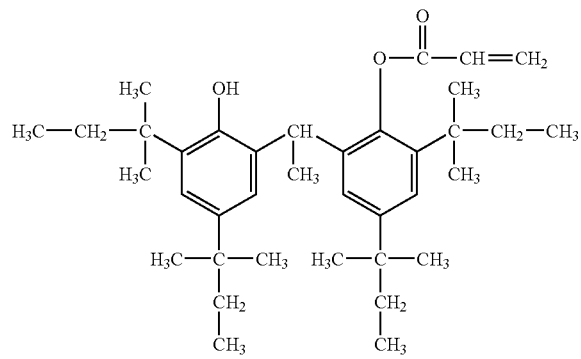
(4)-11
(4)-12
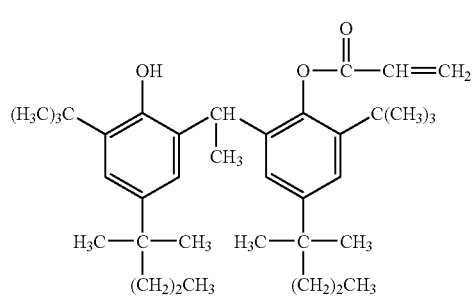
(4)-13
(4)-14
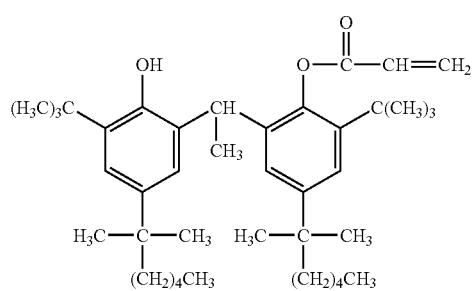
(4)-15
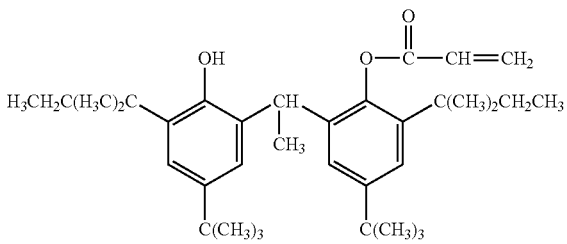
(4)-16
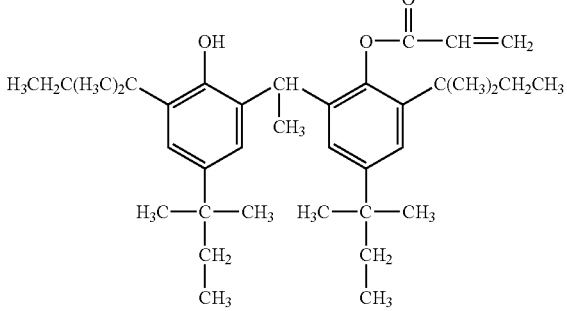
(4)-17
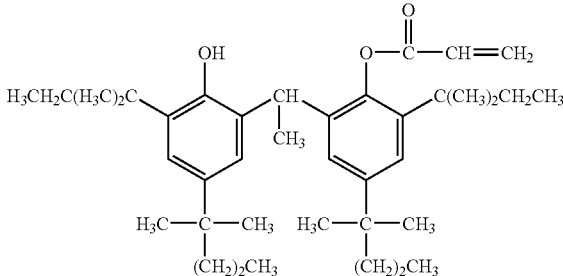
(4)-18
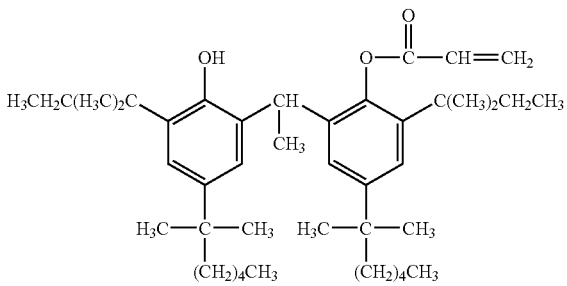
Formula (5)
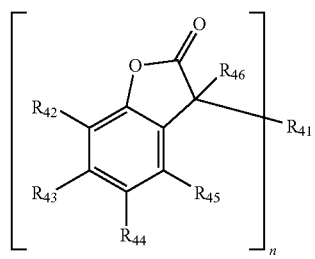
In formula (5), $R_{42}$ through $R_{45}$ independently represent a hydrogen atom or a substituent. Examples of the substituent represented by formula $R_{42}$ through $R_{45}$ are not particularly restricted, and include an alkyl group (for example, a methyl group, an ethyl group, a propyl group, an isopropyl group, a t-butyl group, a pentyl group, a hexyl group, an octyl group, a dodecyl group, or a trifluoromethyl group), a cycloalkyl group (for example, a cyclopentyl group or a cyclohexyl group), an aryl group (for example, a phenyl group, or a naphthyl group), an acylamino group (for example, an acetylamino group, or a benzoylamino group), an alkylthio group (for example, a methylthio group, or an ethylthio group), an arylthio group (for example, a phenylthio group or a naphthylthio group), an alkenyl group (for example, a vinyl group, 2-propenyl group, a 3-butenyl group, a 1-methyl-3-propenyl group, a 3-pentenyl group, a 1-methyl-3-butenyl group, a 4-hexenyl group or a cyclohexenyl group), a halogen atom (for example, fluorine, chlorine, bromine, iodine), an alkinyl group (for example, a propargyl group), a heterocyclic group (for example, pyridyl group, a thiazolyl group, an oxazolyl group or an imidazolyl group), an alkylsulfonyl group (for example, a methylsulfonyl group or an ethylsulfonyl group), an arylsulfonyl group (for example, a phenylsulfonyl group or a naphthylsulfonyl group), an alkylsulfinyl group (for example, a methylsulfinyl group), an arylsulfonyl group (a phenylsulfinyl group), a phosphono group, an acyl group (for example, an acetyl group, a pivaloyl group or a benzoyl group), a carbamoyl group (for example, an aminocarbonyl group, a methylaminocarbonyl group, a dimethylaminocarbonyl group, a butylaminocarbonyl group, a cyclohexylaminocarbonyl group, a phenylaminocarbonyl group, or a 2-pyridylaminocarbonyl group), a sulfamoyl group (for example, an aminosulfonyl group, a methylaminosulfonyl group, a dimethylaminosulfonyl group, a butylaminosulfonyl group, a hexylaminosulfonyl group, a cyclohexylaminosulfonyl group, an octylaminosulfonyl group, a dodecylaminosulfonyl group, a phenylaminosulfonyl group, a naphthylaminosulfonyl group or a 2-pyridylaminosulfonyl group), a sulfonamide group (for example, a methanesulfonamide group or a benzene sulfonamide group), a cyano group, an alkoxy group (for example, a methoxy group, an ethoxy group, or a propoxy group), an acyloxy group (for example, a phenoxy group or a naphthyloxy group), a heterocycle oxy group, a siloxy group, an acyloxy group (for example, an acetyloxy group, or a benzoyloxy group), a sulfonic acid group, a sulfonate group, an aminocarbonyloxy group, an amino group (for example, an amino group, an ethylamino group, a dimethylamino group, a butylaminocarbonyl group, a cyclopentylamino group, a 2-ethylhexylamino group, or a dodecylamino group), an anilino group (for example, a phenylamino group, a chlorophenylamino group, a toluidino group, an anisidino group, a naphthylamino group or a 2-pyridylamino group), an imino group, a ureido group (for example, a methylureido group, an ethylureido group, a pentylureido group, a cyclohexylureido group, an octylureido group, a dodecylureido group, a phenylureido group, a naphthylureido group, or a 2-pyridylureido group), an alkoxycarbonylamino group (for example, a methoxycarbonylamino group, or a phenoxycarbonylamino group), an alkoxycarbonyl group (for example, a methoxycarbonyl group an ethoxycarbonyl group, or a phenoxycarbonyl group), an aryloxycarbonyl group (for example, a phenoxycarbonyl group), a heterocyclicthio group, a thioureido group, a carboxyl group, a salt of carboxylic acid group, a hydroxyl group, a mercapto group, and a nitro group. These substituents may further have the substituent as described above.

In the formula (5), $R_{46}$ represents a hydrogen atom or a substituent, and the substituent represented by $R_{46}$ is is the same as those denoted above in $R_{42}$ through $R_{45}$.

In the formula (5), n is 1 or 2.

When n is 1, $R_{41}$ represents a substituent, and when n is 2, $R_{41}$ represents a divalent linkage group. When $R_{41}$ represents a substituent, the substituent is the same as those denoted above in $R_{42}$ through $R_{45}$.

When $R_{41}$ represents a divalent linkage group, the divalent linkage group represents an alkylene group which may have a substituent, an oxygen atom, a nitrogen atom, a sulfur atom or their combination.

In the formula (5), n is preferably 1. Next, examples of the compound represented by formula (4) will be listed below, but are not limited thereto.

Next, examples of the compound represented by formula (5) will be listed below, but are not limited thereto.

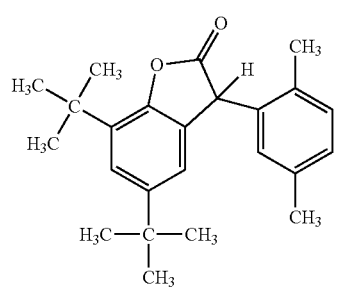

(5)-1

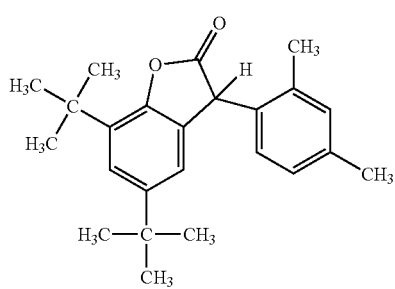

(5)-2

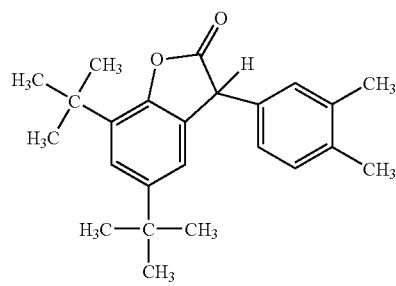

(5)-3

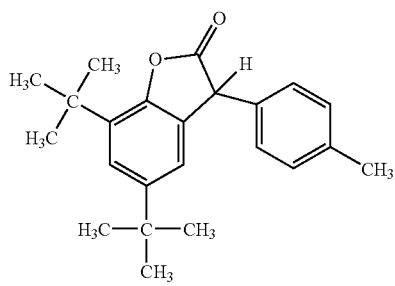

(5)-4

-continued
(5)-5
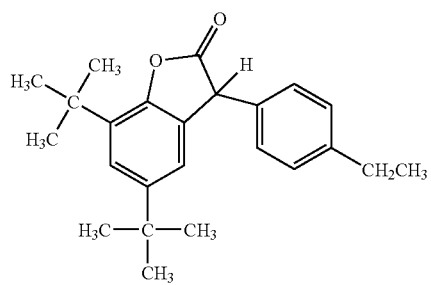
(5)-6
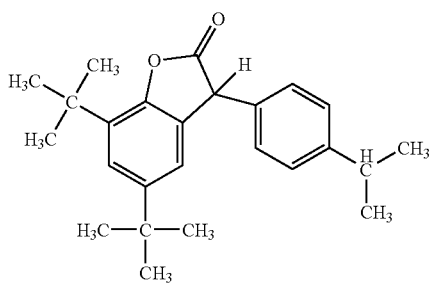
(5)-7
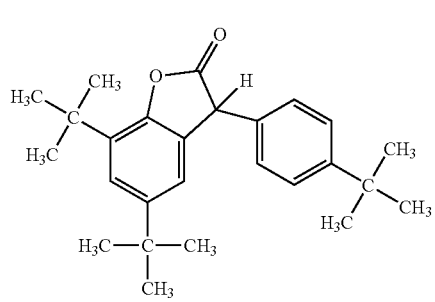
(5)-8
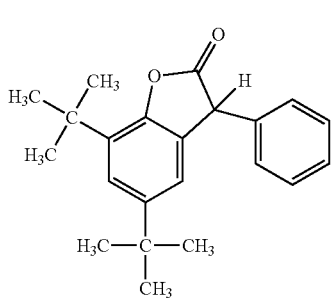
(5)-9
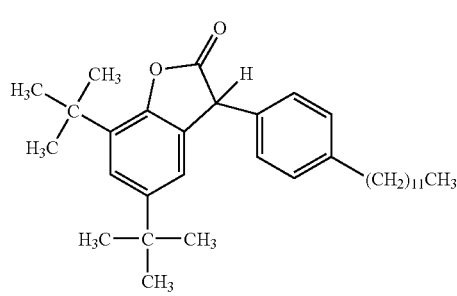
(5)-10
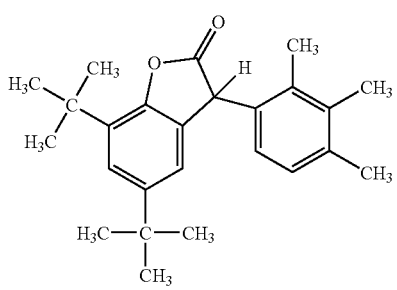
(5)-11
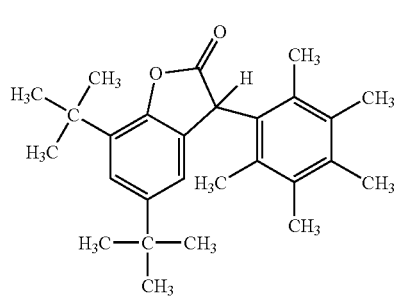
(5)-12
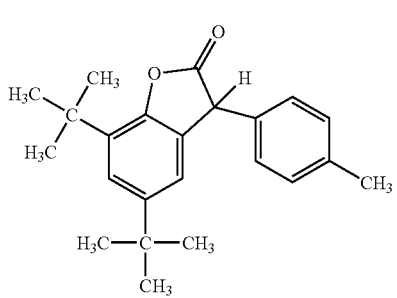
(5)-13
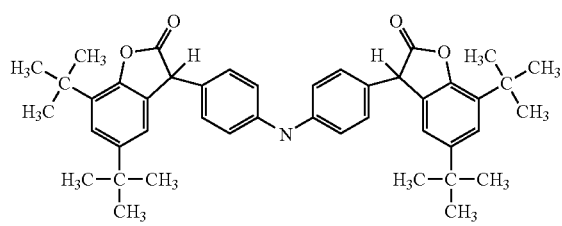
(5)-14
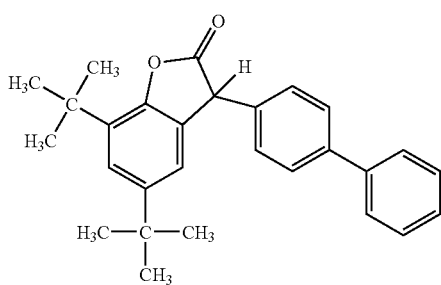

-continued
(5)-15
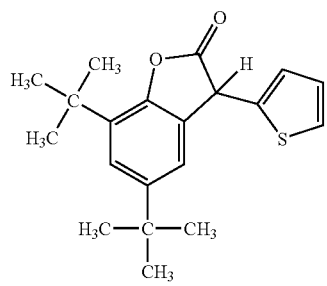
(5)-16
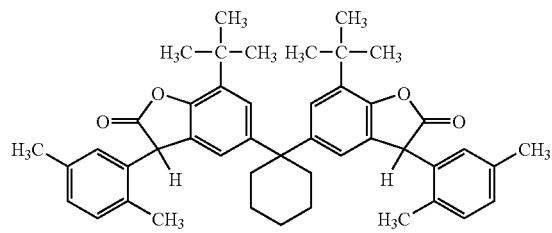
(5)-17
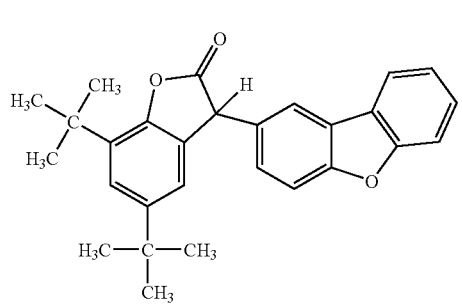
(5)-18
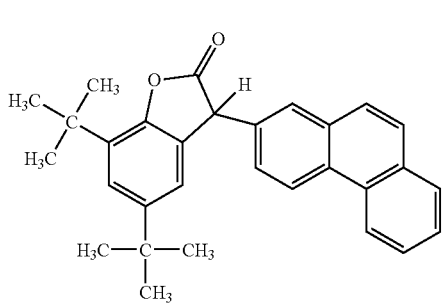
(5)-19
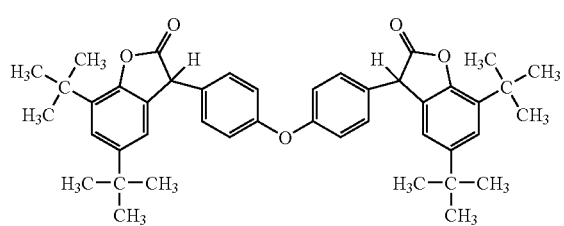
(5)-20
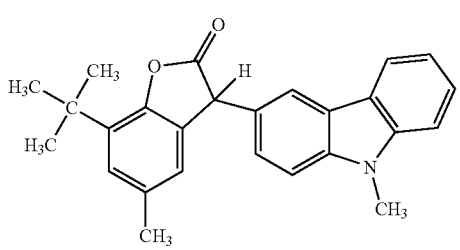
(5)-21
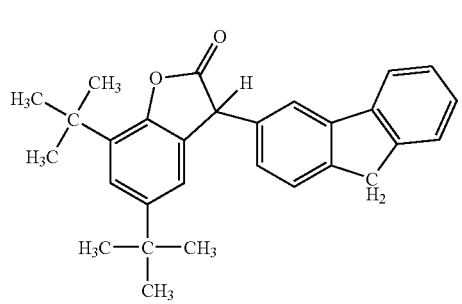
(5)-22
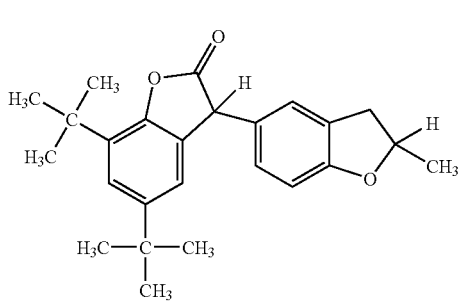
(5)-23
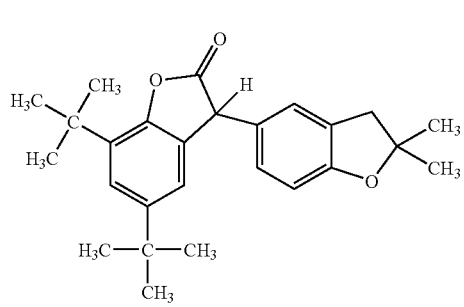
(5)-24
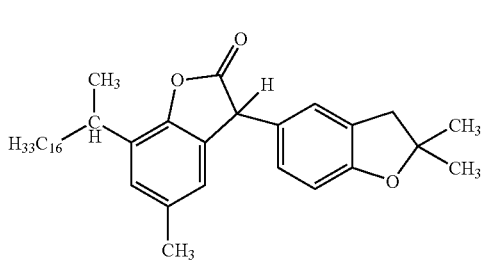

-continued
(5)-25 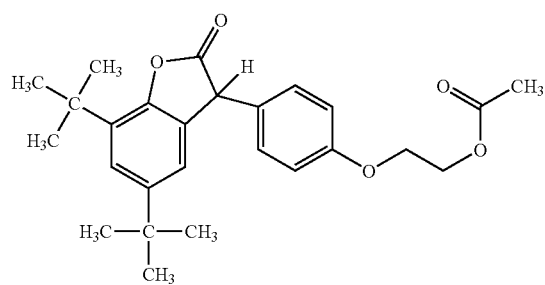
(5)-26 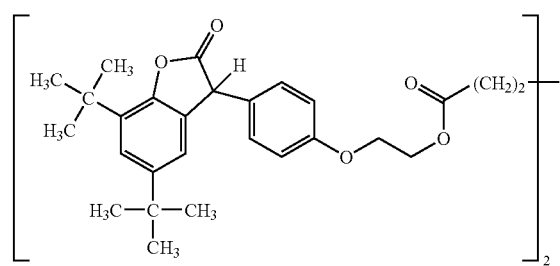
(5)-27 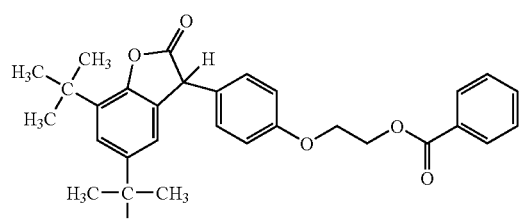
(5)-28 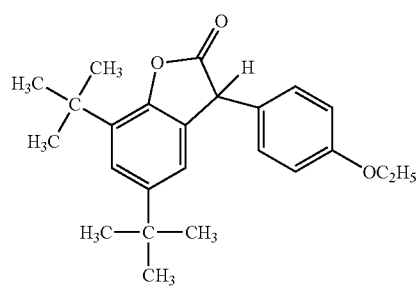
(5)-29 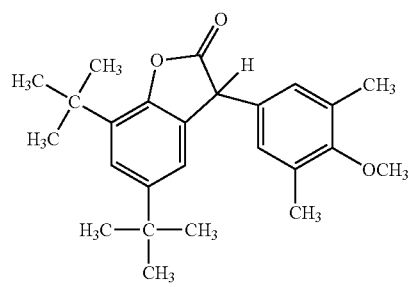
(5)-30 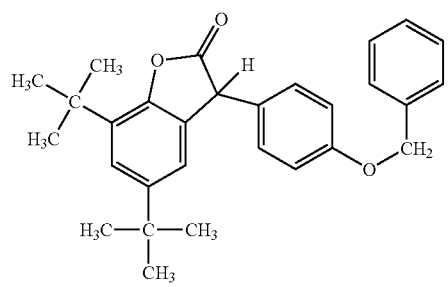
(5)-31 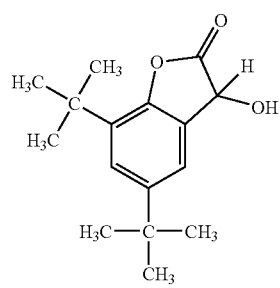
(5)-32 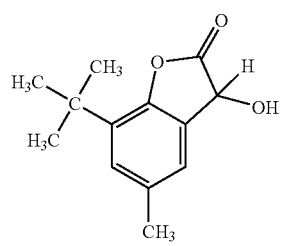
(5)-33 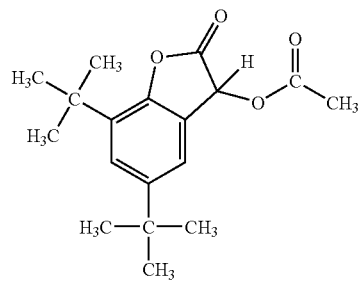
(5)-34 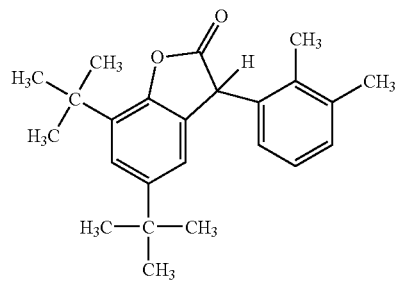

-continued
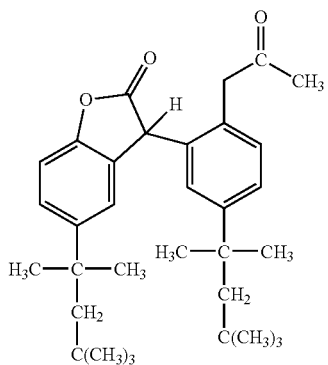
(5)-35
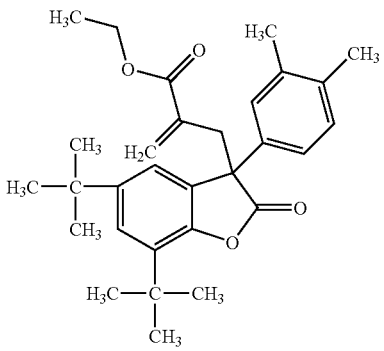
(5)-36
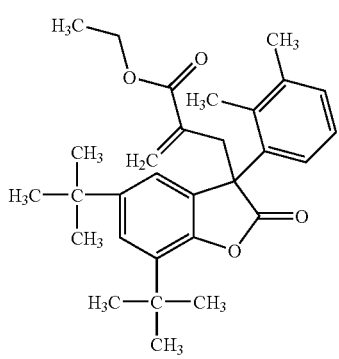
(5)-37
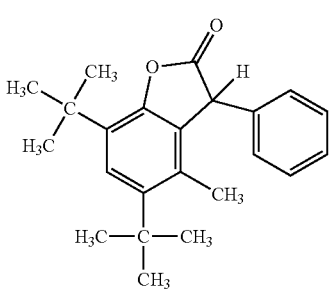
(5)-38
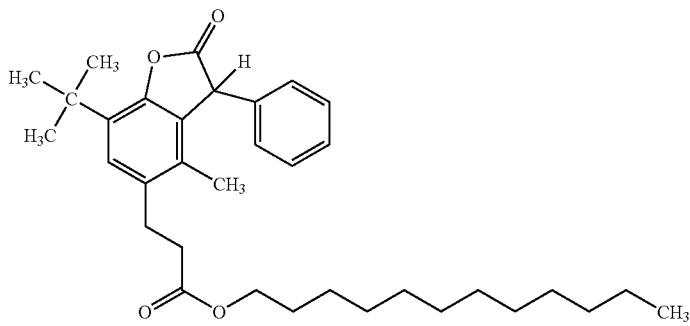
(5)-39
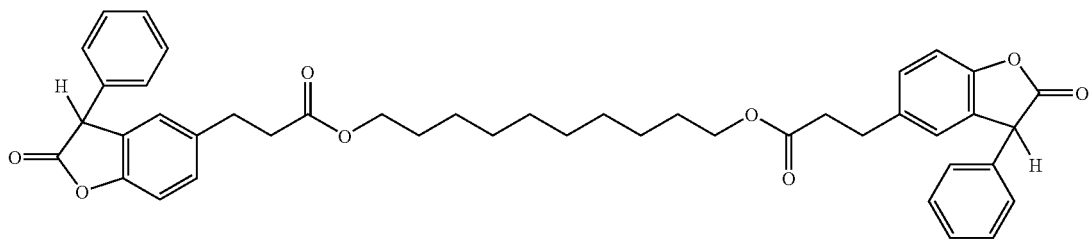
(5)-40
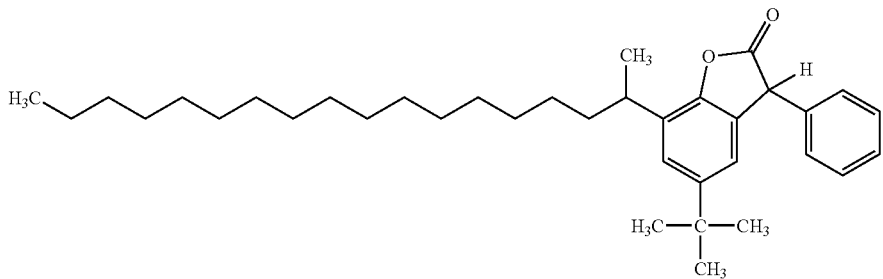
(5)-41

-continued
(5)-42
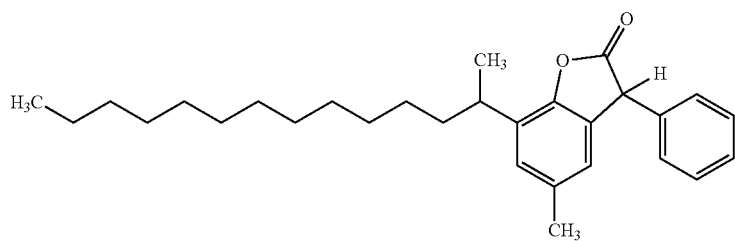
(5)-43
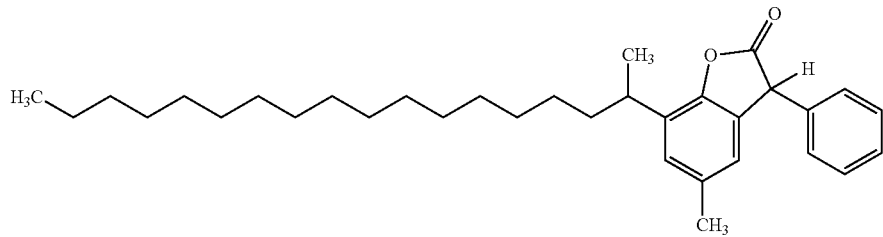
(5)-44
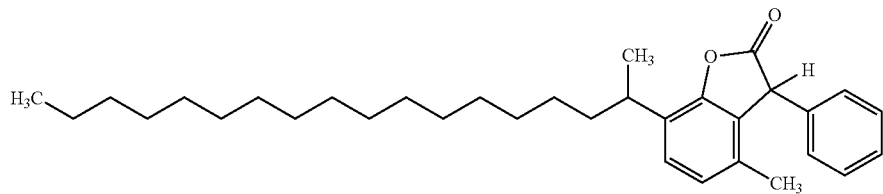
(5)-45
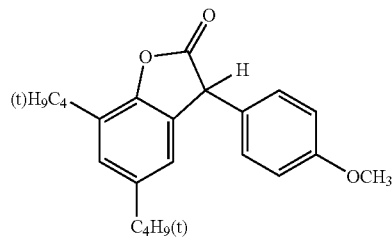
(5)-46
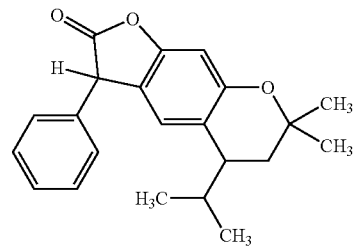
(5)-47
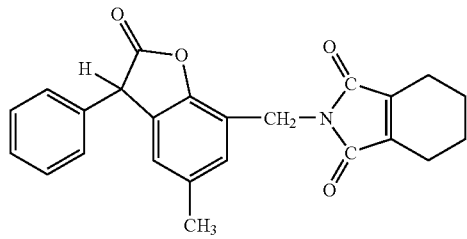
(5)-48
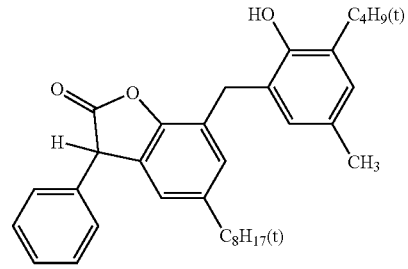
(5)-49
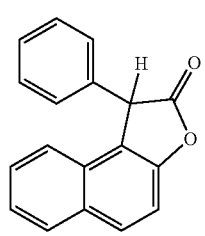
(5)-50
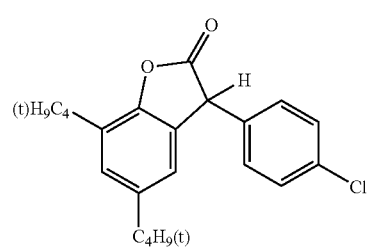

(5)-51

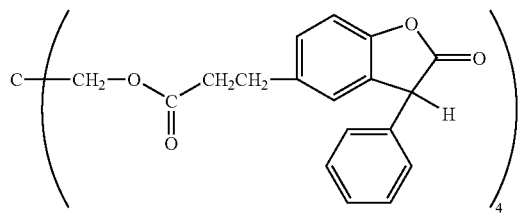

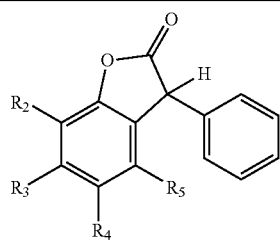

| Compound No. | $R_2$ | $R_3$ | $R_4$ | $R_5$ |
|---|---|---|---|---|
| (5)-52 | —$CH_3$ | —H | —$C_4H_9$(s) | —H |
| (5)-53 | —$C_4H_9$(s) | —H | —$C_4H_9$(t) | —H |
| (5)-54 | —$C_4H_9$(s) | —H | —$C_5H_{11}$(t) | —H |
| (5)-55 | —$C_5H_{11}$(t) | —H | —$C_5H_{11}$(t) | —H |
| (5)-56 | —$C_4H_9$(t) | —H | —$C_5H_{11}$(t) | —H |
| (5)-57 | —$C_4H_9$(s) | —H | —$C_4H_9$(s) | —H |
| (5)-58 | —$C_4H_9$(t) | —H | —$(CH_2)_2CO_2C_8H_{17}$(n) | —H |
| (5)-59 | —$C_4H_9$(t) | —H | —$(CH_2)_2CO_2C_8H_{17}$(i) | —H |
| (5)-60 | —$C_4H_9$(t) | —H | —$(CH_2)_2CO_2(CH_2)_2OC_4H_9$(n) | —H |
| (5)-61 | —$C_{12}H_{25}$ | —H | —$CH_3$ | —H |
| (5)-62 | —$C_8H_{17}$ | —H | —$CH_3$ | —H |
| (5)-63 | —$C_{16}H_{33}$ | —H | —$CH_3$ | —H |
| (5)-64 | —$C_{24}H_{49}$ | —H | —$CH_3$ | —H |
| (5)-65 | —$C_4H_9$(t) | —H | —Cl | —H |
| (5)-66 | —$C_4H_9$(t) | —H | —$OCH_3$ | —H |
| (5)-67 | —$C_4H_9$(t) | —H | —O—$C_8H_{17}$(n) | —H |
| (5)-68 | (2,4,4-trimethylpentan-2-yl) | —H | (2,4,4-trimethylpentan-2-yl) | —H |
| (5)-69 | —H | —H | —$OC_4H_9$(n) | —H |
| (5)-70 | —H | —H | —$OCH_3$ | —H |
| (5)-71 | —H | —H | —$CH_3$ | —H |
| (5)-72 | —H | —H | —$C_4H_9$(t) | —H |
| (5)-73 | —H | —H | —$C_5H_{11}$(t) | —H |
| (5)-74 | —H | —H | —$C_8H_{17}$(t) | —H |
| (5)-75 | —$C_4H_9$(t) | —H | —$CH_3$ | —H |
| (5)-76 | (2,4,4-trimethylpentan-2-yl) | —H | —$C_8H_{17}$(t) | —H |
| (5)-77 | (2,4,4-trimethylpentan-2-yl) | —H | —$C_9H_{19}$ | —H |

-continued

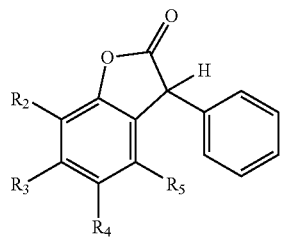

| Compound No. | R₂ | R₃ | R₄ | R₅ |
|---|---|---|---|---|
| (5)-78 | H₃C–C(CH₃)₂–CH₂–C(CH₃)₂–CH₃ (1,1,3,3-tetramethylbutyl) | —H | —C₁₂H₂₅ | —H |
| (5)-79 | H₃C–C(CH₃)₂–CH₂–C(CH₃)₂–CH₃ | —H | —(CH₂)₂CO₂C₈H₁₇(n) | —H |
| (5)-80 | —H | —H | H₃C–C(CH₃)₂–CH₂–C(CH₃)₂–CH₃ | —H |
| (5)-81 | —H | —O—C₈H₁₇(n) | —H | —H |
| (5)-82 | —H | —O—C₈H₁₇(n) | —H | —H |
| (5)-83 | —H | —NHCOC₄H₉(n) | —H | —H |
| (5)-84 | —H | —O—C₈H₁₇(n) | —Cl | —H |
| (5)-85 | —CH₃ | —O—C₈H₁₇(n) | —H | —H |
| (5)-86 | —CH₃ | —O—C₈H₁₇(i) | —H | —Cl |
| (5)-87 | —H | —O—C₈H₁₇(n) | —H | —Cl |
| (5)-88 | —H | —N(CH₃)₂ | —H | —H |
| (5)-89 | —NH–C(=O)–C₆H₅ | —H | —C₈H₁₇(t) | —H |
| (5)-90 | —H | —CH₃ | —CH₃ | —H |
| (5)-91 | —H | —H | —(CH₂)₂OH | —H |
| (5)-92 | —H | —H | —(CH₂)₂OCOC₇H₁₅(n) | —H |
| (5)-93 | —H | —H | —(CH₂)₃OH | —H |
| (5)-94 | —C₄H₉(t) | —H | —(CH₂)₂OH | —H |
| (5)-95 | —C₄H₉(t) | —H | —(CH₂)₂OCOCH₃ | —H |
| (5)-96 | —H | —O(CH₂)₂OH | —C₄H₉(t) | —H |
| (5)-97 | —H | —H | —C₃H₇(i) | —H |
| (5)-98 | —H | —O(CH₂)₂OCH₃ | —H | —H |
| (5)-99 | —OC₂H₅ | —H | —H | —H |
| (5)-100 | —H | —H | —O—CH(C₆H₅)H (benzyloxymethyl, —O—CH(H)—C₆H₅) | —H |
| (5)-101 | —H | —H | —C₆H₅ | —H |
| (5)-102 | —Cl | —H | —Cl | —H |

-continued

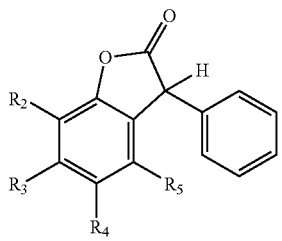

| Compound No. | R$_2$ | R$_3$ | R$_4$ | R$_5$ |
|---|---|---|---|---|
| (5)-103 | —H | —Cl | —Cl | —H |
| (5)-104 | —C$_4$H$_9$(t) | —H | —H | —H |
| (5)-105 | —H | —H | —F | —H |
| (5)-106 | —H | —H | —CN | —H |
| (5)-107 | —CH$_3$ | —H | —CH$_3$ | —H |
| (5)-108 | —OCH$_3$ | —H | —C$_2$H$_5$ | —H |
| (5)-109 | —H | —H | —COCH$_3$ | —H |
| (5)-110 | —H | —H | —CO$_2$C$_4$H$_9$(n) | —H |
| (5)-111 | —H | —H | —O—C$_6$H$_5$ (phenoxy) | —H |
| (5)-112 | —H | —H | —CH$_2$OH | —H |
| (5)-113 | —H | —H | —CH$_2$OH | —H |
| (5)-114 | —H | —H | —SO$_2$C$_8$H$_{17}$(i) | —H |
| (5)-115 | —H | —C$_{15}$H$_{31}$(n) | —H | —H |
| (5)-116 | —C$_9$H$_{19}$ | —H | —C$_9$H$_{19}$ | —H |
| (5)-117 | —CF$_3$ | —H | —H | —H |
| (5)-118 | —CH(H)(C$_6$H$_5$) | —H | —Cl | —H |
| (5)-119 | —H | —H | —C$_6$H$_{11}$ (cyclohexyl) | —H |
| (5)-120 | —H | —C$_4$H$_9$(t) | —H | —C$_4$H$_9$(t) |
| (5)-121 | —H | —H | —NHC(O)—C$_6$H$_4$—C(CH$_3$)$_3$ | —H |
| (5)-122 | —H | —H | —H | —H |
| (5)-123 | —H | —C$_4$H$_9$(t) | —H | —H |
| (5)-124 | —H | —CH$_3$ | —H | —CH$_3$ |
| (5)-125 | —H | —H | —(CH$_2$)$_2$CO$_2$C$_{18}$H$_{35}$(n) | —H |
| (5)-126 | —C$_4$H$_9$(t) | —H | —H | —C$_4$H$_9$(t) |
| (5)-127 | —H | —CH$_3$ | —H | —H |
| (5)-128 | —C$_6$H$_5$ | —H | —H | —H |
| (5)-129 | —H | —OCH$_3$ | —H | —H |
| (5)-130 | —H | —OH | —H | —H |
| (5)-131 | —H | —OCOC$_{17}$H$_{35}$ | —H | —H |
| (5)-132 | —H | —OH | —C(O)C$_6$H$_5$ | —H |
| (5)-133 | —C$_8$H$_{17}$(t) | —H | —C$_8$H$_{17}$(t) | —H |

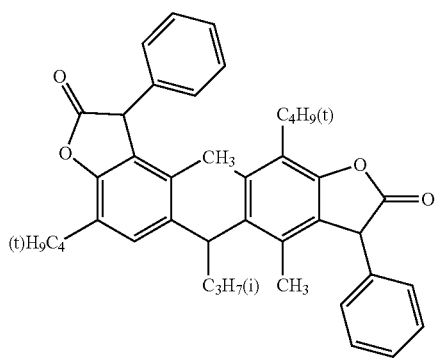
(5)-134
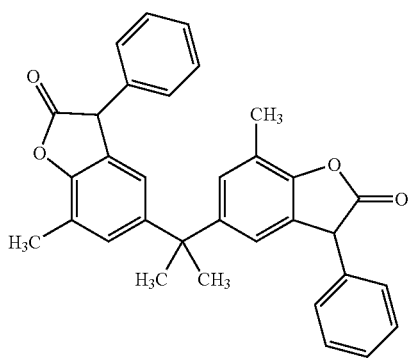
(5)-135
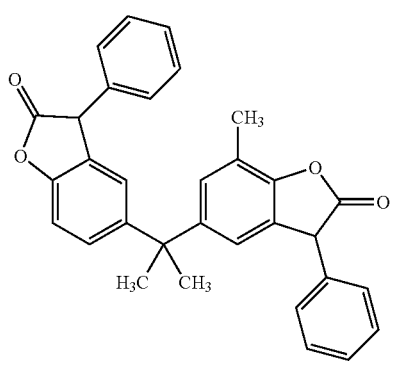
(5)-136
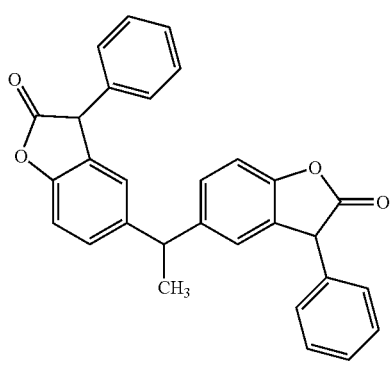
(5)-137
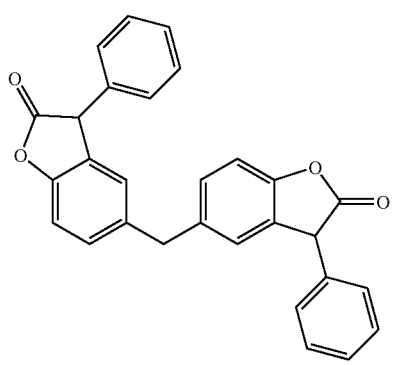
(5)-138
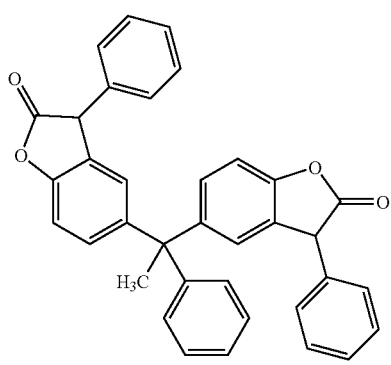
(5)-139
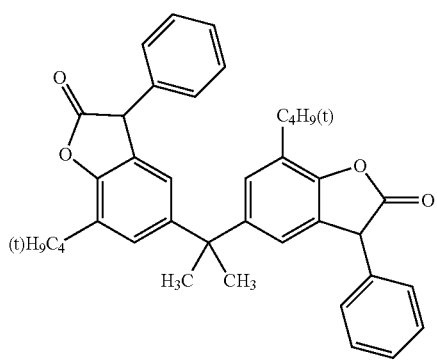
(5)-140
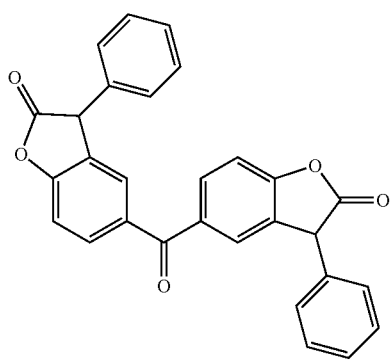
(5)-141

-continued
(5)-142
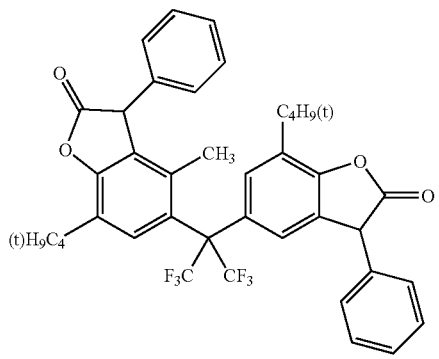
(5)-143
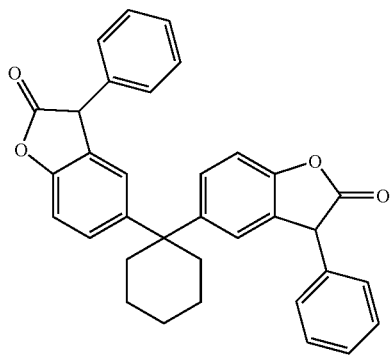
(5)-144
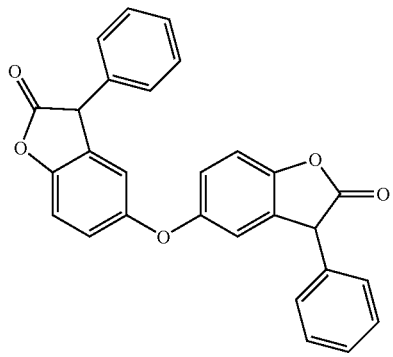
(5)-145
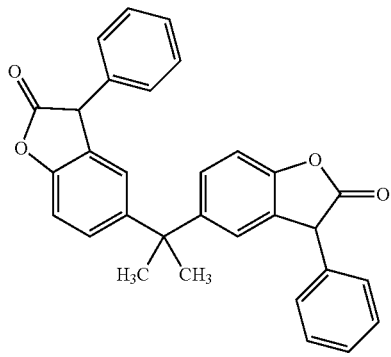
(5)-146
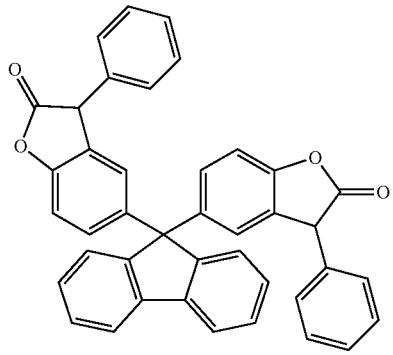
(5)-147
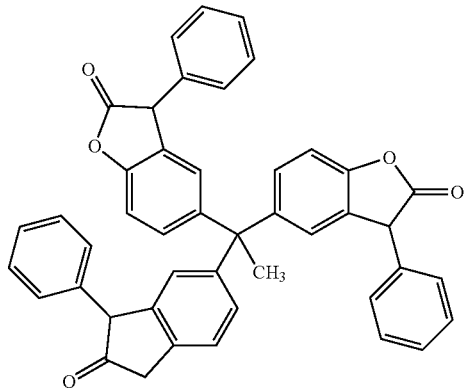
(5)-148
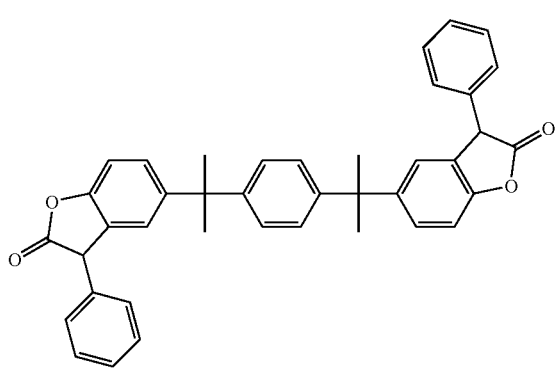
(5)-149
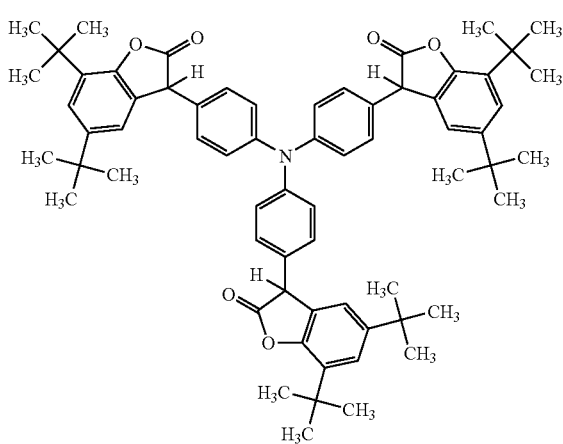

(5)-150

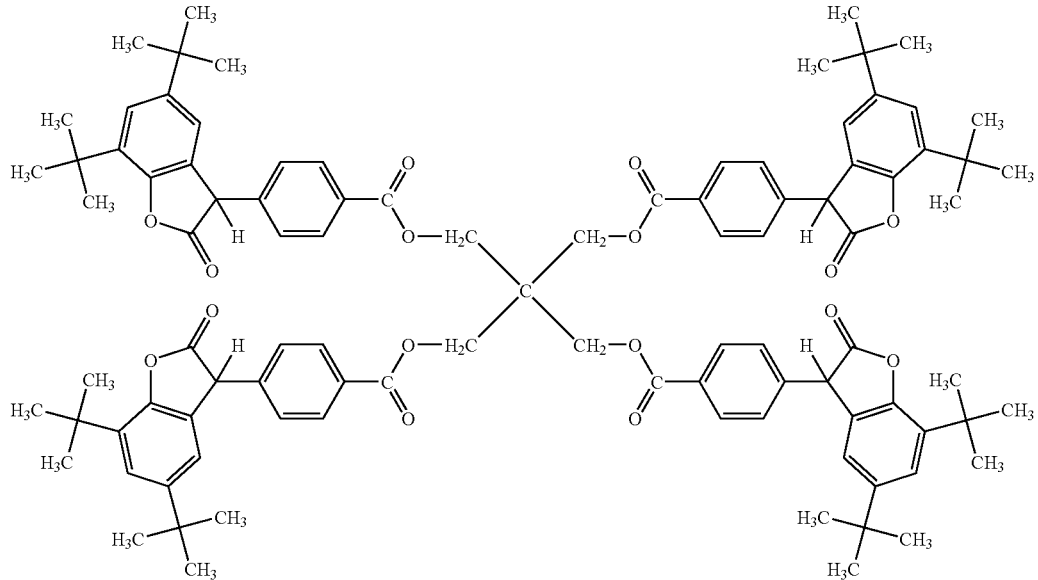

These carbon radical trapping agents may be used singly or as an admixture of two or more kinds thereof. The addition amount of the carbon radical trapping agent is appropriately selected unless effects of the invention are jeopardized, and is ordinarily from 0.001 to 10.0 parts by weight, preferably from 0.01 to 5.0 parts by weight, and more preferably from 0.1 to 1.0 parts by weight, based on 100 parts by weight of cellulose ester.

(Phenol Compound)

A phenol type compound used in the invention is preferably a 2,6-dialkylphenol derivative such as those compounds as disclosed, for example, in columns 12 to 14 of U.S. Pat. No. 4,839,405, and more preferably a compound represented by formula (6) below.

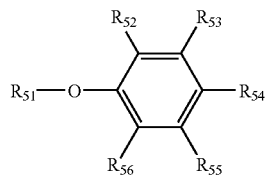

Formula (6)

In Formula (6), $R_{51}$ through $R_{56}$ independently represent a hydrogen atom or a substituent. Examples of the substituent include a halogen atom (for example, a fluorine atom and a chlorine atom), an alkyl group (for example, a methyl group, an ethyl group, an isopropyl group, a hydroxyethyl group, a methoxy methyl group, a trifluoro methyl group and a t-butyl group), a cycloalkyl group (for example, a cyclopentyl group and a cyclohexyl group), an aralkyl group (for example, a benzyl group and a 2-phenethyl group), an aryl group (for example, a phenyl group, a naphthyl group, p-tolyl group and a p-chlorophenyl group), an alkoxy group (for example, a methoxy group, an ethoxy group, an isopropoxy group and a butoxy group), an aryloxy groups (for example, a phenoxy group), a cyano group, an acylamino group (for example, an acetylamino group and a propionylamino group), an alkylthio group (for example, a methylthio group, an ethylthio group and a butylthio group), an arylthio group (for example, a phenylthio group), a sulfonylamino group (for example, a methanesulfonylamino group and a benzene sulfonyl amino group), an ureido group (for example, a 3-methylureido group, a 3,3-dimethylureido group and a 1,3-dimethylureido group), a sulfamoylamino group (for example, a dimethylsulfamoyl amino group), a carbamoyl group (for example, a methylcarbamoyl group, an ethylcarbamoyl group and a dimethylcarbamoyl group), a sulfamoyl group (for example, an ethylsulfamoyl group and a dimethylsulfamoyl group), an alkoxycarbonyl group (for example, a methoxycarbonyl group and an ethoxycarbonyl group), an aryloxycarbonyl group, (for example, a phenoxycarbonyl group), a sulfonyl group (for example, a methanesulfonyl group, a butane sulfonyl group and a phenylsulfonyl group), an acyl group (for example, an acetyl group, a propanoyl group and a butyroyl group), an amino group (for example, a methylamino group, an ethylamino group and a dimethylamino group), a cyano group, a hydroxy group, a nitro group, a nitroso group, an amine oxide group (for example, a pyridine oxide group), an imide group (for example, a phthalimide group), disulfide group (for example, a benzene disulfide group and a benzothiazolyl-2-disulfide group), a carboxyl group, a sulfo group and a heterocycle group (for example, a pyrrole group, a pyrrolidyl group, a pyrazolyl group, an imidazolyl group, a pyridyl group, a benzimidazolyl group, a benzthiazolyl group and a benzoxazolyl group). These substituents may be further substituted.

Further, a phenol compound, in which $R_{51}$ is a hydrogen atom, and $R_{52}$ and $R_{66}$ each are a t-butyl group, is preferable.

Typical examples of the phenol compound include n-octadecyl 3-(3,5-di-t-butyl-4-hydroxyphenyl)-propionate, n-octadecyl 3-(3,5-di-t-butyl-4-hydroxyphenyl)-acetate, n-octadecyl 3,5-di-t-butyl-4-hydroxybenzoate, n-hexyl 3,5-di-t-butyl-4-hydroxyphenylbenzoate, n-dodecyl 3,5-di-t-butyl-4-hydroxyphenylbenzoate, neo-dodecyl 3-(3,5-di-t-butyl-4-hydroxyphenyl)propionate, dodecyl β-(3,5-di-t-butyl-4-hydroxyphenyl) propionate, ethyl α-(4-hydroxy-3,5-di-t-butyl phenyl) iso butyrate, octadecyl α-(4-hydroxy-3,5-di-t-butyl phenyl) iso butyrate, octadecyl α-(4-hydroxy-3,5-di-t-butyl-4-hydroxy-phenyl) propionate, 2-(n-octylthio)ethyl 3,5-di-t-butyl-4-hydroxy-benzoate, 2-(n-octylthio)ethyl 3,5-di-t-butyl-4-hydroxyphenylacetate, 2-(n-octadecylthio) ethyl 3,5-di-t-butyl-4-hydroxyphenyl acetate, 2-(n-octadecylthio) ethyl 3,5-di-t-butyl-4-hydroxybenzoate, 2-(2-hydroxyethylthio)ethyl 3,5-di-t-butyl-4-hydroxybenzoate, diethyl glycol bis-(3,5-di-t-butyl-4-hydroxy-phenyl)propionate, 2-(n-octadecylthio)ethyl 3-(3,5-di-t-butyl-4-hydroxyphenyl) propionate, stearylamido N,N-bis[ethylene 3-(3,5-di-t-butyl-4-hydroxyphenyl) propionate], n-butylimino N,N-bis-[ethylene 3-(3,5-di-t-butyl-4-hydroxyphenyl)propionate], 2-(2-stearoyloxyethylthio)ethyl 3,5-di-t-butyl-4-hydroxybenzoate, 2-(2-stearoyloxyethylthio)ethyl 7-(3-methyl-5-t-butyl-4-hydroxyphenyl)heptanoate, 1,2-poropylene glycol bis-[3-(3,5-di-t-butyl-4-hydroxyphenyl) propionate], ethylene glycol bis-[3-(3,5-di-t-butyl-4-hydroxyphenyl)propionate], neopentyl glycol bis-[3-(3,5-di-t-butyl-4-hydroxy-phenyl) propionate], ethylene glycol bis-(3,5-di-t-butyl-4-hydroxyphenyl) acetate, glycerol-1-n-octadecanoate-2,3-bis-(3,5-di-t-butyl-4-hydroxy-phenyl acetate), pentaerythrytol tetrakis[3-(3',5'-di-t-butyl-4'-hydroxyphenyl)propionate], 3,9-bis{2-[3-(3-t-butyl-4-hydroxy-5-methylphenyl)-propionyloxy]-1,1-dimethylethyl}-2,4,8,10-tetraoxaspiro[5.5]undecane, 1,1,1-trimethylolethane tris[3-(3,5-di-t-butyl-4-hydroxyphenyl) propionate], sorbitol hexa[3-(3,5-di-t-butyl-4-hydroxyphenyl)propionate], 2-hydroxyethyl 7-(3-methyl-5-t-butyl-4-hydroxyphenyl) propionate, 2-stearoyloxyethyl 7-(3-methyl-5-t-butyl-4-hydroxyphenyl)heptanoate, 1,6-n-hexanediol bis[(3',5'-di-t-butyl-4-hydroxyphenyl) propionate], and pentaerythrytol tetrakis(3,5-di-t-butyl-4-hydroxycinnamate). The hindered phenol compounds are available on the market, and there are, for example, IRGANOX 1076 and IRGANOX 1010 (trade name) from Ciba Specialty Chemicals Co., Ltd.

These phenol compounds may be used singly or as an admixture of two or more kinds thereof. The addition amount of the phenol compound is appropriately selected unless effects of the invention are jeopardized, and is ordinarily from 0.001 to 10.0 parts by weight, preferably from 0.05 to 5.0 parts by weight, and more preferably from 0.2 to 2.0 parts by weight, based on 100 parts by weight of cellulose ester.

(Phosphorus-Containing Compound)

As the phosphorus-containing compound used in the invention, a well-known one can be used. The preferred one is selected from the group consisting of a phosphite, a phosphinite, phosphinite and a tertiary phosphane. Preferred are those disclosed, for example, in Japanese Patent O.P.I. Publication No. 2002-138188, in paragraphs 0022 through 0027 of Japanese Patent O.P.I. Publication No. 2005-344044, in paragraphs 0023 through 0039 of Japanese Patent Publication No. 2004-182979, in Japanese Patent O.P.I. Publication Nos. 10-306175, 1-254744, 2-270892, 5-202078, 5-178870, 2004-504435, and 2004-530759, and in Japanese Patent Application No. 2005-353229.

A compound having in the molecule a substructure represented by Formula (C-1), (C-2), (C-3), (C-4) or (C-5) is preferably used as one of the preferable antioxidants in the present invention.

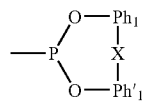

Formula (C-1)

In Formula above, $Ph_1$ and $Ph'_1$ each represent a substituent. Examples of the substituent are the same as those denoted in $R_{51}$ through $R_{56}$ in the Formula (6). More preferably, $Ph_1$ and $Ph'_1$ each represent a phenylene group, and the hydrogen atom of the phenylene group may be replaced with a phenyl group, an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_1$ and $Ph'_1$ may be the same or different. X represents a single bond, a sulfur atom, or a —$CHR_a$—group. $R_a$ represents a hydrogen atom, an alkyl group having a carbon atom number of from 1 to 8 or a cycloalkyl group having a carbon atom number of from 5 to 8. Further, these groups may be substituted with the substituents which are the same as those denoted in $R_{51}$ through $R_{56}$ in Formula (6).

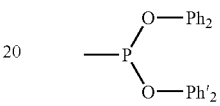

Formula (C-2)

In Formula above, $Ph_2$ and $Ph'_2$ each represent a substituent. Examples of the substituent are the same as those denoted in $R_{51}$ through $R_{56}$ in the Formula (6). More preferably, $Ph_2$ and $Ph'_2$ each represent a phenyl group or a biphenyl group, and the hydrogen atom of the phenyl group or the biphenyl group may be replaced with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_2$ and $Ph'_2$ may be the same or different. Further, these groups may be substituted with the substituents which are the same as those denoted in $R_{51}$ through $R_{56}$ in Formula (6).

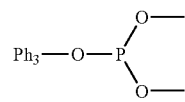

Formula (C-3)

In Formula above, $Ph_3$ represents a substituent. Examples of the substituent are the same as those denoted in $R_{51}$ through $R_{56}$ in the Formula (6). More preferably, $Ph_3$ represents a phenyl group or a biphenyl group, and the hydrogen atom of the phenyl group or the biphenyl group may be replaced with an alkyl group having 1 to 8 carbon atoms, a cycloalkyl group having 5 to 8 carbon atoms, an alkylcycloalkyl group having 6 to 12 carbon atoms, or an aralkyl group having 7 to 12 carbon atoms. $Ph_2$ and $Ph'_2$ may be the same or different. Further, these groups may be substituted with the substituents which are the same as those denoted in $R_{51}$ through $R_{56}$ in Formula (6).

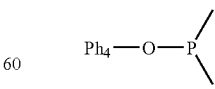

Formula (C-4)

In Formula above, $Ph_4$ represents a substituent. Examples of the substituent are the same as those denoted in $R_{51}$ through $R_{56}$ in the Formula (6). More preferably, $Ph_4$ represents an alkyl group having a carbon atom number of from 1 to 20 and a phenyl group, and the alkyl group and the phenyl group may be substituted with the substituents which are the same as those denoted in $R_{51}$ through $R_{56}$ in Formula (6).

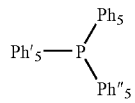

Formula (C-5)

In Formula above, $Ph_5$, $Ph'_5$, and $Ph''_5$ each represent a substituent. Examples of the substituent are the same as those denoted in $R_{51}$ through $R_{56}$ in the Formula (6). More preferably, $Ph_5$, $Ph'_5$, and $Ph''_5$ each represent an alkyl group having a carbon atom number of from 1 to 20 and a phenyl group, and the alkyl group and the phenyl group may be substituted with the substituents which are the same as those denoted in $R_{51}$ through $R_{56}$ in Formula (6).

Typical examples of the phosphorus-containing compound include: mono-phosphite compounds such as triphenyl phosphite, diphenylisodecyl phosphite, phenyldiisodecyl phosphite, tris(nonylphenyl) phosphite, tris(dinonylphenyl) phosphite, tris(2,4-di-t-butylphenyl) phosphite, 10-(3,5-di-t-butyl-4-hydroxybenzyl)-9,10-dihydro-9-oxa-10-phosphaphenanthrene-10-oxide, 6-[3-(3-t-butyl-4-hydroxy-5-methylphenyl)propoxy]-2,4,8,10-tetra-t-butyldibenz[d,f][1.3.2]dioxaphosphepine and tridecyl phosphite; diphosphite compounds such as 4,4'-butylidene-bis(3-methyl-6-t-butylphenyl-di-tridecyl phosphite) and 4,4'-isopropylidene-bis(phenyl-di-alkyl (C12-C15) phosphite); phosphonite compounds such as triphenyl phosphonite, tetrakis(2,4-di-tert-butylphenyl)[1,1-biphenyl]-4,4'-diylbisphosphonite and tetrakis(2,4-di-tert-butyl-5-methylphenyl) [1,1-biphenyl]-4,4'-diylbisphosphonite; phosphinite compounds such as triphenyl phosphinite and 2,6-dimethylphenyldiphenyl phosphinite; and phosphine compounds such as triphenyl phosphine and tris(2,6-dimethoxyphenyl)phosphine.

The phosphorus-containing compound listed above have been commercialized, for example, as "Sumilizer GP" from Sumitomo Chemical Co., Ltd., "ADK STAB PEP-24G" "ADK STAB PEP-36" "ADK STAB 3010" from ADEKA Corp., "IRGAFOS P-EPQ" from Ciba Specialty Chemicals, Inc., and "GSY-P101" from SAKAI CHEMICAL INDUSTRY CO., LTD.

The addition amount of the phosphorus-containing compound is ordinarily from 0.001 to 10.0 parts by weight, preferably from 0.01 to 5.0 parts by weight, and more preferably from 0.1 to 1.0 parts by weight, based on 100 parts by weight of cellulose ester.

The carbon radical trapping agent and the phenol compound and the phosphorus-containing compound are preferably used in combination. The addition amount of the carbon radical trapping agent is preferably from 0.1 to 1.0 parts by weight, the addition amount of the phenol compound is preferably from 0.2 to 2.0 parts by weight, the addition amount of the phosphorus-containing compound is preferably from 0.1 to 1.0 parts by weight, each based on 100 parts by weight of cellulose ester.

(Fine Particles)

The cellulose ester optical film of the invention may contain fine particles such as a matting agent to provide a lubricant property. Such fine particles include particulate inorganic compounds and particulate organic compounds. Matting agent particles are preferably as fine as possible. Examples of such fine particles include inorganic particles of metal oxides, metal phosphates, metal silicates and metal carbonates such as silicon dioxide, titanium dioxide, aluminum oxide, zirconium oxide, calcium carbonate, kaolin, talc, calcined calcium silicate, hydrated calcium silicate, aluminum silicate, magnesium silicate, or calcium phosphate; and crosslinked polymer particles. Of these, silicon dioxide, which results in reduced haze of the film is preferred. Fine particles such as silicon dioxide are often subjected to a surface treatment and such fine particles, which result in reduced haze, are preferred.

Preferred organic materials used for the surface treatment include halosilane, alkoxysilane, silazane, or siloxane. Fine particles of a larger average particle size results in an enhanced lubricant effect, while those of a smaller average particle size excel in transparency. The average secondary particle size of fine particles is preferably in the range of 0.05 to 1.0 preferably from 5 to 50 nm, and more preferably from 7 to 14 nm. Incorporation of these fine particles to the cellulose ester optical film, which results in unevenness on the film surface, is preferably employed. The content of fine particles in cellulose ester is preferably from 0.005 to 0.3% by weight, based on cellulose ester.

Examples of silicon dioxide particles include AEROSIL 200, 200V, 300, R972, R972V, R974, R202, R812, OX 50, TT600 and NAX50, each manufactured by Nihon Aerosil Co., Ltd., and SEAHOSTAR KE-P100 and SEAHOSTAR KE-P30, each manufactured by Nippon Shokubai Co., Ltd. Of these are preferred AEROSIL 200V, R972, R972V, R974, R202, R812, NAX50, KE-P100 and KE-P30. When two types of the particles are employed in combination, they may be mixed at an optional ratio to use. It is possible to use particles different in the average particle diameter or in materials, for example, AEROSIL 200V and R972V can be used at a weight ratio in the range of 0.1:99.9 to 99.9:0.1.

The presence of fine particles used as a matting agent in the film may also be employed for enhancement of film strength. The presence of the fine particles in the film can enhance orientation of the cellulose ester optical film of the invention.

(Other Additives)

The cellulose ester optical film can further contain a viscosity lowering agent, a retardation controlling agent, an acid scavenger, a dye or a pigment, in addition to the plasticizer, a UV absorbent or fine particles described above.

(Viscosity Lowering Agent)

In the invention, there may be added a hydrogen bonding solvent to reduce melt viscosity. The hydrogen bonding solvent refers to an organic solvent capable of forming a hydrogen atom-mediated "bond" caused between an electrically negative atom (e.g., oxygen, nitrogen, fluorine, chlorine) and a hydrogen atom covalent-bonded to the electrically negative atom, in other word, it means an organic solvent capable of arranging molecules approaching to each other with a large bonding moment and by containing a bond including hydrogen such as O—H ((oxygen hydrogen bond), N—H (nitrogen hydrogen bond) and F—H (fluorine hydrogen bond), as described in J. N. Israelachibiri, "Intermolecular Force and Surface Force" (translated by Tamotsu Kondo and Hiroyuki Oshima, published by McGraw-Hill. 1991). The hydrogen bonding solvent is capable of forming a hydrogen bond between celluloses stronger than that between molecules of cellulose resin, the melting temperature of a cellulose resin composition can be lowered by the addition of the hydrogen bonding solvent than the glass transition temperature of a cellulose resin alone in the melt casting method conducted in the present invention. Further, the melting viscosity of a cellulose resin composition containing the hydrogen bonding solvent can be lowered than that of a cellulose resin in the same melting temperature.

Examples of the hydrogen bonding solvents include alcohols such as methanol, ethanol, propanol, isopropanol, n-butanol, sec-butanol, t-butanol, 2-ethyl hexanol, heptanol, octanol, nonanol, dodecanol, ethylene glycol, propylene glycol, hexylene glycol, dipropylene glycol, polyethylene glycol, polypropylene glycol, methyl cellosolve, ethyl cellosolve, butyl cellosolve, hexyl cellosolve, and glycerol; ketones such as acetone and methyl ethyl ketone; carboxylic acids such as formic acid, acetic acid, propionic acid, and butyric acid; ethers such as diethyl ether, tetrahydrofuran, and dioxane; pyrolidone such as N-methylpyrolidone; and amines such as trimethylamine and pyridine. These hydrogen bonding solvents may be used singly or in combination of two or more. Of these, alcohols, ketones, and ethers are preferred, and especially, methanol, ethanol, propanol, isopropanol, octanol, dodecanol, ethylene glycol, glycerol, acetone, and tetrahydrofuran are preferred. Further, water-soluble solvents such as methanol, ethanol, propanol, isopropanol, ethylene glycol, glycerol, acetone, and tetrahydrofuran are specifically relevant technical field and include diglycidyl ethers of various polyethylene glycols, specifically, diglycidyl ethers of a polyglycol derived by condensation of 8-40 mols of ethylene oxide per mol of polyglycol or glycerol, metal epoxy compounds (for example, those which have been employed in or with the vinyl chloride polymer composition), an epoxydated ether condensation product, a diglycidyl ether of bisphenol A (or 4,4'-dihydroxydiphenyldimethylmethane), an epoxydated unsaturated fatty acid ester (specifically, 2-22 carbons fatty acid 4-2 carbons alkyl ester, e.g., butyl epoxy-stearate), various epoxydated long fatty acid triglyceride (epoxydated vegetable oil typified by, for example, epoxydated soybean oil, or unsaturated natural oil, which are also called an epoxydated natural glyceride or an unsaturated fatty acid, and these fatty acids generally have 12-22 carbon atoms). Specifically preferred compounds are commercially available epoxy group-containing epoxide resin, EPON 815c and an epoxydated ether oligomer condensation product, represented by the following formula (7):

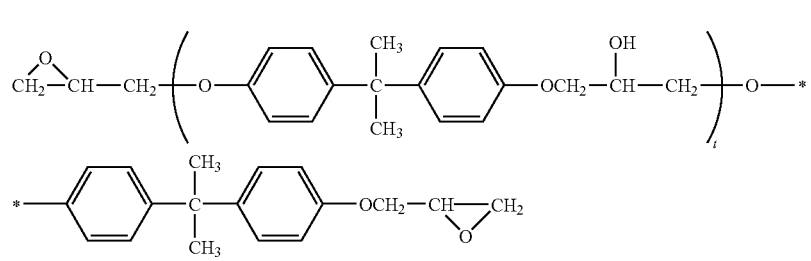

Formula (7)

preferred. Herein, "water-soluble" means that the solubility in 100 g of water is 10 g or more.
(Retardation Controlling Agent)

In the cellulose ester optical film of the present invention, a polarizing plate treatment to provide an optical compensation function may be conducted such that a liquid crystal layer is formed on an optical film by forming an orientation layer so as to combine the retardation of the optical film and that of the liquid crystal layer, or a polarizing plate protection film may be made to contain a compound for adjusting the retardation.

As a compound to be added to control the retardation can be employ an aromatic compound containing two or more aromatic rings as a retardation controlling agent, described in European Patent No. 911,656 A2 Two or more of such aromatic compounds may be used. The aromatic ring of such an aromatic compound includes not only an aromatic hydrocarbon ring but also an aromatic heterocycllic ring. An aromatic heterocyclic ring is specifically preferred such an aromatic heterocyclic ring is generally an unsaturated heterocyclic ring. In particular, compounds having 1,3,5-triazine ring are specifically preferred.
(Acid Scavenger)

An acid scavenger is one which plays a role of trapping acids (protonic acids) remaining in cellulose ester carried-in from the production stage. When melting a cellulose ester, moisture in the polymer and heat accelerate hydrolysis and, for example, cellulose acetate propionate produces acetic acid or propionic acid. Compounds cable of chemically bonding acids are usable, and examples thereof include, for example, compounds containing an epoxy, tertiary amine or ether structure, but are not limited to these.

Specifically, it is preferred to contain epoxy compound as an acid scavenger, described in U.S. Pat. No. 4,137,201. Such epoxy compounds as an acid scavenger are known in the wherein t is an integer of 0 to 12. Further, acid scavengers usable in the invention include those disclosed in Japanese Patent O.P.I. Publication No. 5-194788, paragraph 87 to 105.

Similarly to the afore-mentioned cellulose ester, the acid scavenger used in the invention preferably removes impurities such as residual acids, inorganic salts and organic low-molecules which were carried-in from the production stage or generated during storage, and the purity thereof is preferably not less than 99%. Residual acids and water are each preferably 0.01 to 100 ppm, whereby thermal deterioration is restrained in melt-casting a cellulose resin, resulting in enhancements of film formation stability and optical and mechanic properties of the film.

The acid scavenger is also designated as an acid trapping agent, an acid capturing agent or an acid catcher, but in the invention, but usable in the invention with no difference due to these designations.
(Melt Casting Method)

The film constituting material is required to generate very small amount of volatile matter or no volatile matter at all in the melting and film formation process. This is intended to ensure that the foaming occurs at the time of heating and melting to remove or avoid the defect inside the film and poor flatness on the film surface.

When the film constituting material is molten, the amount of the volatile matter contained is 1% by weight or less, preferably 0.5% by weight or less, more preferably 0.2% by weight or less, and still more preferably 0.1% by weight or less. A differential thermogravimetric apparatus (differential weight calorimetry (TG/DTA 200 by Seiko Instruments Inc.) is used to get a weight loss on heating from 30° C. through 250° C. The weight loss is defined as an amount of the volatile matter in the invention.

The moisture and the volatile components represented the aforementioned solvent are preferably removed from the film constituting material to be used before film formation or at the time of heating. They can be removed by the conventional method. A heating method, depressurization method, or heating/depressurization method can be used to remove them in air or in nitrogen atmosphere as an inert gas atmosphere. When the known drying method is used, this procedure is carried out in the temperature range wherein the film constituting material is not decomposed. This is preferred to ensure good film quality.

Generation of the volatile components can be reduced by the drying step prior to film formation. It is possible to dry the resin independently, or dry the resin and film constituting materials by separating into a mixture or compatible substances made of at least one or more types other than the resin. The drying temperature is preferably 100° C. or more. If the material to be dried contains any substance having a glass-transition temperature, and is heated up to a drying temperature higher than that glass-transition temperature, the material will be fused and will become difficult to handle. To avoid this, the drying temperature is preferably kept at a level not exceeding the glass-transition temperature. If a plurality of substances has a glass-transition temperature, the glass-transition temperature of the substance having a lower glass-transition temperature should be used as a standard. This temperature is preferably 100° C. or more through (glass-transition temperature—5) ° C. or less, and more preferably 110° C. or more through (glass-transition temperature—20) ° C. or less. The drying time is preferably 0.5 through 24 hours, more preferably 1 through 18 hours, and still more preferably 1.5 through 12 hours. If the drying temperature is too low, the rate of removing the volatile components will be reduced and much time will be required for drying. The drying process can be divided into two or more steps. For example, the drying process may includes a pre-drying step for storing the material, and a preliminary drying step for the period one week before film formation through the period immediately before film formation.

Figure 2:
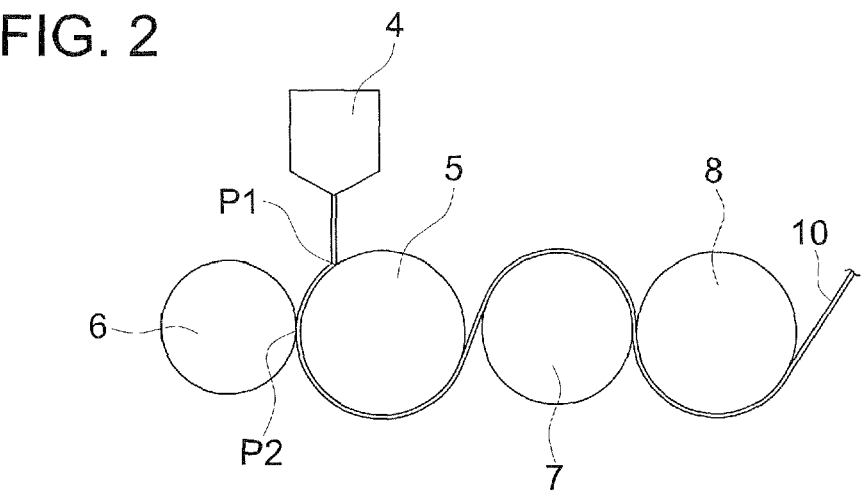
FIG. 2 is an enlarged view of a main portion of the apparatus of FIG. 1.

The melt casting method is classified into a method in which heating and melting are conducted, and as the melt casting method, a melt-extrusion molding method, a press molding method, an inflation method, an injection molding method, a blow molding method, a draw molding method, and the like can be applied. Of these methods, a melt-extrusion molding method is preferred to produce an optical film with excellent mechanical strength and surface accuracy. The film manufacturing method of the present invention will be explained below with reference to the melt extrusion method, FIG. 1 is a schematic flow sheet showing the overall structure of the apparatus for conducting the cellulose ester optical film manufacturing method of the present invention. FIG. 2 is an enlarged view of the casting die and the cooling roll portions.

In the cellulose ester optical film manufacturing method shown in FIG. 1 and FIG. 2, film materials such as cellulose resin are mixed, and then melt-extruded on a first cooling roll 5 from a casting die 4 using an extruder 1. The extruded mixture is circumscribed on the first cooling roll 5, then on a second cooling roll 7 and a third cooling roll 8 (three cooling rolls in total), sequentially. Thus, the extruded mixture is cooled, solidified and formed into a film 10. Then, the film 10 separated by a separation roll 9 is stretched in the transverse direction, while holding the both sides by a stretching apparatus 12, and is wound by a winding apparatus 16. To correct flatness, a touch roll 6 is provided so as to press the melted film onto the surface of the first cooling roll 5. The touch roll 6 has an elastic surface and a nip is formed between the touch roll 6 and the first cooling roll 5. The details of the touch roll 6 will be described later.

The conditions for the cellulose ester optical film manufacturing method according to the invention are the same as those used for thermoplastic resins such as other polyesters. The materials used are preferably dried in advance. A vacuum or reduced-pressure drier, or a dehumidified hot air dryer is used to dry the materials until the moisture is reduced to 1000 ppm or less, and preferably 200 ppm or less.

For example, the cellulose ester based resin, after dried employing hot air, or under vacuum or reduced pressure, is extruded by the extruder 1 and is melted at a temperature of about 200 to 300° C. The melted resin is filtered through a leaf disk filter 2 to remove foreign substances.

When the materials are fed from the feed hopper (not illustrated) to the extruder 1, they are preferably placed under a vacuum or reduced-pressure condition, or under insert gas atmosphere to prevent oxidation and decomposition.

When additives such as plasticizer are not mixed in advance, they can be added to the materials and mixed during the process of extrusion. To ensure uniform mixing, a mixer such as a static mixer 3 is preferably utilized.

In the present invention, the cellulose resin and the additives such as a stabilizer to be optionally added are preferably mixed before being melted. It is more preferred that the cellulose resin and additives be mixed at first. A mixer may be used for mixing. Alternatively, mixing may be conducted in the process of preparing the cellulose resin, as described above. As the mixer, a general mixer such as a V-type mixer, a conical screw type mixer, a horizontal cylindrical type mixer, a Henschel mixer or a ribbon mixer can be used.

As described above, after the film constituting materials are mixed, the mixture can be directly melted through the extruder 1 to form a film. Alternatively, it is also possible that the film constituting materials are palletized and the resultant pellets may be melted through the extruder 1, thereby forming a film. It is possible that when the film constituting materials contain a plurality of materials having different melting points, the materials are heated at a temperature at which only the material having a lower melting point is melted, whereby so-called patchy semi-molten materials are produced and placed in the extruder 1, followed by whereby a film formation. When the film constituting materials contain a material susceptible to thermal decomposition, a method is preferred which eliminates a pellet production process to reduce the frequency of melting and directly forms a film or which produces patchy semi-Molten materials and then forms a film, as described above.

Various types of commercially available extruders can be used as the extruder 1. A melt-knead extruder is preferably utilized. Either a single-screw extruder or a twin-screw extruder can be used. When producing a film directly without forming pellets from the film constituting materials, an appropriate degree of mixing is essential. In this sense, a twin-screw extruder is preferably used. A single-screw extruder can be used if the screw is changed into a kneading type screw such as a Madoc screw, Unimelt screw or Dulmage screw, which provides a proper degree of mixing. When pellets or patchy half-melts are used as the film constituting materials, both the single screw extruder and twin screw extruder can be used.

In the interior of the extruder 1 and the atmosphere under which the cooling process after extrusion is carried out, oxygen concentration is preferably lowered by incorporation of an inert gas such as nitrogen gas or by reduced pressure.

The preferred melting temperature of film constituting materials in the extruder 1 vary according to the viscosity or extrusion amount of the film constituting materials as well as the thickness of the film to be produced. Generally, when the glass transition temperature of the film is Tg, the melting temperature is from Tg to Tg+100° C., and preferably from Tg+10° C. to Tg+90° C. The melting temperature is ordinarily from 150 to 300° C., preferably from 180 to 270° C., and more preferably from 200 to 270° C. The melt viscosity at the time of extrusion is from 1 to 10,000 Pa·s, and preferably from 10 to 1,000 Pa·s. The dwell time of the film constituting materials in the extruder 1 should be as short as possible. It is within 10 minutes, preferably within 5 minutes, and more preferably within 3 minutes. The dwell time varies according to the type of the extruder and the conditions for extrusion. It can be reduced by adjusting the amount of the material to be supplied, the L/D, the rotational speed of the screw or the depth of the screw groove.

The shape and rotational speed of the screw of the extruder 1 are adequately selected in the context of the viscosity and ejection rate of the film constituting materials. In the present invention, the shear rate of the extruder 1 is from 1/sec. to 10,000/sec., preferably 5/sec. to 1,000/sec., and more preferably 10/sec. to 100/sec.

The extruder 1 used in the present invention can be obtained as a plastic molding machine available on the market.

The film constituting materials extruded from the extruder 1 is fed to the casting die 4, and extruded as a film from the slit of the casting die 4. The casting die 4 is not specifically limited as far as it can be used to manufacture a sheet or film. Materials of the casting die 4 include those thermally splayed or plated with hard chromium, chromium carbide, chromium nitride, titanium carbide, titanium carbon nitride, titanium nitride, hard metal or ceramic (tungsten carbide, aluminum oxide, chromium oxide), and then subjected to surface processing, such as buffing, lapping by a whetstone having a count of #1000 or later, planar cutting (in the direction perpendicular to the resin flow) by a diamond whetstone having a count of #1000 or more, electrolytic grinding or electrolytic complex grinding. The preferred material of the lip of the casting die 4 is the same as that used in the casting die 4. The surface accuracy of the lip is preferably 0.58 or less, and more preferably 0.28 or less.

Figure 3A:
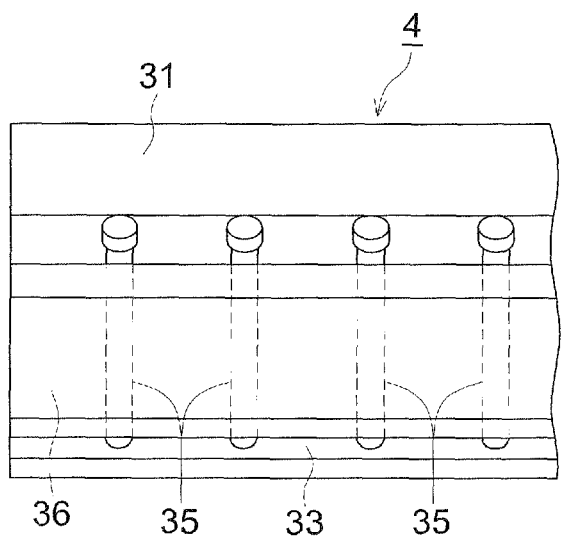
FIG. 3(*a*) is a schematic view showing one embodiment of a main portion of a casting die.
Figure 3B:
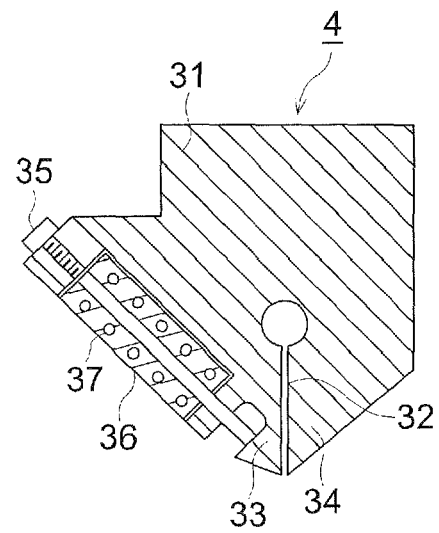

The slit of this casting die 4 is designed in such a way that the gap can be adjusted. This is shown in FIG. 3. FIG. 3(*a*) is a schematic view showing one embodiment of a main portion of a casting die. FIG. 3(*b*) is a sectional view showing one embodiment of a main portion of a casting die. Of a pair of lips forming the slit 32 of the casting die 4, one is the flexible lip 33, which has lower rigidity and is likely to be deformed, and the other is a stationary lip 34. Many heat bolts 35 are arranged at a predetermined pitch across the casting die 4, namely, along the length of the slit 32. Each heat bolt 5 includes a block 36 containing a recessed type electric heater 37 and a cooling medium passage. Each heat bolt 35 penetrates the block 36 in the vertical direction. The base of the heat bolt 35 is fixed on the die (main body) 31, and the front end is held in engagement with the outer surface of the flexible lip 33. While the block 36 is constantly air-cooled, the input power of the recessed type electric heater 37 is adjusted to increase or decrease the temperature of the block 36. This adjustment causes thermal extension and contraction of the heat bolt 35 and displacement of the flexible lip 33, whereby the film thickness is adjusted. A thickness gauge is provided at a predetermined position downstream the die. The web thickness information detected by this gauge is fed back to the control apparatus. This thickness information is compared with the preset thickness information of the control apparatus, whereby power or on-rate of the heat generating member of the heat bolt is controlled by the signal for correction control amount sent from this apparatus. The heat bolt preferably has a length of from 20 to 40 cm and a diameter of from 7 to 14 mm. A plurality of heat bolts, for example, several tens of heat bolts are arranged preferably at a pitch of 20 to 40 mm. A gap adjusting member mainly made up of a bolt for adjusting the slit gap by manually movement in the axial direction can be provided, instead of the heat bolt. The slit gap adjusted by the gap adjusting member has a diameter of ordinarily from 200 to 3,000 μm, and preferably from 500 through 2000 μm.

The first through third cooling rolls are made of a seamless steel pipe having a thickness of about 20 to 30 mm. The surface thereof is mirror finished. A tube in which a cooled liquid or a heated medium flows is provided in the inside of the rolls. Heat is absorbed from or applied to the film transporting on the roll by the cooled liquid or heated medium flowing within the tube.

The touch roll 6 in contact with the first cooling roll 5 has an elastic surface. The touch roll 6 is deformed along the surface of the first cooling roll 5 by the pressure against the first cooling roll 5, and forms a nip between this roll and the first roll 5. The touch roll 6 is also referred to as a pressure rotary member. As the touch roll, those disclosed in Japanese Patent Nos. 3194904 and 3422798, and Japanese Patent O.P.I. Publication Nos. 2002-36332 and 2002-36333 are preferably used. The touch roll available on the market can be used. Next, the touch roll will be explained in detail.

Figure 4:
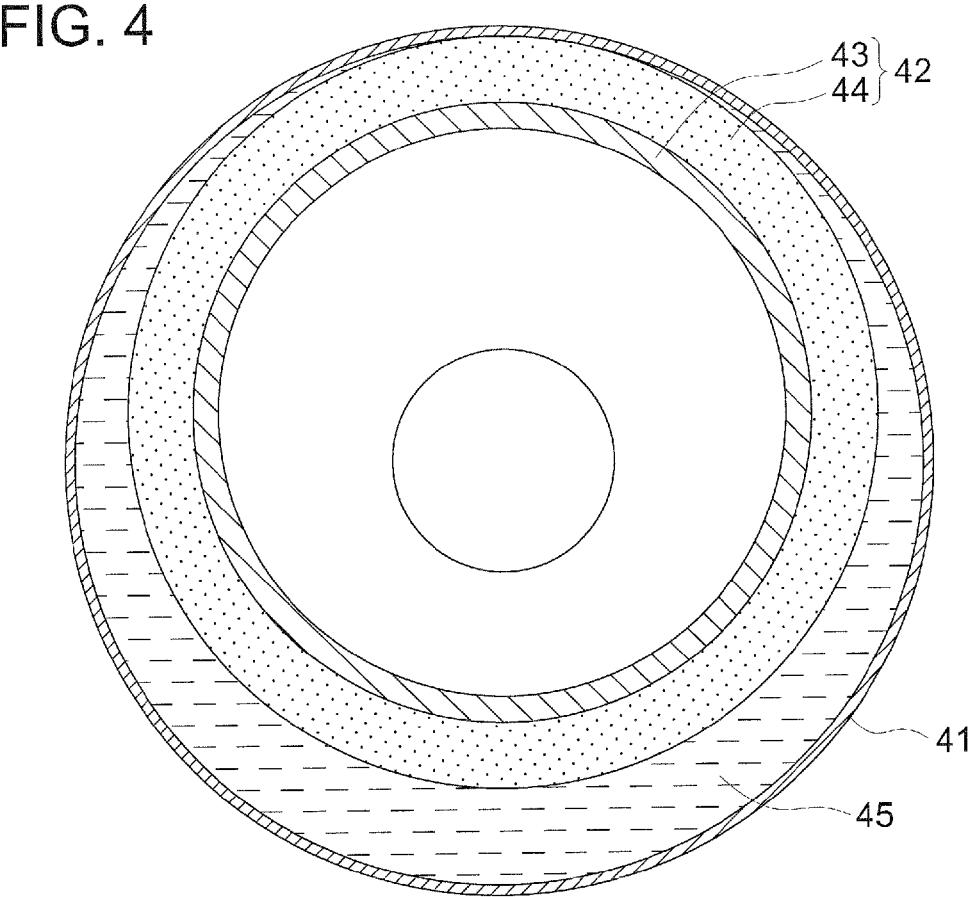
FIG. 4 is a sectional view of a first embodiment of a pressure rotary member.

FIG. 4 is a sectional view of one embodiment of a pressure rotary member and shows a cross section of a first embodiment (hereinafter also referred to as a touch roll A) of the touch roll 6. As illustrated, the touch roll A is composed of an elastic roller 42 arranged inside the flexible metallic sleeve 41.

The metallic sleeve 41 is made of a stainless steel having a thickness of 0.3 mm and has flexibility. If the metallic sleeve 41 is too thin, strength will be insufficient. If it is too thick, elasticity will be insufficient. Thus, the thickness of the metallic sleeve 41 is preferably 0.1 to 1.5 mm. The elastic roller 42 is a roll in which a rubber 44 is provided on the surface of the metallic inner roll 43 freely rotatable through a bearing. When the touch roll A is pressed against the first cooling roll 5, the elastic roller 42 presses the metallic sleeve 41 against the first cooling roll 5, and the metallic sleeve 41 and elastic roller 42 are deformed, conforming to the shape of the first cooling roll 5, whereby a nip is formed between the touch roll and the first cooling roll. The cooled water or heated medium 45 is introduced into a space formed between the elastic roller 42 and the inner wall of the metallic sleeve 41.

Figure 5:
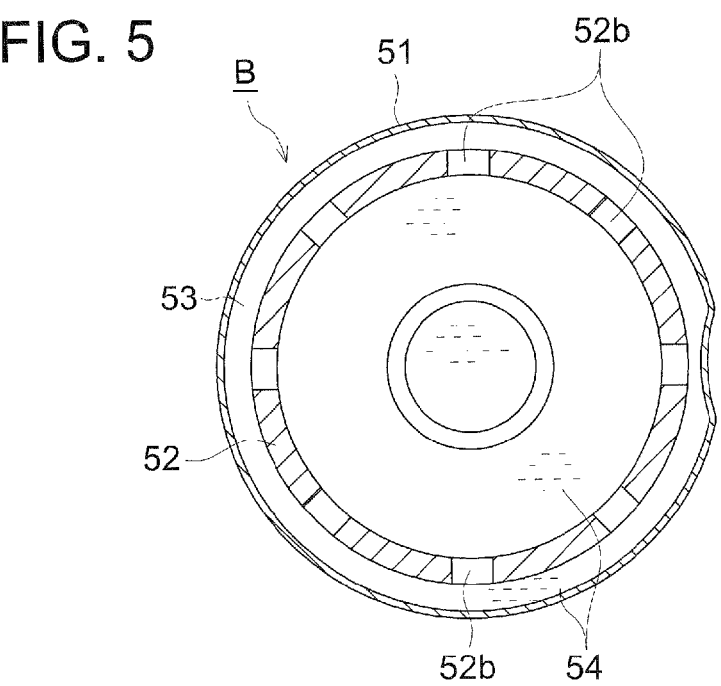
FIG. 5 is a sectional view of a plane perpendicular to the rotation axis of a second embodiment of a pressure rotary member.

FIG. 5 is a cross section of a plane perpendicular to the rotation axis of a second embodiment (hereinafter also referred to as a touch roll B) of a pressure rotary member.

Figure 6:
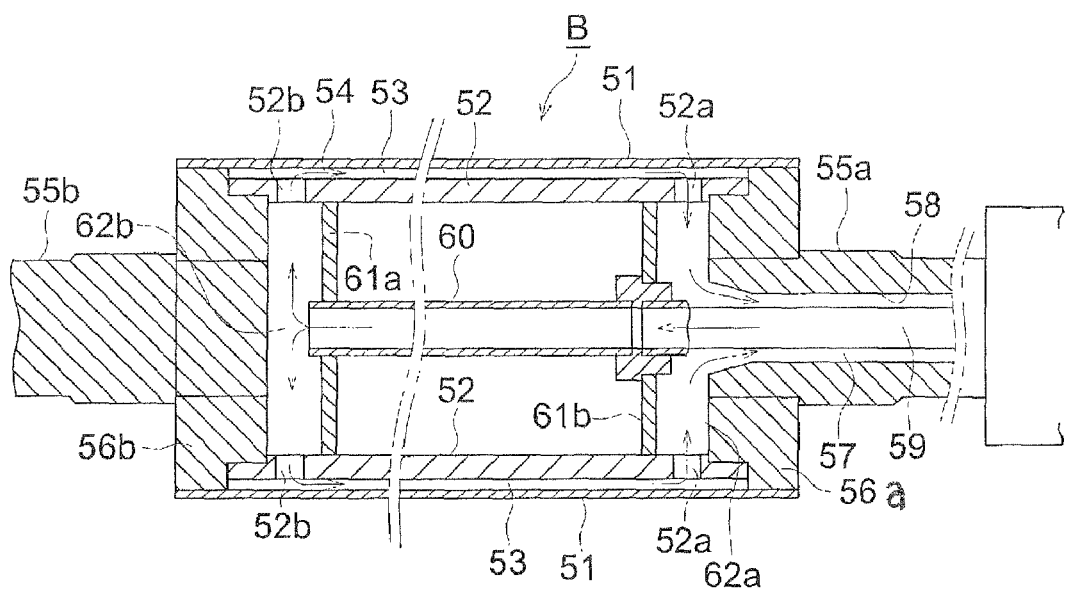
FIG. 6 is a sectional view of a plane containing the rotation axis of a second embodiment of a pressure rotary member.

FIG. 6 is a cross section showing one embodiment of a plane containing a rotation axis of a second embodiment (a touch roll B) of a pressure rotary member.

In FIG. 5 and FIG. 6, the touch roll B is composed of an outer sleeve 51 of flexible seamless stainless steel tube (having a thickness of 4 mm), which is flexible, and a metallic inner sleeve 52 with high rigidity arranged coaxially inside the outer sleeve 51. A cooled liquid or heated medium 54 is led into a space 53 formed between the outer sleeve 51 and the inner sleeve 52. To put it in greater details, the touch roll B is formed in such a way that the outer sleeve supporting flanges 56*a* and 56*b* are mounted on the rotary shafts 55*a* and 55*b* on both ends of the roll, and a thin-walled metallic outer sleeve 51 is mounted between the outer peripheral portions of these outer sleeve supporting flanges 56a and 56b. The fluid supply tube 59 is arranged coaxially inside the fluid outlet port 58 which is formed on the shaft center of the rotary shaft 55a and constitutes a fluid return passage 57. This fluid supply tube 59 is connected and fixed to the fluid shaft sleeve 60 arranged on the shaft center which is arranged inside the thin-walled metallic outer sleeve 51. Inner sleeve supporting flanges 61a and 61b are mounted on both ends of this fluid shaft sleeve 60, respectively. A metallic inner sleeve 52 having a wall thickness of about 15 to 20 mm is mounted in the range from the position between the outer peripheral portions of these inner sleeve supporting flanges 61a and 61b to the outer sleeve supporting flange 56b on the other end. A space 53 of, for example, about 10 mm for transporting a cooled liquid or heated medium is formed between this metallic inner sleeve 52 and thin-walled metallic outer sleeve 51. An outlet 52a and an inlet 52b communicating between the flow space 53 and intermediate passages 62a and 62b outside the inner sleeve supporting flanges 61a and 61b are focused on the metallic inner sleeves 52 close to both ends, respectively.

To provide flexibility, pliability and restoring force close to those of a rubber, the outer sleeve 51 is designed to be thinner as long as a thin cylinder theory of elastic mechanics is applied. The pliability evaluated by the thin cylinder theory is expressed by wall thickness t/roll radius r. The smaller the t/r becomes, the higher the pliability is. The pliability of this touch roll B meets the optimum condition when $t/r \leq 0.03$. Normally, a generally used touch roll has a roll diameter R of 200 to 500 mm (roll radius r=R/2), a roll effective width L of 500 to 1,600 mm, and an oblong shape of r/L<1. As shown in FIG. 6, for example, when the roll diameter R is 300 mm and the roll effective width L is 1,200 mm, the suitable range of the wall thickness t is 4.5 (150×0.03) mm or less. When pressure is applied to a molten sheet with a width of 1,300 mm at an average linear pressure of 98 N/cm, the wall thickness of the outer sleeve 51 is 3 mm. Then, the corresponding spring constant of such a sleeve becomes the same as that of a rubber roll of the same shape. The width k of the nip between the outer sleeve 51 and cooling roll in the roll rotation direction is about 9 mm. This gives a value approximate to about 12 mm of the nip width of the rubber roll, showing that pressure can be applied under the similar conditions. The amount of bend at the nip width k is about 0.05 to 0.1 mm.

Herein, $t/r \leq 0.03$ is assumed. In a general roll having a diameter R of from 200 to 500 mm, when 2 mm$\leq t \leq$5 mm in particular, sufficient flexibility is obtained and a thickness can be easily reduced through mechanical processing. Thus, the above range of t is very practical range.

The relation 2 mm$\leq t \leq$5 mm provides the relation $0.008 \leq t/r \leq 0.05$ for the general roll diameter. In practice, under the condition of $t/r \approx 0.03$, the wall thickness is preferably increased in proportion to the roll diameter. For example, t is selected to be within the range of 2 to 3 mm for the roll diameter R of 200, and t is selected to be within the range of 4 to 5 mm for the roll diameter R of 500.

These touch rolls A and B are pressed against the first cooling roll by a pressurizing means not illustrated. The F/W (linear pressure) is set at 10 to 150 N/cm, which is obtained by dividing the force F of the pressurizing means by the width W of the film in the nip in the rotary shaft direction of the first cooling roll 5. According to the present embodiment, a nip is formed between the first cooling roll 5 and the touch rolls A and B in which flatness should be corrected while the film passes through this nip. Thus, the present embodiment ensures more reliable correction of flatness as compared with the case where the touch roll is made of a rigid body and no nip is formed between the touch roll and the first cooling roll, since the film is sandwiched and pressed at a smaller linear pressure for a longer time. That is, if the linear pressure is smaller than 10 N/cm, the die line cannot be removed sufficiently. In contrast, if the linear pressure is greater than 150 N/cm, the film cannot easily pass through the nip, resulting in uneven thickness of the film.

Since the touch rolls A and B having surfaces made of metal exhibits smooth surfaces as compared with touch rolls having surfaces made of rubber, they provide a film having a surface with high smoothness. As materials for the elastic body 44 of the elastic roller 42, ethylene propylene rubber, neoprene rubber, silicone rubber or the like can be used In order to remove sufficiently the die line by the touch roll 6, it is important that viscosity of film lie within the appropriate range at the time when the film is pressed by the touch roll 6. Further, it is known that temperature dependency of viscosity of cellulose resin is relatively great. Thus, to adjust viscosity of the cellulose ester optical film to fall within an appropriate range, at the time when the film is pressed by the touch roll 6, it is important to adjust the film temperature to fall within an appropriate range at the time when the film is pressed by the touch roll 6. The present inventor has found that When the glass transition temperature of the cellulose ester optical film is Tg, the temperature T of the film immediately before the film is pressed by the touch roll 6 may any as far as is the relation Tg<T<Tg+110° C. is satisfied. If the film temperature T is lower than Tg, the viscosity of the film will be too high. In contrast, if the film temperature T is higher than Tg+110° C., uniform adhesion between the film surface and roll cannot be achieved, and the die line cannot be corrected. The relation Tg+10° C.<T2<Tg+90° C. is preferably satisfied, and the relation Tg+20° C.<T2<Tg+70° C. is more preferably satisfied. In order to adjust the film temperature to fall within an appropriate range at the time when the film is pressed by the touch roll 6, a length L along the rotating direction of the first cooling roll 5 from a position P1 to the nip P2 between the first cooling roll 5 and the touch roll 6 may be adjusted, the position P1 being a position where the melt extruded from the casting die 4 is in contact with the first cooling roll 5. The surface temperature of the touch roll 6 and the first cooling roll 5 is preferably from 60 to 230° C., and more preferably from 100 to 150° C., and the surface temperature of the second cooling roll 7 is preferably from 30 to 150° C., and more preferably from 60 to 130° C.

In the invention, the preferred examples of material used for the first roll 5 and second roll 6 include carbon steel, stainless steel and resin. The surface accuracy is preferably higher. The surface roughness is preferably 0.3 S or less, and more preferably 0.01 S or less.

The present inventor has found that when the pressure at the portion from the opening (lip) of the casting die 4 to the first roll 5 is reduced to 70 kPa or less, the above die line is corrected more efficiently. The pressure is preferably reduced to 50 to 70 kPa. There is no restriction to a method in which the pressure at the portion from the opening (lip) of the casting die 4 to the first roll 5 is kept at 70 kPa or less. As one of the methods, there is a method in which the pressure reduction is carried out, the portion from the casting die 4 to the periphery of the roll being covered with a pressure-resistant member. In this case, a vacuum suction machine used is preferably heated by a heater or the like, so that a sublimate is not deposited on the vacuum suction machine. In the invention, if the suction pressure is too small, the sublimate cannot be sucked effectively. Adequate suction pressure must be applied to prevent this.

In the invention, the film-shaped cellulose ester based resin in the molten state extruded from the T-die 4 is conveyed in contact with the first roll 5 (the first cooling roll), the second cooling roll 7, and the third cooling roll 8, sequentially, and is cooled and solidified, whereby an unstretched cellulose ester based resin film 10 is produced.

The unstretched film 10 cooled, solidified and separated from the third cooling roll 8 by the separation roll 9 is passed through a dancer roll (film tension adjusting roll) 11, and is led to the stretching machine 12, wherein the film 10 is stretched in the lateral direction (across the width) in the embodiment of the present invention shown in FIG. 1. This stretching operation orients the molecules in the film.

A known tender or the like can be preferably used to stretch the film across the width. Especially when the film is stretched across the width, the lamination with the polarized film can be preferably realized in the form of a roll. Stretching across the width ensures that the delayed phase axis of the cellulose ester film made of a cellulose ester based resin film is found across the width.

The transmission axis of the polarized film also lies across the width normally. If the polarizing plate wherein the transmission axis of the polarized film and the delayed phase axis of the optical film will be parallel to each other is incorporated in a liquid crystal display, the display contrast of the liquid crystal display can be increased, and a wide viewing angle is obtained.

The glass transition temperature Tg of the film constituting material can be controlled by changing the types of the materials constituting the film or the proportion of the constituent materials. When a phase difference film is manufactured as a cellulose ester optical film, it is preferred that Tg is 120° C. or more, and preferably 135° C. or more. The temperature environment of film is changed in image display mode by temperature rise of the liquid crystal display per se, for example, by temperature rise caused by a light source in the display. In this case, if the Tg of the film is lower than the film working environment temperature, the retardation value resulting from the orientation status of the molecules fixed in the film by stretching and film geometry greatly vary. If the Tg of the film is too high, temperature is raised when the film constituting material is formed into a film. This will increase the amount of energy consumed for heating. Further, the material may be decomposed at the time of forming a film, resulting in coloration. Thus, Tg of the film is preferably 250° C. or less.

Known thermal setting, cooling and relaxation processes can be carried out in the stretching process. Appropriate adjustment should be made to obtain the characteristics required for the intended optical film.

The aforementioned stretching process and thermal setting process are carried out as appropriate on a selective basis to provide the phase film function for the purpose of improving the physical properties of the phase film and to increase the viewing angle in the liquid crystal display. When such a stretching process and thermal setting process are included, the heating and pressing process should be performed prior to the stretching process and thermal setting process.

When a phase difference film is produced as a cellulose ester optical film, and the functions of the polarizing plate protective film are combined, control of the refractive index is essential. The refractive index control can be carried out by a stretching process. The stretching process is preferred. The stretching process will be explained below.

As stretching, stretching in the longitudinal direction, stratching in the transverse direction or stretching in longitudinal and transverse directions is carried out. The longitudinal stretching can be carried out by roll stretching (stretching in the mechanical direction employing two or more pairs of nip rolls on the outlet side which increases the rotational speed) or fixed end stretching (which gradually increase a transporting speed in the mechanical direction, while holding both ends of the film). The stretching in the transverse direction can be carried out by tenter stretching (stretching the film in the transverse direction (in the direction perpendicular to the mechanical direction) while holding both ends of the film by a chuck.

The stretching in the longitudinal direction and the stratching in the transverse direction may be carried out alone, respectively, or may be carried out in combination (biaxial stretching). When the biaxial stretching is carried out, the stretching in the longitudinal direction and the stretching in the transverse direction may be carried out successively (successive stretching) or simultaneously (simultaneous stretching). The stretching speed in the in the longitudinal direction and in the transverse direction is preferably from 10 to 10000%/minute, more preferably from 20 to 1000%/minute, and still more preferably from 30 to 800%/minute. When a multistep stretching is carried out, the stretching speed implies an average of the stretching speed at each stage. It is preferred that the stretching is followed by relaxing in the longitudinal or transverse direction by 0 to 10%. Further, it is also preferred that the stretching is preferably followed by heat fixed at 150 to 250° C. for 1 to 3 seconds.

In the phase difference film stretching process, required retardations Ro and Rt can be controlled by stretching at a magnification of 1.0 to 4.0 in one direction of the cellulose resin film, and at a magnification of 1.01 to 4.0 in the direction in plain of the film perpendicular to that direction. Herein, Ro denotes in-plane retardation and Rt retardation along the thickness.

For example, the film can be successively or simultaneously stretched in the mechanical direction and in the direction in plane normal to the mechanical direction, i.e., in the transverse direction. In this case, too small stretching magnification in at least one direction provides insufficient optical retardation, while too much stretching magnification results in rupture of the film.

Stretching in the direction of two axes perpendicular to each other is an effective method to allow film refractive indexes nx, ny and nz to fall within a predetermined range. Herein, nx is a refractive index in the mechanical (MD) direction, ny is a refractive index in the transverse (TD) direction, and nz is a refractive index in the thickness direction.

For example, when film is stretched in the melt casting direction, too much contraction in the transverse direction of the film provides too large refractive index in the thickness direction of the film. In this case, improvement can be carried out by restraining the contraction in the transverse direction of the film or by stretching the film in the transverse direction. When the film is stretched in the transverse direction, diversion of refractive index may be produced in the transverse direction. This phenomenon is sometimes found in a tenter method, and is considered to be due to so-called bowing phenomenon, which is caused by the fact that the film center shrinks and the film edges are fixed. In this case also, the bowing phenomenon is restrained by stretching the film in the casting direction, whereby diversion of refractive index in the transverse direction is minimized and improved.

Further, stretching in the two directions crossing at right angles each other can minimize variation of film thickness. Too much variation of film thickness causes unevenness of the optical retardation, resulting in color unevenness of images of a liquid crystal display.

Variation of thickness of cellulose ester film is preferably in the range within preferably ±3%, and more preferably ±1%. In order to meet the requirements described above, stretching in the two directions crossing at right angles each other is effective, wherein finally, the film is stretched in the casting direction at a magnification of preferably from 1.0 to 4.0 and in the transverse direction at a magnification of preferably from 1.01 to 4.0, and is stretched in the casting direction at a magnification of more preferably from 1.0 to 1.5 and in the transverse direction at a magnification of more preferably from 1.05 to 2.0.

When the absorption axis of the polarizer is present in the mechanical direction, the transmission axis of the polarizer is found in the transverse direction. To obtain a long-length polarizing plate, the phase difference film is preferably stretched so as to obtain a delayed phase axis in the transverse direction.

When cellulose ester providing a positive birefringence to stress is employed, stretching in the transverse direction can give the delayed phase axis to the transverse direction of cellulose ester film. In order to improve display quality, the delayed phase axis is preferably in accordance with the transverse direction of film. In order to obtain an intended retardation value, it is necessary to meet the relationship (stretching magnification in the transverse direction)>(stretching magnification in the casting direction).

After stretching, the end of the film is trimmed off by a slitter 13 to a width predetermined for the product. Then both ends of the film are knurled (embossed) by a knurling apparatus composed of an emboss ring 14 and a back roll 15, and the film is wound by a winder 16. This arrangement prevents sticking or scratching in the cellulose ester film F (master winding). Knurling can be carried out by pressing on the film a metallic ring having a pattern of projections and depressions on the side surface under application of heat and pressure. The both ends of the film, portions gripped by the clips are normally deformed and cannot be used as a film product. They are therefore cut out and are recycled as a material.

When the phase difference film is a polarizing plate protective film, the thickness of the protective film is preferably 10 to 500 μm. In particular, the lower limit is 20 μm, and preferably 35 μm. The upper limit is 150 μm, and preferably 120 μm. The particularly preferred range is 25 to 90 μm. If the phase difference film is too thick, the polarizing plate is too thick. This fails to meet requirements for thin-shape and lightweight when employed in the liquid crystal display for a notebook PC or mobile type electronic equipment. Conversely, if the phase difference film is too thin, retardation as a phase difference film cannot occur easily. Further, the film moisture permeability is increased, which cannot effectively protect the polarizer from moisture.

When a delayed or advanced phase axis of cellulose ester film is present in a plane of the film and the angle between the delayed or advanced phase axis and the mechanical direction of the film is defined as $\theta 1$, $\theta 1$ is preferably from −1 to +1°, and more preferably from −0.5 to +0.5°.

This $\theta 1$ can be defined as an orientation angle, and determined employing an automatic birefringence meter KOBRA-21ADH (produced by Oji Keisoku Kiki Co., Ltd.).

When $\theta 1$ meets the relationship described above, high luminance of a display image is obtained and a leakage of light is reduced or prevented, which distributes to faithful color reproduction of a color liquid crystal display.

When the cellulose ester optical film in the invention is employed as a phase difference film and used in the multiple-domain VA mode, and the phase difference film is arranged in the aforementioned range with an advanced phase axis of $\theta 1$, it improves displayed image quality. When a polarizing plate and a liquid crystal display are arranged as MVA mode, it can be a structure as shown in FIG. 7

Figure 7:
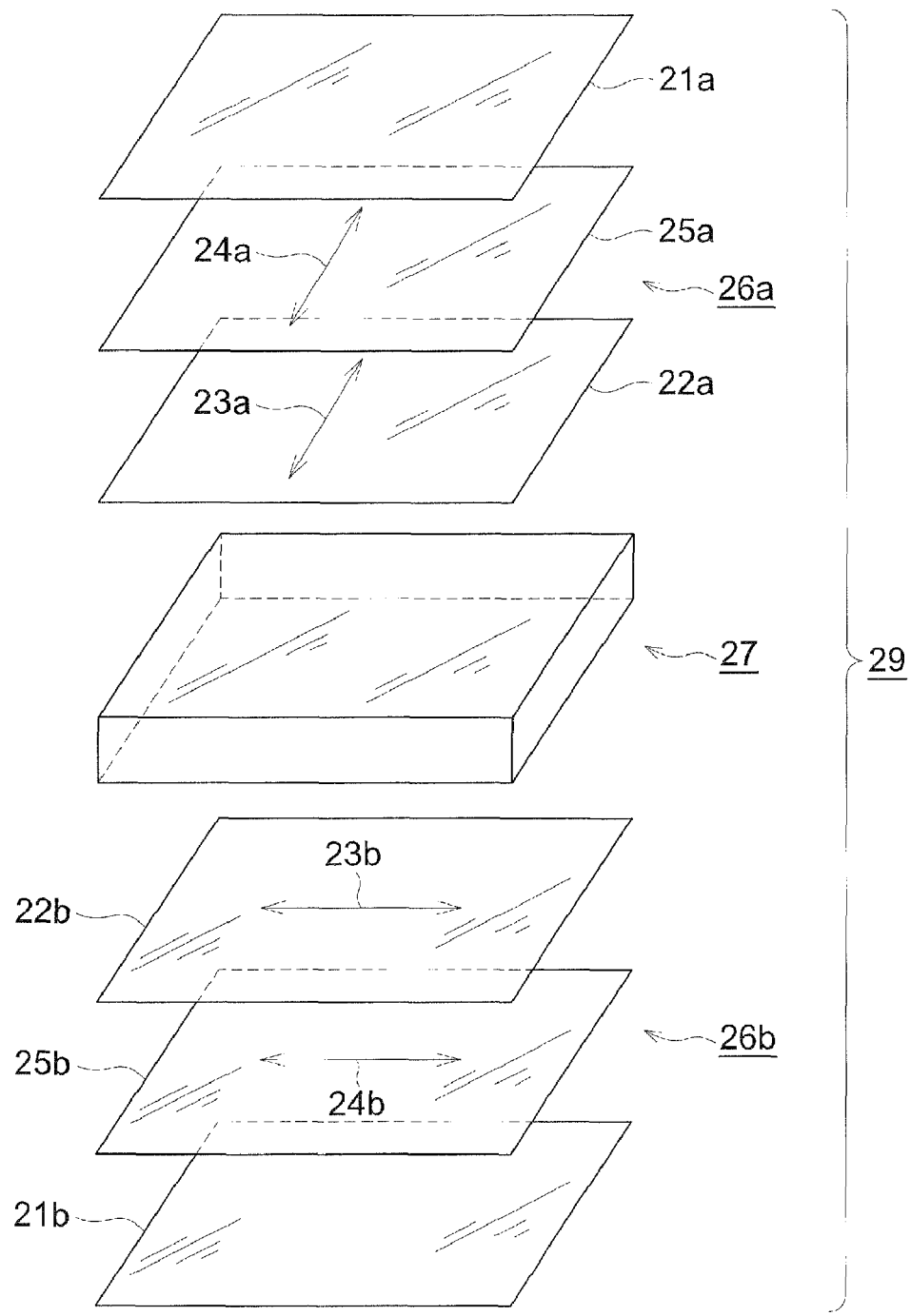
FIG. 7 is a perspective view of the structure of a liquid crystal display.

In FIG. 7, the reference numerals 21*a* and 21*b* indicate a protective film, 22*a* and 22*b* represent a phase difference film, 25*a* and 25*b* show a polarizer, 23*a* and 23*b* indicate a delayed axis direction of the film, 24*a* and 24*b* show a transmission axis direction of the polarizer, 26*a* and 26*b* show a polarizing plate, 27 shows a liquid crystal cell, and 29 shows a liquid crystal display.

The distribution of the retardation in plane Ro of the optical film is adjusted to preferably 5% or less, more preferably 2% or less, and still more preferably 1.5% or less. Further, the distribution of the retardation Rt in the thickness direction of the film is adjusted to preferably 10% or less, more preferably 2% or less, and still more preferably 1.5% or less.

In the phase difference film, the fluctuation in the distribution of the retardation value is preferred to be as small as possible. When a polarizing plate containing a phase difference film is used in the liquid crystal display, a smaller fluctuation in the distribution of the aforementioned retardation distribution is preferred for the purpose of preventing color irregularity.

In order to adjust the phase difference film so as to provide the retardation value suited for improvement of the display quality of the liquid crystal cell in the VA mode or TN mode and to divide into the aforementioned multi-domain especially in the VA mode for preferable use in the MVA mode, it is necessary to adjust the retardation in plane Ro to greater than 30 nm to 95 nm, and the retardation Rt in the thickness direction to greater than 70 nm to 400 nm.

The aforementioned retardation in-plane Ro mainly compensates a light leakage occurring due to deviation from a crossed-Nicols configuration, when a display is viewed obliquely from the line normal to a display surface, for example, in the configuration shown in FIG. 7 wherein two polarizing plates are arranged in a crossed-Nicols configuration and a liquid crystal cell is arranged between the polarizing plates, the two polarizing plates being in the crossed-Nicols configuration under conditions viewed from the direction normal to the display surface. When the liquid crystal cell is in the white display mode in the aforementioned TN mode and VA mode, particularly in the MVA mode, the retardation in the thickness direction mainly contributes to compensation of the birefringence of the liquid crystal cell recognized when viewed obliquely in the same manner as above.

As shown in FIG. 7, when two polarizing plates are arranged on the upper and lower portions of the liquid crystal cell in the liquid crystal display, the reference numerals 22*a* and 22*b* in FIG. 7 are capable of selecting distribution of retardation Rt in the thickness direction. It is preferred that the requirements of the aforementioned range are met, and the total of retardation in the thickness direction Rt of the both is from greater than 140 nm to 500 nm. In this case, it is preferred in improving productivity of industrial polarizing plates that the retardation in-plane Ro of the 22*a* and 22*b* and retardation Rt in the thickness direction are the same. It is especially preferred that the retardation in-plane Ro is from greater than 35 um to 65 nm, and retardation in the thickness direction Rt is from greater than 90 nm to 180 nm, and such a retardation range is applied to the liquid crystal cell in the MVA mode having a structure shown in FIG. 7.

In the liquid crystal display, when a commercially available polarizing plate protective film, a 35 to 85 μm thick TAC film having an retardation in-plane Ro of 0 to 4 nm, and a retardation in the thickness direction Rt of 20 to 50 nm is used as a protective film for one of the polarizing plates, for example, at the position of 22b in FIG. 7, the protective film arranged on the other polarizing plate, for example, the phase difference film arranged at the position of 22a of FIG. 7 is one having an retardation in-plane Ro of 30 to 95 nm, and a retardation in the thickness direction Rt of 140 to 400 nm. Such an arrangement is preferred in improving the display quality and film productivity.

(Polarization Plate)

Next, a polarizing plate will be explained.

The polarizing plate is prepared by a general method. It is preferable that the cellulose ester optical film of the invention is saponified by alkaline treatment on the backside thereof and the treated film is laminated, through a completely saponified poly(vinyl alcohol), on at least one side of a polarizer, which has been prepared by immersing and stretching in an iodine solution. On the other side of the polarizer, the cellulose ester optical film of the invention or another polarizing plate protective film may be either used. As the polarizing plats protective film to be used on the side of the polarizer opposite the cellulose ester optical film of the invention used, cellulose ester optical films available on the market can be used. Preferred examples thereof include KC8UX2M, KC4UX, KC5UX, KC4UY, KC8UY, KC12UR, KC8UCR-3, and KC8UCR-4, each manufactured by Konica Minolta Inc. A polarizing plate protective film serving also as an optical compensation film which has an optical anisotropic layer formed by orientating a liquid crystal compound such as a discotic liquid crystal, a rod-shaped liquid crystal or a cholesteric liquid crystal is also preferably used. For example, An optical anisotropic layer can be formed by the method described in Japanese Patent O.P.I. Publication No. 2003-98348. A polarizing plate having excellent flatness and a wide viewing angle can be obtained by a combined use of such an optical compensation film with the antireflection film of the invention.

The polarizing film, a major component of the polarizing plate, is an element through which light polarized in a certain direction only passes. Present known typical polarizing film is a poly(vinyl alcohol) type polarizing film which includes a poly(vinyl alcohol) type film dyed by iodine and that dyed by a dichromatic dye. As the polarizing film, one prepared by forming a film from an aqueous solution of poly(vinyl alcohol) and mono-axially stretching and dying the film or one prepared by mono-axially stretching after dying and then treating by a boron compound for giving durability is used. The polarizing film is adhered onto one side of the cellulose ester optical film of the invention to prepare the polarizing plate. The adherence is preferably carried out through an aqueous adhesive mainly composed of completely saponified poly(vinyl alcohol).

The polarizing film is stretched in mono-axial direction (usually in the mechanical direction). Consequently, the polarizing plate is shrunk in the stretched direction (usually in the mechanical direction) and elongated in the direction perpendicular to the stretched direction (usually in the transverse direction) when the film is placed under a high temperature and high humidity condition. The elongation and shrinking of the polarizing plate is increased accompanied with decreasing of the thickness of the polarizing plate protection film and the shrinking in the stretched direction of the polarizing film is particularly remarkable. The adherence is usually carried out so that the stretching direction of the polarizing film is in accordance with the casting direction (MD direction) of the polarizing plate protective film. Therefore, when the thickness of polarizing plate protective film is decreased, it is important to inhibit the shrinkage in the casting direction. The optical film of the invention is suitably used as such a polarizing plate protective film, since the film is excellent in dimensional stability.

Wave-shaped ununiformity is not increased even after the aging test at 60° C. and 90% RH, and the viewing angle is not varied and high visibility can be provided after the aging test even when the polarizing plate has an optical compensation film on the backside.

The polarizing plate can be constituted by pasting the protection film on one side and a separation film on the other side of the membrane. The protection film and the separation film are used for protecting the polarizing plate in the course of forwarding and inspection process. In such the case, the separation film is pasted on the side of the polarizing plate opposite to the side to be pasted to the liquid crystal plate for protecting the surface of the polarizing plate. The separate film is used on the side of the polarizing plate to be pasted to the liquid crystal plate to cover the adhesive layer for pasting polarizing plate to the liquid crystal plate.

(Liquid Crystal Display)

The polarizing plate comprising the polarizing plate protective film (which also functions as a retardation film) employing the cellulose ester optical film of the present invention provides higher display quality than a conventional polarizing plate. This is particularly suited for use in a multi-domain type liquid crystal display, and more preferably to a multi-domain type liquid crystal display in the birefringence mode (also referred to an MVA mode liquid crystal display) or an in place switching mode liquid crystal display (also referred to an IPS mode liquid crystal display).

By using the polarizing plate of the invention in a liquid crystal display, various kinds of liquid crystal displays excellent in visibility can be manufactured. The polarizing plate employing the cellulose ester optical film of the invention can be used for liquid crystal displays with various drive systems, such as STN, TN, OCB, HAN, VA (MVA, PVA), IPS, and OCB, and is preferably used for a VA (MVA, PVA) mode liquid crystal display or an IPS type liquid crystal display. Especially, a liquid crystal display, even when it has a large screen more than 30 type, can be obtained which has less variation due to environments, reduced light leakage, and excellent visibility without color tone unevenness and with good front contrast.

In the liquid crystal display comprising at least a polarizing plate including the phase difference film, one polarizing plate including the phase difference film is arranged on the liquid crystal cell, or two polarizing plates are arranged on both sides of the liquid crystal cell. In this case, the display quality is improved when the phase difference film constituting the polarizing plate of the invention is provided to face the liquid crystal cell of the liquid crystal display. Then the films 22a and 22b of FIG. 7 face the liquid crystal cell of the liquid crystal display.

In the aforementioned structure, the phase difference film provides optical compensation of the liquid crystal cell. When the polarizing plate of the present invention is used in the liquid crystal display, at least one of the polarizing plates of the liquid crystal display should be the polarizing plate of the present invention. Use of the polarizing plate of the present invention improves the display quality and provides a liquid crystal display having an excellent viewing angle property.

In the polarizing plate of the present invention, a polarizing plate protective film of cellulose derivative is used on the surface of the polarizing plate opposite the polarizer. A general-purpose TAC film or the like can be employed as the polarizing plate protective film. The polarizing plate protective film located farther from the liquid crystal cell can be provided with another functional layer for the purpose of improving the quality of the display.

For example, in order to avoid reflection, glare, scratch and dust, and to improve brightness, it is possible to laminate a film comprising a known functional layer for a display on the surface of the polarizing plate protective film of the present invention, without being restricted thereto.

Generally, to ensure stable optical properties, the phase difference film is required to exhibit small fluctuation of the Ro or Rth as the aforementioned retardation value. Especially, these fluctuations may cause irregularities of an image in the liquid crystal display in the birefringence mode.

The long-length phase difference film manufactured according to a melt casting method in the present invention is mainly composed of a cellulose resin, and therefore, can be subjected to alkali treatment based on saponification inherent to the cellulose ester. When a resin constituting the polarizer is polyvinyl alcohol, this makes it possible to apply a polarizer onto the long-length phase difference film using an aqueous solution containing a completely saponified polyvinyl alcohol, in a similar manner as in a conventional polarizing plate protective film. Thus, the present invention is superior in that a conventional polarizing plate manufacturing method can be applied. It is especially advantageous in that a long-length roll polarizing plate can be obtained.

The manufacture advantage of the present invention is remarkable in a long-length roll film with a length exceeding 100 meters. Greater advantages are observed in production of a longer polarizing plate such as one with a length of for example, 1,500 m, 2,500 m, and 5,000 m.

For example, in the production of a phase difference film, roll length is 10 m to 5,000 m, and preferably 50 m to 4,500 m when the productivity and transportability are taken into account. The width of the film can be selected to suit the width of a polarizer or the width suitable for the production line. It is possible to produce a film having a width of 0.5 m to 4.0 m, and preferably 0.6 m to 3.0 m, and to wind the film in the form of a roll, which can be used to process a polarizing plate. It is also possible to manufacture a film having a width twice or more as great as the intended width, and to wind it in the form of a roll, which is cut to get the roll of an intended width. This roll can be used to process the polarizing plate.

When manufacturing the cellulose ester optical film of the invention, a functional layer such as an antistatic layer, a hard coated layer, a lubricant layer, an adhesive layer, an antiglare layer and a barrier layer can be coated before and/or after stretching. In this case, various forms of surface treatment such as corona discharging, plasma processing, or chemical treatment can be provided as necessary.

In the film making process, the gripping portions of the clips on both ends of the film having been cut can be recycled as the material of the same type or different type of films, after having been pulverized, or after having been palletized as required.

An optical film of lamination structure can be manufactured by co-extrusion of the compositions containing cellulose esters having different concentrations of additives such as the aforementioned plasticizer, anti-oxidizing agent and matting agent. For example, an optical film made up of a skin layer, core layer and skin layer can be produced. For example, a large quantity of matting agent can be put into the skin layer or the matting agent can be put only into the skin layer. Larger amounts of plasticizer and anti-oxidizing agent can be put into the core layer than the skin layer. They can be put only in the core layer. Further, the types of the plasticizer and anti-oxidizing agent can be changed in response to the core layer or skin layer. For example, it is also possible to make such arrangements that the skin layer contains a plasticizer and/or anti-oxidizing agent of lower volatility, and the core layer contains a plasticizer of excellent plasticity or an anti-oxidizing agent with of excellent anti-oxidizing property. The glass transition temperatures between the skin layer and core layer can be different from each other. The glass transition temperature of the core layer is preferably lower than that of the skin layer. In this case, the glass transition temperatures of both the skin and core are measured, and the average value obtained by calculation from the volume fraction thereof is defined as the aforementioned glass transition temperature Tg so that it is handled in the same manner. Further, the viscosity of the melt including the cellulose ester at the time of melt-casting can be different according to the skin layer or core layer. The viscosity of the skin layer can be greater than that of the core layer. Alternatively, the viscosity of the core layer can be equal to or greater than that of the skin layer.

In the cellulose ester optical film of the present invention, assume that the dimensional stability is based on the standard dimensions of the film which has been left to stand for 24 hours at a temperature of 23° C. with a relative humidity of 55% RH. On this assumption, the dimensional stability of the film for display of the present invention is such that the fluctuation of the dimension at 80° C. and 90% RH is within ±2.0% (excl.), preferably within ±1.0% (excl.), more preferably within ±0.5% (excl.).

When the cellulose ester optical film of the present embodiment is used for a polarizing plate protective film of a polarizing plate as a phase difference film, if the phase difference film itself is fluctuated so as to fall outside the aforementioned range, the absolute value of the retardation and the orientation angle as a polarizing plate deviate from those initially set, resulting in reduction of display quality improving capability or in deterioration of display quality.

The cellulose ester optical film of the invention can be employed as a polarizing plate protective film. When the cellulose ester optical film of the invention is employed as a polarizing plate protective film, a polarizing plate preparing method is not specifically limited, and a polarizing plate can be prepared employing a conventional method. There is a method in which the optical film cellulose ester is subjected to alkali treatment and adhered as a polarizing plate protective film through an aqueous completely saponified polyvinyl alcohol solution onto both sides of a polarizing film prepared by immersing polyvinyl alcohol film in an iodine solution and stretching the resulting film. The cellulose ester optical film of the invention is adhered as a polarizing plate protective film directly onto at least one side of the polarizing film.

Adhesion aiding processing as disclosed in Japanese Patent O.P.I. Publication Nos. 6-94915 and 6-118232 may be carried out instead of the above alkali treatment to prepare a polarizing plate.

(Formation of Functional Layer)

During production of the optical film of the present invention, prior to and after stretching, or prior to or after stretching, there may be coated a functional layer such as a transparent conductive layer, a hard coat layer, an antireflection layer, a lubricating layer, an adhesion aiding layer, an antiglare layer, a barrier layer, or an optical compensating layer. Specifically, it is preferable to arrange at least one layer selected from the group including a transparent conductive layer, an antireflection layer, an adhesion aiding layer, an antiglare layer, and an optical compensating layer. In this case, if appropriate, it is possible to carry out various surface treatments such as a corona discharge treatment, a plasma treatment, or a chemical treatment.

<Transparent Conductive Layer>

In the film of the present invention, a transparent conductive layer can also preferably be provided, using a surfactant or conductive fine particle dispersion. Conductivity may be provided with the film itself or a transparent conductive layer may be provided. To provide antistatic properties, a transparent conductive layer is preferably provided. The transparent conductive layer can be provided using a method such as a coating method, atmospheric pressure plasma treatment, vacuum deposition, sputtering, or an ion plating method. Alternatively, via a co-extrusion method, a transparent conductive layer is prepared by incorporating conductive fine particles only in the surface layer or in the interior layer. The transparent conductive layer may be provided on one side of the film or on both sides. Conductive fine particles can be employed together with a matting agent providing lubricating properties or can be employed also as a matting agent. The following metal oxide particle powders exhibiting conductivity can be employed as a conductive agent.

As examples of the metal oxide, there are preferable ZnO, $TiO_2$, $SnO_2$, $Al_2O_3$, $In_2O_3$, $SiO_2$, MgO, BaO, $MoO_2$, and $V_2O_5$, or composite oxides thereof. Of these, ZnO, $TiO_2$, and $SnO_2$ are specifically preferable. As an example of incorporating a different type of atom, it is effective that Al or In is added to ZnO; Nb or Ta are added to $TiO_2$, or Sb, Nb, or a halogen element is added to $SnO_2$. The amount of such a different type of atoms to be added is preferably in the range of from 0.01 to 25 mol/%, and more preferably from 0.1 to 15 mol/%.

It is preferred that the conductive layer contains the metal oxide particle powders exhibiting conductivity in an amount of 0.01 to 20% by volume, the powders having a volume resisitivity of not more than $1 \times 10^7$ Ωm, specifically not more than $1 \times 10^5$ Ωcm, and having a specific structure having a primary particle size of from 10 nm to 0.2 μm and having in the high order structure a major axis length of from 30 nm to 6 μm.

In the present invention, the transparent conductive layer may be formed in such a manner that conductive fine particles are dispersed in a binder and provided on a substrate, or a substrate is subjected to subbing treatment and then conductive fine particles are applied thereon.

Further, it is possible to incorporate an ionene conductive polymer represented by Formulas (I) through (V), described in Paragraph Nos. 0038-0055 of Japanese Patent O.P.I. Publication No. 9-203810, and a quaternary ammonium cationic polymer represented by Formula (1) or (2), described in Paragraph Nos. 0056 through 0145 of the above patent document.

A heat resistant agent, a weather resistant agent, inorganic particles, a water-soluble resin, or an emulsion may optionally be added in the transparent conducive layer composed of a metal oxide to result in a matted surface or to improve film quality to the extent that the amount added does not adversely affect the effects of the present invention.

Binders used in the transparent conductive layer are not specifically limited provided that film forming capability is exhibited thereby, including, for example, protein such as gelatin or casein; cellulose compounds such as carboxymethyl cellulose, hydroxyethyl cellulose, acetyl cellulose, diacetyl cellulose, triacetyl cellulose, or cellulose acetate propionate; a saccharides such as dextran, agar, sodium alginates, or starch derivatives; and synthetic polymers such as polyvinyl alcohol, polyvinyl acetate, polyacrylate, polymethacrylate, polystyrene, polyacrylamide, poly-N-vinylpyrrolidone, polyester, polyvinyl chloride, or polyacrylic acid.

Specifically preferable are gelatin (such as lime-treated gelatin, acid-treated gelatin, oxygen-decomposed gelatin, phthalated gelatin, or acetylated gelatin), acetyl cellulose, diacetyl cellulose, triacetyl cellulose, polyvinyl acetate, polyvinyl alcohol, polybutylacrylate, polyacrylamide, and dextran.

<Antireflection Film>

The surface of the cellulose ester optical film of the present invention is preferably provided with a hard coat layer and an antireflection layer to allow the film to function as an antireflection film.

As the hard coat layer, a transparent curable resin layer (an actinic radiation curable resin layer or heat curable resin layer) is preferably used. The hard coat layer may be provided directly on the support or on the other layer such as an antistatic layer or a subbing layer.

When an actinic radiation curable resin layer is provided as a hard coat layer, an actinic radiation curable resin, capable of being cured via exposure to radiation such as ultraviolet rays, is preferably incorporated.

In view of optical design, the refractive index of the hard coat layer is preferably in the range of 1.45 to 1.65. Further, from the viewpoint of providing the antireflection film with adequate durability, impact resistance, and appropriate flexibility, as well as from the viewpoint of economics during production, the thickness of the hard coat layer is preferably in the range of 1 to 20 μm, and more preferably 1 to 10 μm.

The actinic radiation curable resin layer refers to a layer incorporating, as a main component, a resin which has been cured via cross-linking reaction by being exposed to actinic radiation such as ultraviolet rays or electron beams ("actinic radiation" in the present invention includes all electromagnetic waves such as electron beams, neutron beams, X-rays, alpha rays, ultraviolet rays, visible light, or infrared rays). As typical examples of actinic radiation curable resins, an ultraviolet ray curable resin and an electron beam curable resin are cited. However, a resin may optionally be employed which can be cured via exposure to radiation other than ultraviolet rays or electron beams. As the ultraviolet ray curable resin, there can be listed, for example, an ultraviolet ray curable acryl urethane-based resin, an ultraviolet ray curable polyester acrylate-based resin, an ultraviolet ray curable epoxy acrylate-based resin, an ultraviolet ray curable polyol acrylate-based resin, and an ultraviolet ray curable epoxy resin.

There can be listed an ultraviolet ray curable acryl urethane-based resin, an ultraviolet ray curable polyester acrylate-based resin, an ultraviolet ray curable epoxy acrylate-based resin, an ultraviolet ray curable polyol acrylate-based resin, and an ultraviolet ray curable epoxy resins.

Further, it is possible to incorporate a photoreaction initiator and a photosensitizer. Specifically, there can be listed acetophenone, benzophenone, hydroxybenzophenone, Michler's ketone, α-amyloxim ester, and thioxanthene, as well as derivatives thereof. When a photoreaction agent is used in the synthesis of an epoxy acrylate-based resin, it is optionally possible to use a sensitizer such as n-butylamine, triethylamine, or tri-n-butylphosphine. The content of a photoreaction initiator or photosensitizer incorporated in an ultraviolet ray curable resin composition is preferably from 2.5 to 6% by weight based on the composition from which a volatilized solvent component after coating and drying are removed.

Resin monomers include, for example, as a monomer having one unsaturated double bond, a common monomer such as methyl acrylate, ethyl acrylate, butyl acrylate, vinyl acetate, benzyl acrylate, cyclohexyl acrylate, or styrene. Further, there are listed, as a monomer having at least two unsaturated double bonds, ethylene glycol diacrylate, propylene glycol diacrylate, divinylbenzene, 1,4-cyclohexane diacrylate, and 1,4-cyclohexyldimethyl diacrylate, as well as trimethylolpropane triacrylate and pentaerythritol tetraacrylate as described above.

Further, a UV absorbent may be incorporated in an ultraviolet ray curable resin composition in such an amount that actinic radiation curing of the ultraviolet ray curable resin composition is not hindered.

To enhance heat resistance of a cured layer, a selected antioxidant which does not inhibit actinic radiation curing reaction can be used. For example, there can be listed a hindered phenol derivative, a thiopropionic acid derivative, and a phosphite derivative. Specific examples include, for example, 4,4'-thiobis(6-t-3-methylphenol), 4,4'-bytylidenebis(6-t-butyl-3-methylphenol), 1,3,5-tris(3,5-di-t-butyl-4-hydroxybenzyl)isocyanurate, 2,4,6-tris(3,5-di-t-butyl-4-hydroxybenzyl)mesitylene, and di-octadecyl-4-hydroxy-3,5-di-t-butylbenzyl phosphate.

As the ultraviolet ray curable resin, there can be suitably selected and used, for example, ADEKA OPTOMER KR and BY Series such as KR-400, KR-410, KR-550, KR-566, KR-567, or BY-320B (all produced by Asahi Denka Kogyo Co., Ltd.); KOEIHARD such as A-101-KK, A-101-WS, C-302, C-410-N, C-501, M-101, M-102, T-102, D-102, NS-101, FT-102Q8, MAG-1-P20, AG-106, or M-101-C (all produced by Koei Chemical Co., Ltd.); SEIKABEAM such as PHC2210(S), PHCX-9(K-3), PHC2213, DP-10, DP-20, DP-30, P1000, P1100, P1200, P1300, P1400, P1500, P1600, or SCR900 (all produced by Dainichi Seika Industry Co., Ltd.); KRM7033, KRM7039, KRM7130, KRM7131, UVECRYL29201, and UVECRYL29202 (all produced by Daicel UCB Co., Ltd.); RC-5015, RC-5016, RC-5020, RC-5031, RC-5100, RC-5102, RC-5120, RC-5122, RC-5152, RC-5171, RC-5180, and RC-5181 (all produced by DIC Corp.); ORLEX No. 340 CLEAR (produced by Chugoku Marine Paints, Ltd.); SUNRAD H-601 (produced by Sanyo Chemical Industries, Ltd.); SP-1509 and SP-1507 (produced by Showa Hipolymer Co., Ltd.); RCC-15C (produced by Grace Japan K.K.); ARONIX M-6100, M-8030, and M-8060 (all produced by Toagosei Co., Ltd.), as well as any other commercially available products.

In the coating compositions of the actinic radiation curable resin layer, the solid concentration is preferably from 10 to 95% by weight, and a suitable concentration is selected depending on the coating method.

As a radiation source to form a cured layer via actinic radiation curing reaction of an actinic radiation curable resin, any radiation source which generates ultraviolet rays can be used. Specifically, the radiation sources described in the above radiation item can be used. Exposure conditions vary depending on each of the lamps. However, the exposure amount is preferably in the range of 20 mJ/cm$^2$ to 10000 mJ/cm$^2$, more preferably 50 mJ/cm$^2$ to 2000 mJ/cm$^2$. From the near ultraviolet region to the visible region, it is possible to use a sensitizer exhibiting the maximum absorption in the region.

A solvent which is used during coating of the actinic radiation curable resin layer is suitably selected and used, for example, from hydrocarbons (toluene and xylene); alcohols (methanol, ethanol, isopropanol, butanol, and cyclohexanol); ketones (acetone, methyl ethyl ketone, and methyl isobutyl ketone); ketone alcohols (diacetone alcohol); esters (methyl acetate, ethyl acetate, and methyl lactate); glycol ethers, and other organic solvents. Appropriate mixtures thereof can also be used. The appropriate organic solvent as described above is preferably used which contains propylene glycol monoalkyl ether (the number of carbon atoms of the alkyl group being 1 to 4) or propylene glycol monoalkyl ether acetate (the number of carbon atoms of the alkyl group being 1 to 4) in an amount of preferably at least 5% by weight, and more preferably 5 to 80% by weight.

As a coating method of an actinic radiation curable resin composition coating liquid, usable are methods known in the art employing coaters such as a gravure coater, a spinner coater, a wire bar coater, a roll coater, a reverse coater, an extrusion coater, or an air-doctor coater, as well as employing an ink-jet method. The amount coated is, in terms of the wet film thickness, appropriately from 0.1 to 30 μm, and preferably from 0.5 to 15 μm. The coating rate is preferably in the range of 10 m/minute to 60 m/minute.

The actinic radiation curable resin composition is coated and then dried, followed by being exposed to ultraviolet rays. The exposure time is preferably from 0.5 second to 5 minutes, more preferably 3 seconds to 2 minutes from the viewpoint of the curing efficiency of an ultraviolet radiation curable resin as well as operation efficiency.

Thus, a cured coating layer can be obtained. In order to provide an antiglare property to the surface of a liquid crystal display panel, or in order to decrease adhesion with other material or to increase anti-scratching property, the coating composition for the cured coating layer can be added with inorganic or organic fine particles.

Examples of the inorganic fine particles include those composed of silicon oxide, zirconium oxide, titanium oxide, aluminum oxide, tin oxide, zinc oxide, calcium carbonate, barium sulfate, talc, kaolin, and calcium sulfate.

Examples of the organic fine particles include polymethacrylic acid methyl acrylate resin powder, acryl styrene resin powder, polymethyl methacrylate resin powder, silicone resin powder, polystyrene resin powder, polycarbonate resin powder, benzoguanamine resin powder, melamine resin powder, polyolefin resin powder, polyester resin powder, polyamide resin powder, polyimide resin powder, or fluorinated ethylene resin powder. These particles can be used via addition to an ultraviolet ray curable resin composition. The average particle diameter of these fine particle powders is commonly from 0.01 μm to 10 μm. The amount used by blending is preferably from 0.1 parts by weight to 20 parts by weight based on 100 parts by weight of the ultraviolet ray curable resin composition. In order to provide antiglare properties, it is preferred that fine practices of an average particle diameter of 0.1 μm to 1 μm are used in an amount of 1 part by weight to 15 parts by weight based on 100 parts by weight of the ultraviolet ray curable resin composition.

By incorporating such fine particles in an ultraviolet ray curable resin, an antiglare layer can be formed which exhibits preferable unevenness of a center line average surface roughness Ra of 0.05 μm to 0.5 μm. Further, when these fine particles are not incorporated in an ultraviolet ray curable resin composition, a hard coat layer can be formed which has the good smooth surface with a center line average surface roughness Ra of less than 0.05 μm, and preferably from 0.002 μm to less than 0.04 μm.

In addition thereto, as a substance to result in a blocking prevention function, it is possible to use submicron particles of a volume average particle diameter of 0.005 μm to 0.1 μm, which are the same component as above, in an amount of 0.1 parts by weight to 5 parts by weight based on 100 parts by weight of the resin composition.

An antireflection layer is provided on the above hard coat layer. The arrangement method is not specifically limited. A coating method, a sputtering method, a deposition method, a CVD (chemical vapor deposition) method, and an atmospheric pressure plasma method may be used individually or in combination. In the present invention, a coating method is specifically preferably used to provide the antireflection layer.

As methods to form the antireflection layer by coating, there can be listed a method in which metal oxide powder is dispersed in a binder resin dissolved in a solvent, followed by coating and drying; a method in which a polymer having a cross-linked structure as a binder resin; and a method in which an ethylenically unsaturated monomer and a photopolymerization initiator are incorporated and then a layer is formed via exposure to actinic radiation.

In the present invention, an antireflection layer can be arranged on a cellulose ester optical film provided with an ultraviolet ray curable resin layer. In order to decrease reflectance, it is preferable to form a low refractive index layer on the uppermost layer of the optical film and then to form a metal oxide layer therebetween which is a high refractive index layer, and further to provide a medium refractive index layer (a metal oxide layer whose refractive index has been adjusted by varying the metal oxide content, the ratio to the resin binder, or the type of metal) between the optical film and the high refractive index layer. The refractive index of the high refractive index layer is preferably from 1.55 to 2.30, more preferably 1.57 to 2.20. The refractive index of the medium refractive index layer is adjusted to be an intermediate value between the refractive index (approximately 1.5) of a cellulose ester film serving as a substrate and the refractive index of the high refractive index layer. The refractive index of the medium refractive index layer is preferably from 1.55 to 1.80. The thickness of each layer is preferably from 5 nm to 0.5 μm, more preferably from 10 nm to 0.3 μm, and most preferably from 30 nm to 0.2 μm. The haze of the metal oxide layer is preferably at most 5%, more preferably at most 3%, and most preferably at most 1%. The strength of the metal oxide layer is preferably at least 3H, and most preferably at least 4H in terms of pencil hardness when a load of 1 kg is applied. When the metal oxide layer is formed via a coating method, inorganic fine particles and a binder polymer are preferably incorporated therein.

The medium and high refractive index layers in the present invention are preferably layers with a refractive indexes of 1.55 to 2.5, with are formed by coating and drying of a coating liquid containing monomers or oligomers of an organic titanium compound represented by Formula (8) described below, or hydrolyzed products thereof.

  Formula (8)

In formula (8), $R_{61}$ is an aliphatic hydrocarbon group having a carbon atom number of from 1 to 8, and preferably an aliphatic hydrocarbon group having a carbon atom number of 1 to 4. The alkoxide group of the monomer or oligomer of the organic titanium compound or a hydrolyzed product thereof undergoes hydrolysis to create a cross-linked structure such as —Ti—O—Ti—, whereby a cured layer is formed.

As preferable examples of a monomer and an oligomer of an organic titanium compound used in the present invention, there are cited a dimer to a decamer of $Ti(OCH_3)_4$, $Ti(OC_2H_5)_4$, $Ti(O\text{-}n\text{-}C_3H_7)_4$, $Ti(O\text{-}i\text{-}C_3H_7)_4$, $Ti(O\text{-}n\text{-}C_4H_9)_4$, and $Ti(O\text{-}n\text{-}C_3H_7)_4$, and a dimer—a decamer of $Ti(O\text{-}i\text{-}C_3H_7)_4$, as well as a dimer to a decamaer of $Ti(O\text{-}n\text{-}C_4H_9)_4$. These may be used individually or in combinations of at least two types. Of these, a dimer to a decamer of $Ti(O\text{-}n\text{-}C_3H_7)_4$, $Ti(O\text{-}i\text{-}C_3H_7)_4$, $Ti(O\text{-}n\text{-}C_4H_5)_4$, and $Ti(O\text{-}n\text{-}C_3H_7)_4$ and a dimer to a decamaer of $Ti(O\text{-}n\text{-}C_4H_9)_4$ are specifically preferable.

In the present invention, coating liquids for the medium and high refractive index layer are preferably prepared via addition of the organic titanium compound into a solution to which water and an organic solvent, as described later, have been added in this sequential order. In cases in which water is added later, hydrolysis/polymerization does not progress uniformly, whereby cloudiness is generated or the layer strength is decreased. After adding water and the organic solvent, it is preferable to carry out vigorous stirring for mixing and dissolution to result in a uniform mixture.

Further, an alternative method is employable as a preferred embodiment. Namely, an organic titanium compound and an organic solvent are mixed, and then the resulting mixed solution is added to the above solution having been prepared by stirring the mixture of water and an organic solvent.

Herein, the amount of water is preferably in the range of 0.25 to 3 mol per mol of the organic titanium compound. When the amount of water is less than 0.25 mol, hydrolysis and polymerization are not sufficiently conducted, resulting in lowered layer strength. When exceeding 3 mol, hydrolysis and polymerization are excessively carried out, and then coarse $TiO_2$ particles are formed, resulting in cloudiness. Therefore, the amount of water is preferably controlled to fall within the above range.

Further, the content of water is preferably less than 10% by weight based on the total coating liquid. When the content of water is more than 10% by weight based on the weight of the total coating liquid, stability of the coating liquid is degraded, which may result in cloudiness.

An organic solvent used in the present invention is preferably water-miscible. Examples of the water-miscible organic solvents include alcohols (for example, methanol, ethanol, propanol, isopropanol, butanol, isobutanol, secondary butanol, tertiary butanol, pentanol, hexanol, cyclohexanol, and benzyl alcohol; polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thioglycol); polyhydric alcohol ethers (for example, ethylene glycol monomethyl ether, ethylene glycol monoethyl ether, ethylene glycol monobutyl ether, diethylene glycol monomethyl ether, diethylene glycol monomethyl ether, diethylene glycol monobutyl ether, propylene glycol monomethyl ether, propylene glycol monobutyl ether, ethylene glycol monomethyl ether acetate, triethylene glycol monomethyl ether, triethylene glycol monoethyl ether, ethylene glycol monophenyl ether, and propylene glycol monophenyl ether); amines (for example, ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamthyldiethylenetriamine, and tetramethylpropylenediamine); amides (for example, formamide, N,N-dimethylfromamide and N,N-dimethylacetamide); heterocycles (for example, 2-pyrrolidone, N-methyl-2-pyrrolidone, cyclohexylpyrrolidone, 2-oxazolidone, 1,3-dimethyl-2-imidazolidinone); sulfoxides (for example, dimethylsulfoxide); and sulfones (for example, sulfolane); as well as urea, acetonitrile, and acetone. Of these, alcohols, polyhydric alcohols, and polyhydric alcohol ethers are especially preferred. As described above, the amount of these organic solvents used may be adjusted so that the content of water is less than 10% by weight based on the total coating liquid by controlling the total used amount of water and the organic solvents.

The content of a monomer or oligomer of an organic titanium compound and a hydrolyzed product thereof used in the present invention, when used singly, is preferably from 50.0% by weight to 98.0% by weight based on solids incorporated in the coating liquid. The solid ratio is preferably from 50% by weight to 90% by weight, and more preferably from 55% by weight to 90% by weight. In addition, it is also preferable to add a polymer of an organic titanium compound (herein the organic titanium compound has been previously hydrolyzed, followed by cross-linking) or add titanium oxide fine particles as coating compositions.

The high refractive index layer and the medium refractive index layer of the present invention may incorporate metal oxide particles as fine particles and further may incorporate a binder polymer.

When a hydrolyzed/polymerized organic titanium compound and metal oxide particles are combined in the above method of preparing a coating liquid, the hydrolyzed/polymerized organic titanium compound and the metal oxide particles are allowed to adhere together, whereby it is possible to realize a durable coating layer provided with hardness resulting from the particles together with flexibility of a uniform layer.

The refractive index of metal oxide particles used in the high refractive index layer and the medium refractive index layer is preferably from 1.80 to 2.80, and more preferably from 1.90 to 2.80. The primary particle weight average diameter of the metal oxide particles is preferably from 1 to 150 nm, more preferably from 1 to 100 nm, and most preferably from 1 to 80 nm. The weight average diameter of the metal oxide particles in the layer is preferably from 1 to 200 nm, more preferably 5 to 150 nm, still more preferably from 10 to 100 nm, and most preferably from 10 to 80 nm. The average particle size of the metal oxide particles can be determined, for example, by measuring the major axis length of arbitrarily selected 200 particles through a scanning electron microscope and computing the average of the measurements. The specific surface area of the metal oxide particles is, as a value determined via the BET method, preferably from 10 to 400 $m^2/g$, more preferably from 20 to 200 $m^2/g$, most preferably from 30 to 150 $m^2/g$.

Examples of the metal oxide particles include metal oxides incorporating at least one element selected from Ti, Zr, Sn, Sb, Cu, Fe, Mn, Pb, Cd, As, Cr, Hg, Zn, Al, Mg, Si, P, and S. Specifically, there are listed titanium dioxide (for example, rutile, rutile/anatase mixed crystal, anatase, and amorphous structured ones), tin oxide, indium oxide, zinc oxide, and zirconium oxide. Of these, titanium oxide, tin oxide, and indium oxide are specifically preferable. The metal oxide particles are composed of an oxide of any of the above metals as a main component and further other metals may be incorporated. The main component refers to a component whose content (% by weight) is the maximum of the particle composing components. Examples of other elements include Ti, Zr, Sn, Sb, Cu, Fe, Mn, Pb, Cd, As, Cr, Hg, Zn, Al, Mg, Si, P, and S.

The metal oxide particles are preferably subjected to surface treatment. It is possible to conduct the surface treatment using an inorganic or organic compound. As examples of the inorganic compound used for the surface treatment, there are cited alumina, silica, zirconium oxide, and iron oxide. Of these, alumina and silica are preferable. Examples of the organic compound used for the surface treatment include polyols, alkanolamines, stearic acid, silane coupling agents, and titanate coupling agents. Of these, silane coupling agents are most preferable.

Specific examples of silane coupling agents include methyl trimethoxysilane, methyltriethoxysilane, methyltrimethoxyethoxysilane, methyltriacetoxysilane, methyltributoxysilane, ethyltrimethoxysilane, ethyltriethoxysilane, vinyltrimethoxysilane, vinyltriethoxysilane, vinyltriacetoxysilane, vinyltrimethoxyethoxysilane, phenyltrimethoxysilane, phenyltriethoxysilane, phenyltriacetoxysilane, γ-chloropropyltrimethoxysilane, γ-chloropropyltriethoxysilane, γ-chloropropyltriacetoxysilane, 3,3,3-trifluoropropyltrimethoxysilane, γ-glycidyloxypropyltrimethoxysilane, γ-glycidyloxypropyltriethoxysilane, γ(β-glycidyloxyethoxy)propyltrimethoxysilane, β-(3,4-epoxycyclohexyl)ethyltrimethoxysilane, β-(3,4-epoxycyclohexyl)ethyltriethoxysilane, γ-acryloyloxypropyltrimethoxysilane, γ-methacryloyloxypropyltrimethoxysilane, γ-aminopropyltrimethoxysilane, γ-aminopropyltriethoxysilane, γ-mercaptopropyltrimethoxysilane, γ-mercaptopropyltriethoxysilane, N-β-(aminoethyl)-γ-aminopropyltrimethoxysilane, and β-cyanoethyltriethoxysilane.

Further, examples of silane coupling agents having an alkyl group of 2-substitution with respect to silicon include dimethyldimethoxysilane, phenylmethyldimethoxysilane, dimethyldiethoxysilane, phenylmethyldiethoxysilane, γ-glycidyloxypropylmethyldiethoxysilane, γ-glycidyloxypropylmethyldimethoxysilane, γ-glycidyloxypropylphenyldiethoxysilane, γ-chloropropylmethyldiethoxysilane, dimethyldiacetoxysilane, γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethoxysilane, γ-mercaptopropylmethyldimethoxysilane, γ-mercaptopropylmethyldiethoxysilane, γ-aminopropylmethyldimethoxysilane, γ-aminopropylmethyldiethoxysilane, methylvinyldimethoxysilane, and methylvinyldiethoxysilne.

Of these, preferable are vinyltrimethoxysilane, vinyltriethoxysilane, vinylacetoxysilane, vinyltrimethoxyethoxysilane, γ-acryloyloxypropylmethoxysilane, and γ-methacryloyloxypropylmethoxysilane any of which has a double bond in the molecule, as well as γ-acryloyloxypropylmethyldimethoxysilane, γ-acryloyloxypropylmethyldiethoxysilane, γ-methacryloyloxypropylmethyldimethoxysilane, γ-methacryloyloxypropylmethyldiethjoxysilane, methylvinyldimethoxysilane, and methylvinyldiethoxysilane any of which has an alkyl group of 2-substitution with respect to silicon. Of these, specifically preferable are γ-acryloyloxypropyltrimethoxysilane, γ-methacryloyloxypropyltrimethoxysilane, γ-acryloyloxypropylmethyldimethoxysilane, γ-acryloyloxypropylmethyldiethoxysilane, γ-methacryloyloxypropylmethyldimethoxysilane, and γ-methacryloyloxypropylmethyldiethoxysilane.

At least two types of coupling agents may simultaneously be used. In addition to the above silane coupling agents, other silane coupling agents may be used. Other silane coupling agents include alkyl esters of ortho-silicic acid (for example, methyl orthosilicate, ethyl orthosilicate, n-propyl orthosilicate, i-propyl orthosilicate, n-butyl orthosilicate, sec-butyl orthosilicate, and t-butyl orthosilicate) and hydrolyzed products thereof.

Surface treatment employing a coupling agent can be carried out in such a manner that a coupling agent is added to a fine particle dispersion, and then the resulting dispersion is allowed to stand at room temperature −60° C. for several hours −10 days. In order to promote the surface treatment reaction, there may be added, to the above dispersion, an inorganic acid (for example, sulfuric acid, hydrochloric acid, nitric acid, chromic acid, hypochlorous acid, boric acid, orthosilicic acid, phosphoric acid, and carbonic acid), and an organic acid (for example, acetic acid, polyacrylic acid, benzenesulfonic acid, phenol, and polyglutamic acid), or a salt thereof (for example, a metal salt and an ammonium salt).

Such a coupling agent is preferably hydrolyzed using a required amount of water beforehand. In a state where the silane coupling agent has been hydrolyzed, the above organic titanium compound and the surface of metal oxide particles are allowed to be more reactive, whereby a further durable film is formed. A hydrolyzed silane coupling agent is also preferably added in a coating liquid beforehand. It is possible to use the water, having been used for this hydrolysis, in hydrolysis/polymerization of an organic titanium compound.

In the present invention, treatment may be carried out by combining at least two types of surface treatments. The shape of metal oxide particles is preferably rice grain-shaped, spherical, cubic, spindle-shaped, or irregular. At least two types of metal oxide particles may be used in the high refractive index layer and in the medium refractive index layer at the same time.

The contents of metal oxide particles in the high refractive index and the medium refractive index layer are preferably from 5 to 90% by weight, more preferably from 10 to 85% by weight, and still more preferably from 20 to 80% by weight. When the fine particles are incorporated, the content of the monomer or oligomer of the above organic titanium compound or the hydrolyzed product thereof is, based on solids incorporated in the coating liquid, from 1 to 50% by weight, preferably from 1 to 40% by weight, and more preferably from 1 to 30% by weight.

The above metal oxide particles in the form of being dispersed in a medium are incorporated in coating liquids to form a high refractive index layer and a medium refractive index layer. As a dispersion medium of the metal oxide particles, a liquid with a boiling point of 60 to 170° C. is preferably used. Specific examples of the dispersion medium include water, alcohols (for example, methanol, ethanol, isopropanol, butanol, and benzyl alcohol), ketones (for example, acetone, methyl ethyl ketone, methyl isobutyl ketone, and cyclohexanone), esters (for example, methyl acetate, ethyl acetate, propyl acetate, butyl acetate, methyl formate, ethyl formate, propyl formate, and butyl formate), aliphatic hydrocarbons (for example, hexane and cyclohexanone), halogenated hydrocarbons (for example, methylene chloride, chloroform, and carbon tetrachloride), aromatic hydrocarbons (for example, benzene, toluene, and xylene), amides (for example, dimethylformamide, diethylacetamide, and n-methylpyrrolidone), ethers (for example, diethyl ether, dioxane, and tetrahydrofuran), and ether alcohols (for example, 1-methoxy-2-propanol). Of these, specifically preferable are toluene, xylene, methyl ethyl ketone, methyl isobutyl ketone, cyclohexane, and butanol.

Further, metal oxide particles can be dispersed in a medium using a homogenizer. Examples of the homogenizer include a sand grinder mill (for example, a bead mill with pins), a high speed impeller mill, a pebble mill, a roller mill, an attritor, and a colloid mill. Of these, the sand grinder and the high speed impeller mill are specifically preferable. Preliminary dispersion may optionally be conducted. Examples of appropriate homogenizers used for the preliminary dispersion include a ball mill, a three-roll, mill, a kneader, and an extruder.

A polymer featuring a cross-linked structure (hereinafter also referred to as a cross-linked polymer) is preferably used as a binder polymer in the high refractive index and the medium refractive index layer of the present invention. Examples of the cross-linked polymer include cross-linked products of a polymer having a saturated hydrocarbon chain such as polyolefin (hereinafter referred to as polyolefin), polyether, polyurea, polyurethane, polyester, polyamine, polyamide, or a melamine resin. Of these, cross-linked products of polyolefin, polyether, and polyurethane are preferable. Cross-linked products of polyolefin and polyether are more preferable, but cross-linked products of polyolefin are most preferable. Further, a cross-linked polymer having an anionic group is more preferable. The anionic group functions to maintain a dispersion state of inorganic fine particles, and the cross-linked structure exhibits a function to strengthen a film by imparting film-forming capability to a polymer. The above anionic group may directly bond to a polymer chain or may bond to a polymer chain via a linking group. However, the anionic group preferably bonds, as a side chain, to the main chain via a linking group.

Examples of the anionic group include a carboxylic acid group (carboxyl), a sulfonic acid group (sulfo), and phosphoric acid group (phosphono). Of these, a sulfonic acid group and a phosphoric acid group are preferable. Herein, the anionic group may be in a salt form. A cation which forms a salt with the anionic group is preferably an alkali metal ion. Further, protons of the anionic group may be dissociated. The linking group which bonds the anionic group to a polymer chain is preferably a bivalent group selected from —CO—, —O—, an alkylene group, and an arylene group, as well as combinations thereof. A cross-linked polymer which is a preferable binder polymer is preferably a copolymer having a repeating unit having an anionic group and also a repeating unit having a cross-linked structure. In this case, the ratio of the repeating unit having an anionic group in a copolymer is preferably from 2 to 96% by weight, more preferably from 4 to 94% by weight, and most preferably from 6 to 92% by weight. The repeating unit may have at least two anionic groups.

In a cross-linked polymer having an anionic group, another repeating unit (a repeating unit having neither an anionic group nor a cross-linked structure) may be contained. As another repeating unit, preferable are a repeating unit having an amino group or a quaternary ammonium group and a repeating unit having a benzene ring. The amino group or the quaternary ammonium group functions to maintain a dispersion state of inorganic fine particles, similarly to the above anionic group. The benzene ring functions to enhance the refractive index of the high refractive index layer. Incidentally, even when the amino group, quaternary ammonium group or benzene ring is contained in the repeating unit having an anionic group or in the repeating unit having a cross-linked structure, similar effects are achieved.

In a cross-linked polymer containing, as a constituent unit, a repeating unit having an amino group or a quaternary ammonium group, the amino group or the quaternary ammonium group may directly bond to a polymer chain or may bond to a polymer chain as a side chain via a linking group. However, the latter is preferable. The amino group or the quaternary ammonium group is preferably a secondary amino group, a tertiary amino group, or a quaternary ammonium group, more preferably a tertiary amino group or a quaternary ammonium group. A group bonding to the nitrogen atom of the secondary amino group, the tertiary amino group, or the quaternary ammonium group is preferably an alkyl group, more preferably an alkyl group having 1-12 carbons, still more preferably an alkyl group having 1 to 6 carbons. The counter ion of the quaternary ammonium group is preferably a halide ion. The linking group which bonds the amino group or the quaternary ammonium group to a polymer chain is preferably a bivalent group selected from —CO—, —NH—, —O—, an alkylene group, and an arylene group, as well as combinations thereof. When the cross-linked polymer contains a repeating unit having an amino group or an quaternary ammonium group, the ratio is preferably from 0.06 to 32% by weight, more preferably from 0.08 to 30% by weight, most preferably from 0.1 to 28% by weight.

Cross-linked polymers are preferably formed via polymerization reaction during or after coating of coating liquids, wherein the coating liquids are prepared for a high refractive index and a medium refractive index layer by blending monomers to form cross-linked polymers. Each layer is formed along with the formation of the cross-linked polymers. A monomer having an anionic group functions as a dispersing agent for inorganic fine particles in a coating liquid. The used amount of the monomer having an anionic group is, based on the inorganic fine particles, preferably from 1 to 50% by weight, more preferably from 5 to 40% by weight, and still more preferably from 10 to 30% by weight. Further, a monomer having an amino group or a quaternary ammonium group functions as a dispersing aid in a coating liquid. The used amount of the monomer having an amino group or a quaternary ammonium group is preferably from 3 to 33% by weight based on the monomer having an anionic group. These monomers can be allowed to effectively function prior to coating of a coating liquid via a method in which a cross-linked polymer is formed during or after coating of the coating liquid.

Monomers used in the present invention are most preferably those having at least two ethylenically unsaturated groups. Examples thereof include esters of polyhydric alcohols with (meth)acrylic acid (for example, ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri (meth)acrylate, dipentaerythritol tetra(meth)acrylate, dipentaerythritol penta(meth)acrylate, pentaerythritol hexa(meth) acrylate, 1,2,3-cyclohexane tetramethacrylate, polyurethane polyacrylate, and polyester polyacrylate); vinylbenzne and derivatives thereof (for example, 1,4-divinylbenzene, 4-vinylbenzoic acid-2-acryloylethyl ester, and 1,4-divinylcyclohexane); vinylsulfones (for example, divinylsulfone); acrylamides (for example, methylenebisacrylamide); and methacrylamides. Commercially available monomers having an anionic group and monomers having an amino group or a quaternary ammonium group may be used. The commercially available monomers having an anionic group preferably used include KAYAMAR PM-21 and PM-2 (produced by Nihon Kayaku Co., Ltd.); ANTOX MS-60, MS-2N, and MS-NH4 (produced by Nippon Nyukazai Co., Ltd.); ARONIX M-5000, M-6000, and M-8000 Series (produced by Toagosei Co., Ltd.); BISCOAT #2000 Series (produced by Osaka Organic Chemical Industry Ltd.); NEW FRONTIER GX-8289 (produced by Dai-ichi Kogyo Seiyaku Co., Ltd.); NK ESTER CB-1 and A-SA (produced by Shin-Nakamura Chemical Co., Ltd.); and AR-100, MR-100, and MR-200 (produced by Diahachi Chemical Industry Co., Ltd.). Further, the commercially available monomers having an amino group or a quaternary ammonium group preferably used include DMAA (produced by Osaka Organic Chemical Industry Ltd.); DMAEA and DMAPAA (produced by Kohjin Co., Ltd.); BLENMER QA (produced by NOF Corp.); and NEW FRONTIER C-1615 (produced by Dia-ichi Kogyo Seiyaku Co., Ltd.).

It is possible to conduct polymerization reaction of a polymer via photopolymerization reaction or thermal polymerization reaction. The photopolymerization reaction is specifically preferable. A polymerization initiator is preferably used for the polymerization reaction. The polymerization initiator includes, for example, a thermal polymerization initiator and a photopolymerization initiator, described later, which are used to form a binder polymer for a hard coat layer.

Commercially available polymerization initiators may be used as the polymerization initiator. In addition to the polymerization initiator, an appropriate polymerization promoter may optionally be used. The amounts of the polymerization initiator and the polymerization promoter used are preferably in the range of 0.2 to 10% by weight of the total amount of the monomers. Polymerization of a monomer (or an oligomer) may be promoted by heating a coating liquid (an inorganic fine particle dispersion incorporating a monomer). Further, by heating after the photopolymerization reaction conducted after coating, heat curing reaction for the formed polymer may be carried out as an additional treatment.

Relatively high refractive index polymers are preferably used for the medium refractive index and the high refractive index layer. Examples of polymers exhibiting a high refractive index include polystyrene, styrene copolymers, polycarbonates, melamine resins, phenol resins, epoxy resins, and polyurethanes obtained via reaction of cyclic (alicyclic or aromatic) isocyanates with polyols. It is also possible to use polymers having another cyclic (aromatic, heterocyclic, or alicyclic) group and polymers having a halogen atom other than fluorine as a substituent since a high refractive index is exhibited thereby.

A low refractive index layer usable in the present invention includes a low refractive index layer formed by cross-linking of a fluorine-containing resin (hereinafter also referred to as "fluorine-containing resin prior to cross-linking") which undergoes cross-linking by heat or ionizing radiation; a low refractive index layer formed via a sol-gel method; and a low refractive index layer, formed with fine particles and a binder polymer, having voids among the fine particles or in the interior of the fine particles. A low refractive index layer applicable to the present invention is preferably one formed mainly with fine particles and a binder polymer. Specifically, the low refractive index layer having voids in the interior of the particles (also called the hollow fine particles) is preferable, since the refractive index can be lowered further. However, a decrease in the refractive index of the low refractive index layer is preferable due to an improvement of antireflection performance, which, however, makes it difficult to provide required strength. In view of the balance therebetween, the refractive index of the low refractive index layer is preferably at most 1.45, more preferably from 1.30 to 1.50, still more preferably from 1.35 to 1.49, and most preferably from 1.35 to 1.45.

Further, preparation methods of the low refractive index layer may be suitably combined.

Preferable fluorine-containing resins prior to coating include fluorine-containing copolymers formed with fluorine-containing vinyl monomers and cross-linkable group-providing monomers. Specific examples of the fluorine-containing vinyl monomer units include fluoroolefins (for example, fluoroethylene, vinylidene fluoride, tetrafluoroethylene, hexafluoroethylene, hexafluoropropylene, and perfluoro-2,2-dimethyl-1,3-dioxol); partially- or completely-fluorinated alkyl ester derivatives of (meth)acrylic acid (for example, BISCOAT 6FM (produced by Osaka Organic Chemical Industry Ltd.) and M-2020 (produced by Daikin Industries, Ltd.)); and completely- or partially-fluorinated vinyl ethers. The cross-linkable group-providing monomers include vinyl monomers previously having a cross-linkable functional group in the molecule such as glycidyl methacrylate, vinyltrimethoxysilane, γ-methacryloyloxypropyl-trimethoxysilane, or vinyl glycidyl ether, as well as vinyl monomers having a carboxyl group, a hydroxyl group, an amino group, or a sulfonic acid group (for example, (meth)acrylic acid, methylol(meth)acrylate, hydroxyalkyl(meth)acrylate, allyl acrylate, hydroxyalkyl vinyl ether, and hydroxyalkyl allyl ether). Japanese Patent O.P.I. Publication Nos. 10-25388 and 10-147739 describe that a cross-linked structure is introduced into the latter by adding, after copolymerization, a compound having a group reactive to the functional group in the polymer, as well as having at least another reactive group. Examples of the cross-linkable group include an acryloyl, a methacryloyl, an isocyanate, an epoxy, an aziridine, an oxazoline, an aldehyde, a carbonyl, a hydrazine, a carboxyl, a methylol, and an active methylene group. When a fluorine-containing copolymer is subjected to thermal cross-linking in the presence of a thermally-reactive cross-linking group or in combination of an ethylenically unsaturated group with a thermally radical generating agent or of an epoxy group with a thermally acid generating agent, the above polymer is of a thermally curable type. In contrast, when cross-linking is performed via exposure to radiation (preferably ultraviolet rays or electron beams) in combination of an ethylenically unsaturated group with a photo-radical generating agent or of an epoxy group with a photolytically acid generating agent, the polymer is of an ionizing radiation curable type.

Further, in addition to the above polymers, as the fluorine-containing resin prior to coating, there may be used a fluorine-containing copolymer formed in combination of a fluorine-containing vinyl monomer with a monomer other than a cross-linkable group-providing monomer. Monomers usable in combination are not specifically limited, including, for examples, olefins (ethylene, propylene, isoprene, vinyl chloride, and vinylidene chloride); acrylates (methyl acrylate, ethyl acrylate, 2-ethylhexyl acrylate); methacrylates (methyl methacrylate, ethyl methacrylate, butyl methacrylate, and ethylene glycol dimethacrylate); styrene derivatives (styrene, divinylbenzene, vinyltoluene, and α-methylstyrene); vinyl ethers (methyl vinyl ether); vinyl esters (vinyl acetate, vinyl propionate, and vinyl cinnamate); acrylamides (N-tert-butylacrylamide and N-cyclohexylacrylamide); methacrylamides; and acrylonitrile derivatives. Further, to provide lubricating properties and antistaining properties, a polyorganosiloxane skeleton or a perfluoropolyether skeleton is also preferably introduced into a fluorine-containing copolymer. The introduction can be carried out, for example, via polymerization of the above monomer with a polyorganosiloxane or perfluoropolyether having, at a terminal, an acryl group, a methacryl group, a vinyl ether group, or a styryl group; via polymerization of the polymer with a polyorganosiloxane or perfluoropolyether having a radical generating group at a terminal; or via reaction of a fluorine-containing copolymer with a polyorganosiloxane or perfluoropolyether having a functional group.

The ratio of each monomer used to form the fluorine-containing copolymer prior to coating is described below. The ratio of a fluorine-containing vinyl monomer is preferably from 20 to 70 mol %, and more preferably from 40 to 70 mol %; the ratio of a cross-linkable group-providing monomer used is preferably from 1 to 20 mol %, and more preferably from 5 to 20 mol %; and the ratio of the other monomers used together is preferably from 10 to 70 mol %, and more preferably from 10 to 50 mol %.

The fluorine-containing copolymer can be obtained by polymerizing these monomers via a method such as a solution polymerization method, a block polymerization method, an emulsion polymerization method, or a suspension polymerization method.

Fluorine-containing resins prior to coating are commercially available and possible to employ. Examples of the fluorine-containing resins prior to coating available on the market include SAITOP (produced by Asahi Glass Co., Ltd.), TEFLON (a registered trade name) AF (produced by E. I. du Pont de Nemours and Company), vinylidene polyfluoride and RUMIFRON (produced by Asahi Glass Co., Ltd.), and OPSTAR (produced by JSR Corp.).

The dynamic friction coefficient and the contact angle to water of the low refractive index layer composed of a cross-linked fluorine-containing resin are in the range of 0.03 to 0.15 and in the range of 90 to 120 degrees, respectively.

The low refractive index layer composed of a cross-linked fluorine-containing resin preferably incorporates inorganic fine particles described later from the viewpoint of adjusting the refractive index. Further, the inorganic fine particles are preferably used after being surface-treated. Surface treatment methods include physical surface treatment such as plasma discharge treatment or corona discharge treatment, as well as chemical surface treatment employing a coupling agent. However, a coupling agent is preferably employed. As the coupling agent, an organoalkoxy metal compound (for example, a titanium coupling argent and a silane coupling agent) is preferably used When inorganic fine particles are composed of silica, silane coupling agent-treatment is specifically effective.

Further, various types of sol-gel materials can also preferably be used as a material for the low refractive index layer. As such a sol-gel material, there can be used metal alcoholates (alcoholates of silane, titanium, aluminum, or zirconium), organoalkoxy metal compounds, and hydrolysis products thereof. Specifically, alkoxysilanes, organoalkoxysilanes, and hydrolysis products thereof are preferable. Examples thereof include tetraalkoxysilanes (such as tetramethoxysilane or tetraethoxysilane), alkyltrialkoxysilanes (such as methyltrimethoxysilane or ethyltrimethoxysilane), aryltrialkoxysilanes (such as phenyltrimethoxysilane), dialkyldialkoxysilanes, and diaryldialkoxysilanes. Further, there are also preferably used organoalkoxysilanes having various types of functional groups (such as vinyltrialkoxysilanes, methylvinyldialkoxysilanes, γ-glycidyloxypropyl-trialkoxysilanes, γ-glycidyloxypropylmethyldialkoxysilanes, β-(3,4-epoxydicyclohexyl)ethyltrialkoxysilanes, γ-methacryloyloxypropyltrialkoxysilanes, γ-aminopropyltrialkoxysilanes, γ-mercaptopropyl-trialkoxysilanes, or γ-chloropropyltrialkoxysilanes); and perfluoroalkyl group-containing silane compounds (for example, (heptadecafluoro-1,1,2,2-tetradecyl)triethoxysilane, 3,3,3-trifluoropropyltrimethoxysilane). Specifically, fluorine-containing silane compounds are preferably used from the viewpoint of decreasing the refractive index of the layer and of providing water repellency and oil repellency.

As a low refractive index layer, there is preferably used a layer wherein inorganic or organic fine particles are used to form micro-voids among the fine particles or in the interior of the fine particles. The average particle diameter of the fine particles is preferably from 0.5 to 200 nm, more preferably from 1 to 100 nm, still more preferably form 3 to 70 nm, and most preferably from 5 to 40 nm. Further, the particle diameter of the fine particles is preferably as uniform (monodispersed) as possible.

Inorganic fine particles are preferably noncrystalline. The inorganic fine particles are preferably composed of metal oxides, metal nitrides, metal sulfides, or metal halides, more preferably composed of metal oxides or metal halides, but most preferably composed of metal oxides or metal fluorides. As metal atoms, preferable are Na, K, Mg, Ca, Ba, Al, Zn, Fe, Cu, Ti, Sn, In, W, Y, Sb, Mn, Ga, V, Nb, Ta, Ag, Si, B, Bi, Mo, Ce, Cd, Be, Pb, and Ni. Of these, Mg, Ca, B, and Si are more preferable. Inorganic compounds containing two types of metals may also be used. Specific examples of preferable inorganic compounds include $SiO_2$ or $MgF_2$, but $SiO_2$ is specifically preferable.

Such particles having micro-voids in the interior of inorganic fine particles can be formed, for example, by allowing silica molecules which form the particles to be cross-linked. When silica molecules are subjected to cross-linking, the resulting volume is reduced, resulting in porous particles. It is possible to directly synthesize microvoid-containing (porous) inorganic fine particles as a dispersion via a sol-gel method (described in Japanese Patent O.P.I. Publication No. 53-112732 and Examined Japanese Patent Application Publication No. 57-9051) or a deposition method (described in Applied Optics, Volume 27, page 3356 (1988)). Alternatively, a dispersion can also be obtained by mechanically pulverizing powder prepared via a drying/precipitation method. Commercially available porous inorganic fine particles (for example, $SiO_2$ sol) may be used.

In order to form a low refractive index layer, these inorganic fine particles are preferably used in such a state as dispersed in an appropriate medium. As a dispersion medium, preferable are water, alcohol (for example, methanol, ethanol, and isopropyl alcohol), and ketone (for example, methyl ethyl ketone and methyl isobutyl ketone).

Organic fine particles are preferably non-crystalline. The organic fine particles are also preferably polymer fine particles which are synthesized via polymerization reaction (for example, an emulsion polymerization method) of a monomer. The polymer of the organic fine particles preferably contains fluorine atoms. The ratio of the fluorine atoms in the polymer is preferably from 35 to 80% by weight, and more preferably from 45 to 75% by weight. Further, microvoids are also preferably formed in the organic fine particle, for example, by allowing a particle-forming polymer to be cross-linked to result in a reduced volume. In order to allow the particle-forming polymer to be cross-linked, a multifunctional monomer preferably accounts for at least 20 mol % based on a monomer used to synthesize the polymer.. The ratio of the multifunctional monomer is more preferably from 30-80 mol %, most preferably 35-50 mol %. As monomers used to synthesize the organic fine particles, examples of fluorine-containing monomers used to synthesize the fluorine-containing polymers include fluoroolefins (for example, fluoroethylene, vinylidene fluoride, tetrafluoroethylene, hexafluoropropylene, and perfluoro-2,2-dimethyl-1,3-dioxol), fluorinated alkyl esters of acrylic acid or methacrylic acid, and fluorinated vinyl ethers. Copolymers of monomers with and without fluorine atoms may be used. Examples of the monomers without fluorine atoms include olefins (for example, ethylene, propylene, isoprene, vinyl chloride, and vinylidene chloride), acrylates (for example, methyl acrylate, ethyl acrylate, and 2-ethylhexyl acrylate), methacrylates (for example, methyl methacrylate, ethyl methacrylate, and butyl methacrylate), styrenes (for example, styrene, vinyltoluene, and $\alpha$-methylstyrene), vinyl ethers (for example, methyl vinyl ether), vinyl esters (for example, vinyl acetate and vinyl propionate), acrylamides (for example, N-tert-butylacrylamide and N-cyclohexylacrylamide), methacrylamides, and acrylonitriles. Examples of the multifunctional monomers include dienes (for example, butadiene and pentadiene), esters of polyhydric alcohol with acrylic acid (for example, ethylene glycol diacrylate, 1,4-cyclohexane diacrylate, and dipentaerythritol hexaacrylate), esters of polyhydric alcohol with methacrylic acid (for example, ethylene glycol dimethacrylate, 1,2,4-cyclohexane tetramethacrylate, and pentaerythritol tetramethacrylate), divinyl compounds (for example, divinylcyclohexane and 1,4-divinylbenzene), divinylsulfone, bisacrylamides (for example, methylenebisacrylamide), and bismethacrylamides.

Microvoids among particles can be formed by piling at least two fine particles. Incidentally, when spherical fine particles of an equal diameter (being completely monodispersed) are close-packed, microvoids of a 26% void ratio by volume are formed among the fine particles. When spherical fine particles of an equal diameter are subjected to simple cubic packing, microvoids of a 48% void ratio by volume are formed among the fine particles. In a low refractive index layer practically used, the void ratio significantly shifts from the theoretical value due to distribution of the diameters of the fine particles or the presence of microvoids in the interior of the particles. The refractive index of the low refractive index layer decreases as the void ratio increases. When microvoids are formed by piling fine particles, the size of the microvoids among the particles can easily be controlled to an appropriate value (a value minimizing scattering light and resulting in no problem in the strength of the low refractive index layer) by controlling the diameter of the fine particles. Further, by controlling the diameter of the fine particles to be uniform, an optically uniform low refractive index layer, also featuring the uniform size of microvoids among the particles, can be realized. Herewith, the resulting low refractive index layer is controlled to be optically or macroscopically a uniform layer, though being microscopically a microvoid-containing porous layer. Microvoids among particles are preferably confined in the low refractive index layer by fine particles and a polymer. The confined voids also exhibit an advantage such that light scattering on the surface of the low refractive index layer is reduced, as compared to unconfined voids.

By forming microvoids, the macroscopic refractive index of the low refractive index layer becomes lower than the sum total of the refractive indexes of the components constituting the low refractive index layer. The refractive index of a layer is the sum total of the refractive indexes per volume of layer constituent elements. The refractive indexes of components such as fine particles or polymers of the low refractive index lay are larger than 1, while the refractive index of air is 1.00. Therefore, by forming microvoids, a low refractive index layer exhibiting a significantly lower refractive index can be realized.

Further, in the present invention, an embodiment is also preferable in which hollow fine particles of $SiO_2$ are used.

Hollow fine particles described in the present invention refer to particles which have a particle wall, the interior of which is hollow. Exemplified are particles which are formed in such a manner that the above $SiO_2$ particles having mocrovoids in the interior of the particles are surface-coated with organic silicon compounds (alkoxysilanes such as tetraethoxysilane) to close their pore inlets. Alternatively, voids in the interior of the wall of the particles may be filled with a solvent or gas. For example, in the case of air, the refractive index of hollow fine particles can remarkably be lowered (to a refractive index of 1.2 to 1.4), as compared to common silica (refractive index: 1.46). Via addition of such hollow fine particles of $SiO_2$, the refractive index of the low refractive index layer can further be lowered.

Preparation methods of allowing particles having microvoids in the above inorganic fine particles to be hollow may be based on the methods described in Japanese Patent O.P.I. Publication Nos. 2001-167637 and 2001-233611. Commercially available hollow fine particles of $SiO_2$ can optionally be used in the present invention. As the commercially available hollow fine particles, there is mentioned P-4 (produced by Catalists & Chemicals Ind. Co., Ltd.).

The low refractive index layer preferably incorporates a polymer of an amount of 5-50% by weight. The polymer functions to allow fine particles to adhere and to maintain a structure of the low refractive index layer having voids. The amount of the polymer used is controlled so that the strength of the low refractive index layer may be maintained without filling voids. The amount of the polymer is preferably from 10 to 30% by weight based on the total weight of the low refractive index layer. To achieve adhesion of fine particles using a polymer, it is preferable that (1) a polymer be allowed to bond to a surface treatment agent for fine particles; (2) a polymer shell be allowed to form around a fine particle serving as a core; or (3) a polymer be used as a binder among fine particles. The polymer which is bonded to a surface treatment agent in (1) is preferably a shell polymer of (2) or a binder polymer of (3). The polymer of (2) is preferably formed around fine particles via polymerization reaction prior to preparation of a low refractive index layer coating liquid. The polymer of (3) is preferably formed in such a manner that a monomer is added to a low refractive index layer coating liquid, followed by polymerization reaction during or after coating of the low refractive index layer. At least two of (1), (2), and (3) or all thereof are preferably employed in appropriate combinations. Of these, performance in combination of (1) and (3) or of (1), (2), and (3) is specifically preferable. Each of (1) Surface Treatment, (2) Shell, and (3) Binder will now sequentially be described.

(1) Surface Treatment

Fine particles (specifically, inorganic fine particles) are preferably subjected to surface treatment to improve affinity with a polymer. The surface treatment is classified into physical surface treatment such as plasma discharge treatment or corona discharge treatment and chemical surface treatment using a coupling agent. The chemical surface treatment is preferably conducted alone, or the physical surface treatment and the chemical surface treatment are also preferably performed in combination. As the coupling agent, an organoalkoxymetal compound (for example, a titanium coupling agent and a silane coupling agent) is preferably used. When fine particles are composed of $SiO_2$, surface treatment using a silane coupling agent can specifically effectively be carried out. As specific examples of the silane coupling agent, those described above are preferably used.

Surface treatment using a coupling agent can be carried out in such a manner that a coupling agent is added to a fine particle dispersion and the resulting mixture is allowed to stand at a temperature of room temperature to 60° C. for a period of several hours to 10 days. To facilitate the surface treatment reaction, there may be added, to the dispersion, an inorganic acid (for example, sulfuric acid, hydrochloric acid, nitric acid, chromic acid, hypochloric acid, boric acid, orthosilicic acid, phosphoric acid, and carbonic acid), an organic acid (for example, acetic acid, polyacrylic acid, benzenesulfonic acid, phenol, and polyglutamic acid), or a salt thereof (for example, a metal salt or an ammonium salt).

(2) Shell

Shell forming polymers are preferably polymers having a saturated hydrocarbon as the main chain. Polymers containing fluorine atoms in the main chain or side chains are preferable, but the polymers containing fluorine atoms in side chains are more preferable. Polyacrylates or polymethacrylates are preferable, but esters of fluorine-substituted alcohols with polyacrylic acid or polymethacrylic acid are most preferable. The refractive index of a shell polymer decreases as the content of fluorine atoms therein increases. To lower the refractive index of a low refractive index layer, a shell polymer contains fluorine atoms of an amount of preferably 35 to 80% by weight, and more preferably an amount of 45 to 75% by weight. A fluorine atom-containing polymer is preferably synthesized via polymerization reaction of a fluorine atom-containing ethylenically unsaturated monomer. Examples of the fluorine atom-containing ethylenically unsaturated monomer include fluoroolefins (for example, fluoroethylene, vinylidene fluoride, tetrafluoroethylene, hexafluoropropylene, perfluoro-2,2-dimethyl-1,3-dioxol), fluorinated vinyl ethers, and esters of fluorine substituted alcohols with acrylic acid or methacrylic acid.

A shell forming polymer may be a copolymer having repeating units with and without fluorine atoms. The repeating unit without fluorine atoms is preferably prepared via polymerization reaction of an ethylenically unsaturated monomer containing no fluorine atoms. Examples of the ethylenically unsaturated monomer contianing no fluorine atoms include olefins (for example, ethylene, propylene, isoprene, vinyl chloride, and vinylidene chloride), acrylates (for example, methyl acrylate, ethyl acrylate, and 2-ethylhexyl acrylate), methacrylates (for example, methyl methacrylate, ethyl methacrylate, butyl methacrylate, and ethylene glycol dimethacrylate), styrenes and derivatives thereof (for example, styrene, divinylbenzene, vinyltoluene, and α-methylstyrene), vinyl ethers (for example, methyl vinyl ether), vinyl esters (for example, vinyl acetate, vinyl propionate, and vinyl cinnamate), acrylamides (for example, N-tert-butylacrylamide and N-cyclohexylacrylamide), methacrylamides, and acrylonitriles.

When a binder polymer, described in (3) below, is used in combination, a cross-linkable functional group may be introduced into a shell polymer to allow the shell polymer and the binder polymer to chemically bind together via cross-linking. The shell polymer may be crystalline. When the glass transition point (Tg) of the shell polymer is higher than the temperature during formation of a low refractive index layer, microvoids in the low refractive index layer are easily maintained. Incidentally, when the Tg is higher than the temperature during formation of the low refractive index layer, fine particles are not fused, whereby the resulting low refractive index layer may not be formed as a continuous layer (resulting in a decrease in strength). In this case, it is desirable that the low refractive index layer be formed as a continuous layer with a binder polymer, described in (3) below, which is simultaneously used. A polymer shell is formed around the fine particle, resulting in a core/shell fine particle. A core composed of an inorganic fine particle is incorporated in the core/shell fine particle in an amount of preferably 5 to 90% by volume, and more preferably 15 to 80% by volume. At least two types of core/shell fine particles may simultaneously be used. Further, an inorganic fine particle incorporating no shell and a core/shell particle may be used at the same time.

(3) Binder

A binder polymer is preferably a polymer having a saturated hydrocarbon or a polyether as the main chain, but is more preferably a polymer having a saturated hydrocarbon as the main chain. The binder polymer is preferably a cross-linked one. The polymer having a saturated hydrocarbon as the main chain is preferably prepared via polymerization reaction of an ethylenically unsaturated monomer. In order to prepare a cross-linked binder polymer, a monomer having at least two ethylenically unsaturated groups is preferably used. Examples of the monomer having at least two ethylenically unsaturated groups include esters of polyhydric alcohols with (meth)acrylic acid (for example, ethylene glycol di(meth) acrylate, 1,4-dicyclohexane diacrylate, pentaerythritol tetra (meth)acrylate, pentaerythritol (meth) acrylate, trimethylolpropane tri(meth)acrylate, trimethylolethane tri(meth)

acrylate, dipentaerythritol tetra(meth)acrylate, dipentaerythritol penta(meth)acrylate, pentaerythritol hexa(meth)acrylate, 1,2,3-cyclohexane tetramethacrylate, polyurethane polyacrylate, and polyester polyacrylate); vinylbenzene and derivatives thereof (for example, 1,4-divinylbenzene and 4-vinylbenzoic acid-2-acryloylethyl ester, and 1,4-divinylcyclohexane); vinylsulfones (for example, divinylsulfone); acrylamides (for example, methylenebisacrylamide); and methacrylamides. A polymer having a polyether as the main chain is preferably synthesized via ring-opening polymerization reaction. A cross-linked structure may be introduced into a binder polymer via reaction of a cross-linkable group instead of or in addition to a monomer having at least two ethylenically unsaturated groups. Examples of the cross-linkable functional group include an isocyanate group, an epoxy group, an aziridine group, an oxazoline group, an aldehyde group, a carbonyl group, a hydrazine group, a carboxyl group, a methylol group, and an active methylene group. As a monomer to introduce a cross-linked structure, there can also be used vinylsulfonic acid, acid anhydrides, cyanoacrylate derivatives, melamine, etherified methylol, esters and urethane. There may be used a functional group such as a block isocyanate group, which exhibits cross-linking properties as a result of decomposition reaction thereof. Further, the cross-linkable group is not limited to the above compounds, including those which become reactive as a result of decomposition of the above functional group. As a polymerization initiator used for polymerization reaction and cross-linking reaction of a binder polymer, a thermal polymerization initiator or a photopolymerization initiator is used, but the photopolymerization initiator is preferable. Examples of the photopolymerization initiator include acetophenones, benzoins, benzophenones, phosphine oxides, ketals, antharaquinones, thioxanthones, azo compounds, peroxides, 2,3-dialkyldione compounds, disulfide compounds, fluoroamine compounds, and aromatic sulfoniums. Examples of the acetophenones include 2,2-diethoxyacetophenone, p-dimethylacetophenone, 1-hydroxydimethyl phenyl ketone, 1-hydroxycyclohexyl phenyl ketone, 2-methyl-4-methylthio-2-morpholinopropiophene, and 2-benzyl-2-dimethylamino-1-(4-morpholinophenyl)-butanone. Examples of the benzoins include benzoin methyl ether, benzoin ethyl ether, and benzoin ethylisopropyl ether. Examples of the benzophenones include benzophenone, 2,4-dichlorobenzophenone, 4,4-dichlorobenzophenone, and p-chlorobenzophenone. Examples of the phosphine oxides include 2,4,6-trimethylbenzoyldiphenylphosphine oxide.

The binder polymer is preferably formed in such a manner that a monomer is added to a low refractive index layer coating liquid, followed by polymerization reaction (and further cross-linking reaction, if appropriate) during or after coating of the low refractive index layer. A small amount of a polymer (for example, polyvinyl alcohol, polyoxyethylene, polymethyl methacrylate, polymethyl acrylate, diacetyl cellulose, triacetyl cellulose, nitrocellulose, polyester, and alkyd resins) may be added to the low refractive index layer coating liquid.

Further, a slipping agent is preferably added to the low refractive index layer of the present invention or other refractive index layers. Abrasion resistance can be improved by providing appropriate slipping properties. As a slipping agent, silicone oil or a waxy substance is preferably used. For example, a compound represented by the following formula (9) is preferable.

$$R_{71}COR_{72} \qquad \text{Formula (9)}$$

In formula above, $R_{71}$ represents a saturated or unsaturated aliphatic hydrocarbon group having a carbon atom number of of at least 12. An alkyl group or an alkenyl group is preferable, and an alkyl group or an alkenyl group each having a carbon atom number of at least 16 is more preferable. $R_{72}$ represents an —OM1 group (M1 represents an alkali metal such as Na or K), an —OH group, an —NH$_2$ group or an —OR$_{73}$ group ($R_{73}$ represents a saturated or unsaturated aliphatic hydrocarbon group having a carbon atom number of at least 12, and preferably represents an alkyl group or an alkenyl group). $R_{72}$ is preferably an —OH group, an —NH$_2$ group or an —OR$_{72}$ group. Typical examples of the compound include higher fatty acids or derivatives thereof such as behenic acid, stearic acid amide or pentacosanoic acid, and natural products, containing a large amount of these compounds such as carnauba wax, beeswax, or montan wax. Further, there can be exemplified polyorganosiloxane disclosed in Examined Japanese Patent Application Publication No. 53-292; higher fatty acid amides disclosed in U.S. Pat. No. 4,275,146; higher fatty acid esters (esters of a fatty acid having 10 to 24 carbons with alcohol having 10 to 24 carbons) disclosed in Examined Japanese Patent Application Publication No. 58-33541, British Patent No. 927,446 specification, and Japanese Patent O.P.I. Publication Nos. 55-126238 and 58-90633; higher fatty acid metal salts disclosed in U.S. Pat. No. 3,933,516; polyester compounds composed of dicarboxylic acids having at most 10 carbons and aliphatic or alicyclic diols disclosed in Japanese Patent O.P.I. Publication No. 51-37217; and oligopolyesters composed of dicarboxylic acids and diols disclosed in Japanese Patent O.P.I. Publication No. 7-13292.

For example, the amount of a slipping agent used in the low refractive index layer is preferably from 0.01 mg/m$^2$ to 10 mg/m$^2$.

There may be added, to each of the layers of an antireflection film or coating liquids therefor, a polymerization inhibitor, a leveling agent, a thickener, an anti-coloring agent, a UV absorbent, a silane coupling agent, an antistatic agent, or an adhesion providing agent, in addition to a metal oxide particle, a polymer, a dispersion medium, a polymerization initiator, or a polymerization accelerator.

Each of the layers of the antireflection film can be formed via a coating method such as a dip coating method, an air-knife coating method, a curtain coating method, a roller coating method, a wire bar coating method, a gravure coating method, an ink-jet method, or an extrusion coating method (U.S. Pat. No. 2,681,294). At least two layers may be simultaneously coated. Simultaneous coating methods are described in U.S. Pat. Nos. 2,761,791, 2,941,898, 3,508,947, and 3,526,528; and Yuji Harazaki, Coating Kogaku (Coating Engineering), page 253, Asakura Shoten (1973).

In the present invention, in the production of an antireflection film, drying is carried out preferably at 60° C. or higher, more preferably at 80° C. or higher, after coating of the above-prepared coating liquid on a support. Further, drying is conducted preferably at a dew point of 20° C. or lower, more preferably at a dew point of 15° C. or lower. Drying is preferably initiated within 10 seconds after the support is coated. A combination of the above conditions results in a preferable production method to achieve the effects of the present invention.

The cellulose ester optical film of the present invention is preferably used as a polarizing plate protective film, an antireflection film, a hard coat film, an antiglare film, a retardation film, an optical compensation film, an antistatic film or a luminance enhancing film as described above.

EXAMPLES

The present invention will be explained below, with reference to Examples, but is not specifically limited thereto. In the examples, "parts" and "%" represent "parts by weight" and "% by weight", respectively, unless otherwise specifically specified.

Example 1

Preparation of Cellulose Ester Optical Film

Example of Synthesis 1

One hundred parts by weight of cellulose acetate propionate as cellulose ester CE-1 (a degree of substitution of acetyl=1.92, a degree of substitution of propionyl=0.74, the total degree of substitution=2.66, weight average molecular weight=220,000 (in terms of polystyrene), a degree of distribution=2.4), 8.0 parts by weight of AMP-1 described previously as the polymer (a), 2.0 parts by weight of Compound 2-1 described previously as the polymer (b), 4.0 parts by weight of KA-1 described later as a plasticizer, 0.25 parts by weight of I-16 described previously as an antioxidant (Sumilizer GS, produced by Sumitomo Chemicals Co., Ltd., which is a commercially available product), 0.5 parts by weight of pentaerythritol tetrakis[3-(3,5-di-tert-butyl-4-hydroxyphenyl)propionate] (Irganox 1010 produced by Ciba Specialty Chemicals K.K. which is a commercially available product), 0.25 parts by weight of tetrakis(2,4-di-tert-butyl-5-methylphenyl)-4,4'-biphenylene diphosphonite (GSY-P101 produced by Sakai Kagaku Kogyo Co., Ltd, which is a commercially available product), and 0.3 parts by weight of fine particles silica with a primary average particle size of 16 µm (AEROSIL $R_{972}$V produced by Nippon Aerosil Co., Ltd., which is a commercially available product) were mixed and dried under reduced pressure at a temperature of 60 C for five hours. This cellulose acylate composition was melted and mixed at 235° C. using a twin screw extruder, whereby pellets were obtained. In this case, to reduce heat generation due to shearing at the time of kneading, an all-screw type screw was utilized and a kneading disk was not. Further, vacuum suction was carried out through a vent hole, and volatile components generated during kneading were removed by the vacuum suction. To avoid absorption of moisture into the resin, a dry nitrogen atmosphere was used in the space between the feeder or hopper for supplying to the extruder and the cooling section downstream the extrusion die.

Film formation was carried out using a film manufacturing apparatus as shown in FIG. 1.

The first cooling roll and second cooling roll were made of stainless steel having a diameter of 40 cm, and the surface was subjected to hard chromium plating. A temperature adjusting oil was circulated inside the roll to control the roll surface temperature. The elastic touch roll had a diameter of 20 cm and the inner sleeve and outer sleeve were made of stainless steel. The surface of the outer sleeve was subjected to hard chromium plating. The outer sleeve had a wall thickness of 2 mm, and a temperature adjusting oil was circulated in the space between the inner sleeve and outer sleeve, whereby the surface temperature of the elastic touch roll was controlled.

Using a single screw extruder, the resulting pellets (moisture content: 50 ppm) were melt-extruded in the form of a film at a melting temperature of 250° C. from the T-die onto the first cooling roll having a surface temperature of 130° C. at a draw ratio of 20, whereby a cast film was produced. In this case, the T-die used had a lip clearance of 1.5 mm and an average surface roughness of Ra 0.01 µm at a lip section. Herein, the draw ratio is a value obtained by dividing the lip clearance of the die by an average thickness of the film cast and solidified.

Further, the film was pressed on the first cooling roll at a linear pressure of 10 kg/cm through an elastic touch roll having a 2 mm thick metal surface. The temperature of the film on the side of the touch roll at the time of pressing was 180° C.±1° C. (The temperature of the film on the touch roll side at the time of pressing herein refers to an average of the film surface temperatures of the film at the position where the touch roll is in contact with the first roll (cooling roll), wherein the touch roll is retracted so that it is not in contact with the cooling roll, and then the film surface temperatures were measured at 10 points of the film across the width at a position 50 cm distant from the film surface through a non-contact thermometer.) The glass transition temperature Tg of this film was 135° C. (The glass transition temperature of the film extruded by the die was measured according to a DSC method (at a temperature rise of 10° C./minute in nitrogen atmosphere) using the DSC6200 produced by Seiko Co., Ltd.

The surface temperature of the elastic touch roll was 130° C., and the surface temperature of the second cooling roll was 100° C. The surface temperature of each of the elastic touch roll, the first cooling roll and second cooling roll were obtained as follows: The temperatures of the roll surface 90 degrees before in the direction of rotation from the position wherein the film contacts the roll for the first time were measured at ten points along the width using a non-contact thermometer, and the average of these measurements was used as the surface temperature of each roll.

The resulting film was heated at 160° C., stretched in the mechanical direction by a magnification of 1.05 through roll stretching, and introduced into a tenter having a preheating zone, a stretching zone, a retaining zone, and a cooling zone (as well as a neutral zone to ensure heat insulation between the zones), and stretched in the transverse direction by a magnification of 1.20 at 150° C. After that, the film was loosened 2% in the transverse direction and the temperature was reduced to 70° C. Then the film was released from the clip and the clip holding section was trimmed off. Both ends of the film were knurled to a width of 10 mm and a height of 5 µm. The resulting film was slit to a width of 1430 mm. Thus, a cellulose ester optical film F-1 with a thickness of 80 µm, which an Ro of 3 nm and an Rt of 50 nm, was prepared. In this case, the preheating temperature and retaining temperature were adjusted to avoid bowing resulting from stretching.

Optical films F-2 through F-45 were prepared in the same manner as above, except that compounds or preparation conditions as shown in Tables 1 and 2 were utilized.

Details of the compounds used and the preparation conditions will be shown below,

TABLE 1

| Film Sample No. | Cellulose Ester | Polymer (a) | | Polymer (b) | | Plasticizer | | Silica Particles | | Melt Temperature (° C.) | Stretching Condition | | Remarks |
|---|---|---|---|---|---|---|---|---|---|---|---|---|---|
| | | Kinds | Added Amount* | Kinds | Added Amount* | Kinds | Added Amount* | Kinds | Added Amount* | | MD () | TD () | |
| F-1 | CE-1 | AMP-1 | 8.00 | 2-1 | 2.0 | KA-1 | 4.0 | M-1 | 0.30 | 250 | 1.05 | 1.20 | Inv. |
| F-2 | CE-1 | AMP-2 | 10.00 | 2-3 | 1.4 | KA-2 | 4.0 | M-1 | 0.30 | 250 | 1.00 | 1.20 | Inv. |
| F-3 | CE-1 | AMP-3 | 8.00 | 2-14 | 2.6 | KA-4 | 6.0 | M-1 | 0.30 | 250 | 1.05 | 1.20 | Inv. |
| F-4 | CE-1 | AMP-4 | 4.00 | 2-23 | 1.9 | KA-5 | 12.0 | M-1 | 0.30 | 250 | 1.30 | 1.50 | Inv. |

TABLE 1-continued

| Film Sample No. | Cellulose Ester | Polymer (a) Kinds | Polymer (a) Added Amount* | Polymer (b) Kinds | Polymer (b) Added Amount* | Plasticizer Kinds | Plasticizer Added Amount* | Silica Particles Kinds | Silica Particles Added Amount* | Melt Temperature (° C.) | Stretching Condition MD () | Stretching Condition TD () | Remarks |
|---|---|---|---|---|---|---|---|---|---|---|---|---|---|
| F-5 | CE-1 | AMP-5 | 12.00 | 2-5 | 1.0 | KA-3 | 8.0 | M-2 | 0.30 | 250 | 1.00 | 1.20 | Inv. |
| F-6 | CE-2 | AMP-6 | 8.00 | 2-1 | 2.0 | KA-1 | 4.0 | M-1 | 0.30 | 250 | 1.10 | 1.20 | Inv. |
| F-7 | CE-2 | AMP-7 | 8.00 | 2-7 | 1.8 | KA-5 | 10.0 | M-2 | 0.30 | 250 | 1.10 | 1.20 | Inv. |
| F-8 | CE-2 | AMP-8 | 8.00 | 3-15 | 0.6 | KA-4 | 2.0 | M-3 | 0.10 | 250 | 1.00 | 1.10 | Inv. |
| F-9 | CE-2 | AMP-9 | 6.00 | 2-3 | 1.4 | KA-2 | 4.0 | M-1 | 0.10 | 250 | 1.20 | 1.60 | Inv. |
| F-10 | CE-2 | AMP-10 | 20.00 | 2-12 | 1.3 | KA-3 | 2.0 | M-1 | 0.30 | 250 | 1.10 | 1.20 | Inv. |
| F-11 | CE-3 | AMP-11 | 8.00 | 2-22 | 0.8 | KA-4 | 4.0 | M-2 | 0.30 | 250 | 1.05 | 1.20 | Inv. |
| F-12 | CE-3 | AMP-12 | 6.00 | 3-11 | 0.8 | KA-5 | 12.0 | M-3 | 0.10 | 250 | 1.10 | 1.10 | Inv. |
| F-13 | CE-3 | AMP-13 | 8.00 | 2-7 | 1.8 | KA-2 | 4.0 | M-1 | 0.30 | 250 | 1.25 | 1.45 | Inv. |
| F-14 | CE-3 | AMP-14 | 8.00 | 3-19 | 1.0 | KA-3 | 4.0 | M-1 | 0.30 | 250 | 1.00 | 1.05 | Inv. |
| F-15 | CE-3 | AMP-15 | 8.00 | 3-11 | 0.8 | KA-5 | 8.0 | M-1 | 0.30 | 240 | 1.00 | 1.05 | Inv. |
| F-16 | CE-4 | AMP-16 | 10.00 | 3-19 | 1.0 | KA-1 | 4.0 | M-3 | 0.10 | 240 | 1.05 | 1.20 | Inv. |
| F-17 | CE-4 | AMP-17 | 8.00 | 2-1 | 2.0 | KA-5 | 4.0 | M-3 | 0.10 | 240 | 1.05 | 1.25 | Inv. |
| F-18 | CE-4 | AMP-18 | 8.00 | 2-3 | 1.4 | KA-3 | 4.0 | M-1 | 0.30 | 240 | 1.05 | 1.20 | Inv. |
| F-19 | CE-4 | AMP-19 | 6.00 | 2-15 | 1.3 | KA-2 | 4.0 | M-2 | 0.30 | 240 | 1.30 | 1.50 | Inv. |
| F-20 | CE-4 | AMP-20 | 8.00 | 2-10 | 1.6 | KA-4 | 4.0 | M-1 | 0.30 | 240 | 1.00 | 1.20 | Inv. |
| F-21 | CE-5 | AMP-21 | 12.00 | 2-15 | 1.3 | KA-1 | 4.0 | M-1 | 0.30 | 220 | 1.05 | 1.15 | Inv. |
| F-22 | CE-5 | AMP-22 | 8.00 | 2-13 | 1.8 | KA-2 | 8.0 | M-2 | 0.30 | 220 | 1.10 | 1.20 | Inv. |
| F-23 | CE-5 | AMP-23 | 8.00 | 2-8 | 1.3 | KA-2 | 4.0 | M-3 | 0.20 | 220 | 1.40 | 1.50 | Inv. |

Inv.: Inventive
*Amount parts by weight based on 100 parts by weight of cellulose ester
(**): Magnification
Sample Nos. F-1 through F-20 contain 0.25 parts by weight of Sumilizer GS, 0.5 parts by weight of Irganox 1010 and 0.25 parts by weight of GSY-P101.

TABLE 2

| Film Sample No. | Cellulose Ester | Polymer (a) Kinds | Polymer (a) Added Amount* | Polymer (b) Kinds | Polymer (b) Added Amount* | Plasticizer Kinds | Plasticizer Added Amount* | Silica Particles Kinds | Silica Particles Added Amount* | Melt Temperature (° C.) | Stretching Condition MD () | Stretching Condition TD () | Remarks |
|---|---|---|---|---|---|---|---|---|---|---|---|---|---|
| F-24 | CE-5 | AMP-24 | 8.00 | 2-5 | 1.0 | KA-1 | 4.0 | M-1 | 0.30 | 220 | 1.10 | 1.20 | Inv. |
| F-25 | CE-5 | AMP-25 | 8.00 | 3-17 | 1.0 | KA-3 | 6.0 | M-1 | 0.30 | 220 | 1.00 | 1.05 | Inv. |
| F-26 | CE-6 | AMP-1 | 8.00 | 2-5 | 1.0 | KA-4 | 4.0 | M-1 | 0.30 | 230 | 1.10 | 1.15 | Inv. |
| F-27 | CE-6 | AMP-2 | 15.00 | 2-17 | 1.2 | KA-1 | 3.0 | M-1 | 0.30 | 230 | 1.05 | 1.20 | Inv. |
| F-28 | CE-6 | AMP-6 | 6.00 | 2-3 | 1.4 | KA-5 | 10.0 | M-2 | 0.30 | 230 | 1.25 | 1.45 | Inv. |
| F-29 | CE-6 | AMP-7 | 8.00 | 2-11 | 1.0 | KA-2 | 4.0 | M-1 | 0.30 | 230 | 1.05 | 1.20 | Inv. |
| F-30 | CE-6 | AMP-11 | 8.00 | 2-8 | 1.3 | KA-3 | 2.0 | M-3 | 0.10 | 230 | 1.10 | 1.15 | Inv. |
| F-31 | CE-7 | AMP-18 | 10.00 | 2-13 | 1.8 | KA-4 | 4.0 | M-1 | 0.30 | 220 | 1.10 | 1.20 | Inv. |
| F-32 | CE-7 | AMP-19 | 8.00 | 2-10 | 1.6 | KA-2 | 8.0 | M-1 | 0.30 | 220 | 1.40 | 1.60 | Inv. |
| F-33 | CE-7 | AMP-20 | 8.00 | 3-19 | 1.0 | KA-1 | 4.0 | M-3 | 0.10 | 220 | 1.10 | 1.15 | Inv. |
| F-34 | CE-7 | AMP-21 | 12.00 | 2-13 | 1.8 | KA-5 | 2.0 | M-2 | 0.30 | 220 | 1.00 | 1.10 | Inv. |
| F-35 | CE-2 | AMP-12 | 8.00 | 2-2 | 1.8 | KA-4 | 4.0 | M-1 | 0.30 | 250 | 1.05 | 1.20 | Inv. |
| F-36 | CE-2 | AMP-13 | 8.00 | 2-3 | 1.4 | KA-5 | 8.0 | M-1 | 0.30 | 250 | 1.05 | 1.20 | Inv. |
| F-37 | CE-2 | AMP-14 | 8.00 | 2-14 | 2.6 | KA-1 | 10.0 | M-2 | 0.30 | 250 | 1.10 | 1.20 | Inv. |
| F-38 | CE-2 | AMP-6 | 8.00 | 2-1 | 2.0 | — | — | M-1 | 0.30 | 250 | 1.10 | 1.20 | Inv. |
| F-39 | CE-2 | AMP-6 | 8.00 | — | — | KA-1 | 4.0 | M-1 | 0.30 | 250 | 1.10 | 1.20 | Comp. |
| F-40 | CE-2 | AMP-6 | 8.00 | — | — | KA-1 | 4.0 | M-1 | 0.30 | 250 | 1.10 | 1.20 | Comp. |
| F-41 | CE-2 | AMP-9 | 20.00 | — | — | — | — | M-1 | 0.30 | 250 | 1.10 | 1.20 | Comp. |
| F-42 | CE-2 | — | — | 2-1 | 2.0 | KA-1 | 8.0 | M-1 | 0.30 | 250 | 1.10 | 1.20 | Comp. |
| F-43 | CE-2 | AMP-26 | 8.00 | 2-1 | 2.0 | KA-1 | 4.0 | M-1 | 0.30 | 250 | 1.10 | 1.20 | Comp. |
| F-44 | CE-2 | AMP-27 | 10.00 | 2-1 | 2.0 | KA-1 | 4.0 | M-1 | 0.30 | 250 | 1.10 | 1.20 | Comp. |
| F-45 | CE-2 | AMP-28 | 8.00 | 2-1 | 2.0 | KA-1 | 4.0 | M-1 | 0.30 | 250 | 1.10 | 1.20 | Comp. |

Inv.: Inventive,
Comp.: Comparative
*Amount parts by weight based on 100 parts by weight of cellulose ester
(**): Magnification
Sample Nos. F-26 through F-30 and F-35 through F-44 contain 0.25 parts by weight of Sumilizer GS, 0.5 parts by weight of Irganox 1010 and 0.25 parts by weight of GSY-P101.
Sample No. F-38 contains 1.2 parts by weight of Comparative compound T-1.

The addition amount of each compound is an amount in terms of parts by weight based on 100 parts by weight of cellulose ester.

(Cellulose Ester)
CE-2: Cellulose acetate propionate, a degree of substitution of acetyl=1.41, a degree of substitution of propionyl=1.32, the total degree of substitution=2.73, weight average molecular weight=220,000 (in terms of polystyrene), a degree of distribution=3.2

CE-3: Cellulose acetate propionate, a degree of substitution of acetyl=1.63, a degree of substitution of propionyl=1.21, the total degree of substitution=2.84, weight average molecular weight=230,000 (in terms of polystyrene), a degree of distribution=2.9

CE-4: Cellulose acetate propionate, a degree of substitution of acetyl=1.31, a degree of substitution of propionyl=1.23, the total degree of substitution=2.54, weight average molecular weight=200,000 (in terms of polystyrene), a degree of distribution=3.0

In the above, a degree of distribution represents (weight average molecular weight/number average molecular weight).

CE-5: Cellulose acetate propionate, a degree of substitution of acetyl=0.07, a degree of substitution of propionyl=2.65, the total degree of substitution=2.72, weight average molecular weight=260,000 (in terms of polystyrene), a degree of distribution=3.3

CE-6: Cellulose acetate butyrate, a degree of substitution of acetyl=2.10, a degree of substitution of butyryl=0.73, the total degree of substitution=2.83, weight average molecular weight=230,000 (in terms of polystyrene), a degree of distribution=3.5

CE-7: Cellulose acetate butyrate, a degree of substitution of acetyl=1.05, a degree of substitution of butyryl=1.78, the total degree of substitution=2.83, weight average molecular weight=280,000 (in terms of polystyrene), a degree of distribution=3.6

(Polymer (a) Described Above)

Synthetic Example 1

A copolymer (AMP-6) of Exemplified compound AM-2 and methyl methacrylate was synthesized according to the following procedures.

125 g of a polymerization material, in which 2.0 parts by weight of lauroyl peroxide, 0.25 parts by weight of n-octylmercaptan and 0.1 parts by weight of stearyl alcohol were mixed in 100 parts by weight of a monomer mixture containing 20% by weight of Exemplified compound AM-2 and 80% by weight of methyl methacrylate, and 250 g of pure water, in which 0.2 g of an aqueous 1% sodium polymethacrylate solution, 0.05 g of sodium dihydrogen phosphate and 0.15 g of disodium hydrogen phosphate, were placed in a flask with a stirrer, subjected to polymerization at 70° C. for three hours under nitrogen atmosphere, and subjected to further polymerization at 100° C. for one hour. After polymerization, the reaction mixture was cooled, filtered, washed and dried to obtain copolymer (AMP-6) in the form of beads. The weight average molecular weight and Mw/Mn of this copolymer proved to be 12000 and 2.8, respectively, the molecular weight measured according to GPC analysis employing standard polystyrene as a reference.

The copolymer obtained above has proved to be a copolymer of Exemplified compound AM-2 and methyl methacrylate according to the NMR spectra. The copolymer had a composition of an AM-2 to methyl methacrylate ratio of 20:80.

Synthetic Example 2

A copolymer (AMP-8) of Exemplified compound AM-2 and methyl acrylate was synthesized according to the following procedures.

10 g of a monomer mixture containing 50% by weight of Exemplified compound AM-2 and 50% by weight of methyl methacrylate were added to 100 ml of toluene, and further, 0.1 g of azobisisobutyronitrile were added. The resulting mixture was heated at 80° C. for 5 hours under nitrogen atmosphere. After 70 ml of toluene were evaporated under reduced pressure, the resulting reaction mixture was poured into an excessive amount of methanol to produce precipitates. The resulting precipitates were filtered out, washed and dried to obtain a copolymer (AMP-8) in the form of powder. The weight average molecular weight and Mw/Mn of this copolymer proved to be 30000 and 3.0, respectively, the molecular weight measured according to GPC analysis employing standard polystyrene as a reference.

The copolymer obtained above has proved to be a copolymer of Exemplified compound AM-2 and methyl acrylate according to the NMR spectra. The copolymer had a composition of an AM-2 to methyl acrylate ratio of 50:50.

Synthetic Example 3

A copolymer (AMP-13) of Exemplified compound AM-2, methyl methacrylate and methyl acrylate was synthesized according to the following procedures.

125 g of a polymerization material, in which and 1.5 parts by weight of azobisisobutyronitrile, 0.25 parts by weight of n-octylmercaptan and 0.1 parts by weight of stearyl alcohol were mixed in 100 parts by weight of a monomer mixture containing 20% by weight of Exemplified compound AM-2, 70% by weight of methyl methacrylate and 10% by weight of methyl acrylate, and 250 g of pure water, in which 0.2 g of an aqueous 1% sodium polymethacrylate solution, 0.05 g of sodium dihydrogen phosphate and 0.15 g of disodium hydrogen phosphate, were placed in a flask with a stirrer, subjected to polymerization at 70° C. for three hours under nitrogen atmosphere, and subjected to further polymerization at 100° C. for one hour. After polymerization, the reaction mixture was cooled, filtered, washed and dried to obtain copolymer (AMP-13) in the form of beads. The weight average molecular weight and Mw/Mn of this copolymer proved to be 15000 and 3.7, respectively, the molecular weight measured according to GPC analysis employing standard polystyrene as a reference.

The copolymer obtained above has proved to be a copolymer of Exemplified compound AM-2, methyl methacrylate and methyl acrylate according to the NMR spectra. The copolymer had a composition of an AM-2/methyl methacrylate/methyl acrylate ratio of 20:70:10.

AMP-1 through AMP-5, AMP-7, AMP-9 through AMP-12 and AMP-14 through AMP-25, each belonging to polymer (a), were prepared in the same manner as in Synthetic example 1, except that monomers as shown in Table 3 were used. The weight average molecular weight and the monomer composition ratio of the resulting polymers were determined in the same manner as in Synthetic example 1. Comparative polymers AMP-26 through AMP-28 were prepared in the same manner as in Synthetic example 1, except that monomers as shown in Table 3 were used. Details of the polymers synthesized above are shown in Table 3.

TABLE 3

| Polymer (a) | Kinds of Monomer Composition (weight ratio) | | | Weight Average Molecular Weight | Remarks |
|---|---|---|---|---|---|
| AMP-1 | AM-1 (20) | MMA (80) | — | 22000 | Inv. |
| AMP-2 | AM-1 (40) | MMA (60) | — | 9000 | Inv. |
| AMP-3 | AM-1 (50) | MA (50) | — | 38000 | Inv. |
| AMP-4 | AM-1 (50) | ST (50) | — | 14000 | Inv. |
| AMP-5 | AM-1 (50) | VAC (50) | — | 20000 | Inv. |
| AMP-6 | AM-2 (20) | MMA (80) | — | 12000 | Inv. |
| AMP-7 | AM-2 (50) | MMA (40) | ST (10) | 13000 | Inv. |
| AMP-8 | AM-2 (50) | MA (50) | — | 30000 | Inv. |
| AMP-9 | AM-2 (60) | ST (40) | — | 7000 | Inv. |
| AMP-10 | AM-2 (50) | VAC (50) | — | 9000 | Inv. |
| AMP-11 | AM-2 (20) | MMA (80) | — | 5000 | Inv. |

TABLE 3-continued

| Polymer (a) | Kinds of Monomer Composition (weight ratio) | | | Weight Average Molecular Weight | Remarks |
|---|---|---|---|---|---|
| AMP-12 | AM-2 (10) | MMA (80) | MA (10) | 3000 | Inv. |
| AMP-13 | AM-2 (20) | MMA (70) | MA (10) | 15000 | Inv. |
| AMP-14 | AM-2 (30) | MMA (70) | — | 8000 | Inv. |
| AMP-15 | AM-3 (50) | HEMA (50) | — | 79000 | Inv. |
| AMP-16 | AM-4 (30) | MMA (70) | — | 38000 | Inv. |
| AMP-17 | AM-5 (50) | MMA (30) | HEMA (20) | 65000 | Inv. |
| AMP-18 | AM-5 (50) | MA (50) | — | 21000 | Inv. |
| AMP-19 | AM-5 (30) | HEMA (70) | — | 19000 | Inv. |
| AMP-20 | AM-5 (50) | HEA (50) | — | 12000 | Inv. |
| AMP-21 | AM-5 (40) | HEMA (30) | ST (30) | 2000 | Inv. |
| AMP-22 | AM-6 (20) | MMA (80) | — | 30000 | Inv. |
| AMP-23 | AM-7 (40) | MMA (60) | — | 15000 | Inv. |
| AMP-24 | AM-13 (30) | MA (70) | — | 45000 | Inv. |
| AMP-25 | AM-15 (60) | HEMA (40) | — | 73000 | Inv. |
| AMP-26 | — | MMA (100) | — | 10000 | Comp. |
| AMP-27 | MMA (80) | MMA (10) | HEMA (10) | 15000 | Comp. |
| AMP-28 | — | MMA (80) | HEMA (20) | 8000 | Comp. |

Inv.: Inventive,
Comp.: Comparative
MMA: Methyl methacrylate
MA: Methyl acrylate
HEMA: 2-hydroxyethyl methacrylate
HEA: 2-hydroxyethyl acrylate
ST: Styrene
VAC: Vinyl acetate (Comparative Compound)

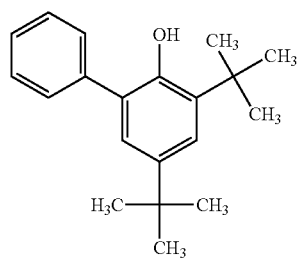

OT-1

(Plasticizer)

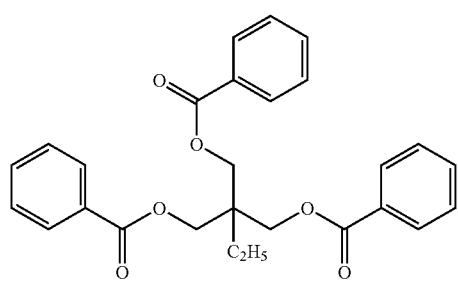

KA-1

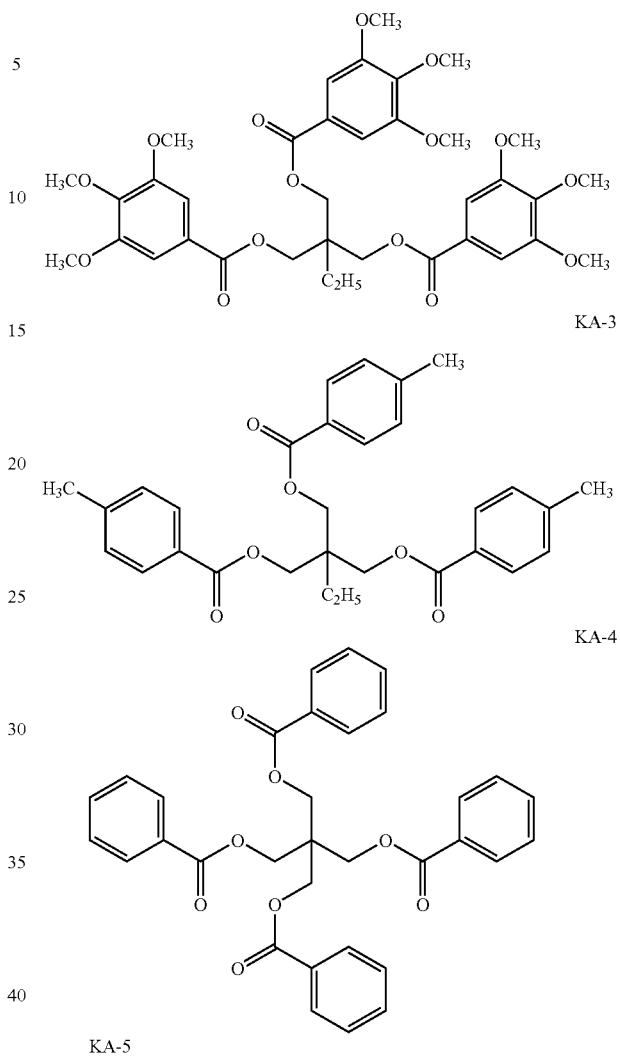

KA-2, KA-3, KA-4, KA-5

OT-1 Benzoic Acid Ester of Sucrose
(A Mixture Containing Mainly a Compound Having the Following Structure Obtained by Reaction of Benzoic Acid with Sucrose)

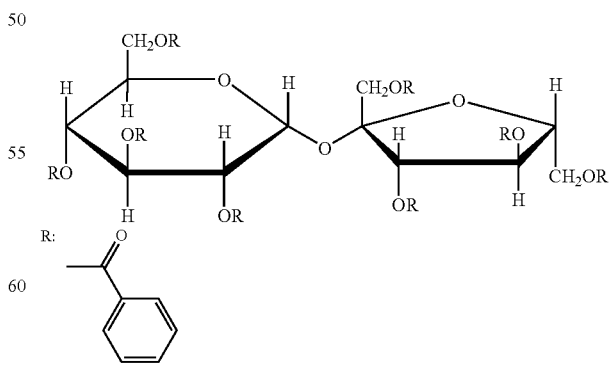

(Fine Particles)
M-2: AEROSIL NAX 50 produced by Nippon Aerosil Co., Ltd.

M-3: SEAHOSTAR KE-P100 produced by Nippon Shokubai Co., Ltd.

[Evaluation of Cellulose Ester Optical Film]

The following evaluation was carried out with respect to film samples prepared above. The results are shown in Table 4.

(Slitting Property)

An oil pressure table presser was equipped with an upper edge ground at 60° and a lower edge at 90°, the distance between them being 30 μm. Each cellulose ester optical film was placed between both edges, and then the upper edge was lowered down at a speed of 6 m/minute to cut the film continuously, whereby 100 samples with a size of 90 cm (width)× 100 cm (length) were obtained. The section of the samples obtained above was observed through an optical microscope by a magnification of 50. The number of film samples which caused defects such as occurrence of burrs or cracks, incapability of cutting, or occurrence of scraps was counted, and the defect rate was determined. The film sample was evaluated for cutting properties according to the following criteria.

A: The defect rate was less than 2%.
B: The defect rate was from 2 to less than 5%.
C: The defect rate was from 5 to less than 10%.
D: The defect rate was more than 10%.

Herein, ratings A and B were judged to be practically non-problematic.

(Durability After Saponification)

The resulting cellulose ester optical film was subjected to alkaline saponification under the following conditions.

(Alkaline Saponification)

| | | |
|---|---|---|
| Saponification process: 2 mol/L of sodium hydroxide | 60° C. | 90 seconds |
| Water washing process: Water | 30° C. | 45 seconds |
| Neutralization process: 10% by weight HCl | 30° C. | 45 seconds |
| Water washing process: Water | 30° C. | 45 seconds |

The film was subjected to saponification, water washing, neutralization, water washing in that order under the above conditions, and then to sufficient removal of water, and was air-dried.

The cellulose ester film sample after saponification was allowed to stand under high temperature and high humidity of 80° C. and 90% RH for 300 hours, and then the surface of the film was visually observed for crystal bleed-out and evaluated according to the following criteria.

A: No crystal bleed-out was observed on the film surface.
B: A slight crystal bleed-out was observed on a part of the film surface.
C: A slight crystal bleed-out was observed over the entire surface of the film.
D: Apparent crystal bleed-out was observed over the entire surface of the film.

In the above, ratings A and B were judged as be practically non-problematic.

TABLE 4

| Cellulose Ester Optical Film Sample No. | Retardation Ro (nm) | Rt (nm) | Slitting Property | Bleed-out after Saponification | Remarks |
|---|---|---|---|---|---|
| F-1 | 3 | 50 | B | A | Inv. |
| F-2 | 4 | 49 | B | A | Inv. |
| F-3 | 3 | 47 | B | B | Inv. |
| F-4 | 53 | 116 | B | A | Inv. |
| F-5 | 5 | 46 | B | A | Inv. |
| F-6 | 4 | 46 | A | A | Inv. |
| F-7 | 3 | 42 | A | A | Inv. |
| F-8 | 4 | 47 | A | B | Inv. |
| F-9 | 48 | 114 | A | A | Inv. |
| F-10 | 5 | 48 | A | A | Inv. |
| F-11 | 4 | 44 | A | A | Inv. |
| F-12 | 2 | 43 | A | B | Inv. |
| F-13 | 50 | 120 | A | A | Inv. |
| F-14 | 5 | 49 | A | A | Inv. |
| F-15 | 4 | 49 | B | B | Inv. |
| F-16 | 4 | 43 | B | B | Inv. |
| F-17 | 4 | 47 | B | A | Inv. |
| F-18 | 5 | 51 | B | A | Inv. |
| F-19 | 55 | 118 | B | B | Inv. |
| F-20 | 3 | 44 | B | A | Inv. |
| F-21 | 5 | 45 | B | B | Inv. |
| F-22 | 4 | 48 | B | B | Inv. |
| F-23 | 51 | 121 | B | A | Inv. |
| F-24 | 5 | 43 | B | A | Inv. |
| F-25 | 4 | 45 | B | B | Inv. |
| F-26 | 5 | 42 | B | A | Inv. |
| F-27 | 4 | 41 | B | B | Inv. |
| F-28 | 47 | 116 | A | A | Inv. |
| F-29 | 3 | 42 | A | A | Inv. |
| F-30 | 4 | 43 | A | A | Inv. |
| F-31 | 3 | 44 | B | B | Inv. |
| F-32 | 53 | 117 | B | A | Inv. |
| F-33 | 3 | 41 | B | B | Inv. |
| F-34 | 5 | 42 | B | B | Inv. |
| F-35 | 7 | 45 | A | A | Inv. |
| F-36 | 3 | 42 | A | A | Inv. |
| F-37 | 5 | 44 | A | B | Inv. |
| F-38 | 5 | 51 | B | B | Inv. |
| F-39 | 6 | 48 | C | D | Comp. |
| F-40 | 5 | 50 | D | D | Comp. |
| F-41 | 5 | 46 | D | D | Comp. |
| F-42 | 4 | 48 | C | D | Comp. |
| F-43 | 5 | 51 | D | C | Comp. |
| F-44 | 7 | 63 | D | C | Comp. |
| F-45 | 8 | 62 | C | C | Comp. |

Inv.: Inventive,
Comp.: Comparative

As is apparent from Table 4, the inventive optical films have excellent slitting property and excellent durability after saponification, as compared with the comparative optical films. That is, it is apparent that addition of plasticizer, the polymer (a) and the compound (b) in cellulose ester provides preferable synergic effects, resulting in improvement of performance.

Example 2

Preparation of Antireflection Film and Polarizing Plate

A hard coat layer and an antireflection layer were formed on one surface of each of optical films F-1 through F-3, F-5 through F-8, F-10 through F-12, F-14 through F-18, F-20 through F-22, F-24 through F-27, F-29 through F-31 and F-33 through F-45 prepared in Example 1, whereby antireflection films with a hard coat layer were prepared. Further, by the use of these films, polarizing plates were prepared.

(Hard Coat Layer)

The following hard coat layer coating composition (1) was coated to form a layer with a dry thickness of 3.5 μm, and dried for 1 minute at 80° C. Next, the resulting layer was cured at an exposure of 150 mJ/cm² through a high pressure mercury lamp (80W) to obtain a hard coat film with a hard coat layer. The refractive index of the hard coat layer was 1.50.

<Hard Coat Layer Coating Composition (1)>

| | |
|---|---|
| Dipentaerythritol hexaacrylate (including a dimer or multimer in an amount of about 20%) | 108 parts by weight |
| Irgacure 184 (manufactured by Ciba Specialty Chemicals Inc.) | 2 parts by weight |
| Propylene glycol monomethyl ether | 180 parts by weight |
| Ethyl acetate | 120 parts by weight |

Subsequently, the following medium refractive index layer, high refractive index layer and low refractive index layer were coated on the hard coat layer in that order to form an antireflection layer.

(Medium Refractive Index Layer)

On the hard coat layer of the above-mentioned hard coat film, the following medium refractive index layer composition was coated through an extrusion coater, and dried for 1 minute under condition of 80° C. and 0.1 m/second. At this time, a non-contact type floater was used until drying perceived by finger touch was completed (dryness was perceived by feeling the coated layer surface with fingers). As the non-contact type floater, a horizontal floater type air turnbar manufactured by Bellmatic Co. Ltd. was used. The resulting coated film was conveyed while floated uniformly in the width direction by about 2 mm at a floater inner static pressure of 9.8 kPa. The coated layer after dried was irradiated with ultraviolet rays at 130 mJ/cm² employing a high pressure mercury lamp (BOW), and cured, whereby a medium refractive index layer film with a medium refractive index layer was prepared. The medium refractive index layer of the medium refractive index layer film had a thickness of 84 nm and a refractive index of 166.

(Medium Refractive Index Layer Composition)

| | |
|---|---|
| 20% ITO particle dispersion (average particle size of 70 nm, isopropyl alcohol solution) | 100 g |
| Dipentaerythritol hexaacrylate | 6.4 g |
| Irgacure 184 (manufactured by Ciba Specialty Chemicals Inc.) | 1.6 g |
| Tetrabutoxytitanium | 4.0 g |
| 10% FZ-2207 (manufactured by Nippon Unicar Company, propylene glycol monomethyl ether solution) | 3.0 g |
| Isopropyl alcohol | 530 g |
| Methyl ethyl ketone | 90 g |
| Propylene glycol monomethyl ether | 265 g |

<High Refractive Index Layer>

On the medium refractive index layer, the following high refractive index layer composition was coated with an extrusion coater, and dried for 1 minute under the condition of 80° C. and 0.1 m/second. At this time, a non-contact type floater was used until drying perceived by finger touch was completed (dryness was perceived by feeling the coated layer surface with fingers). The non-contact type floater was used under the same condition as the medium refractive index layer. The coated layer after dried was irradiated with ultraviolet rays at 130 mJ/cm², employing a high pressure mercury lamp (80 W), and cured, whereby a high refractive index layer film with a high refractive index layer was prepared.

<High Refractive Index Layer Composition>

| | |
|---|---|
| Tetra(n)butoxytitanium | 95 parts by weight |
| Dimethyl polysiloxane (KF-96-1000CS manufactured by Shin-Etsu Chemical Company) | 1 part by weight |
| γ-Methacryloxypropyltrimethoxysilane (KBM503 manufactured by Shin-Etsu Chemical Company) | 5 parts by weight |
| Propylene glycol monomethyl ether | 1750 parts by weight |
| Isopropyl alcohol | 3450 parts by weight |
| Methyl ethyl ketone | 600 parts by weight |

The high refractive index layer of this high refractive index layer film had a thickness of 50 μm and a refractive index of 1.82.

<Low Refractive Index Layer>

Firstly, silica type particles (hollow particles) were prepared.

(Preparation of Silica Type Particles S-1)

A mixture of 100 g of silica sol having an average particle size of 5 nm and a $SiO_2$ concentration of 20% by weight and 1900 g of pure water was heated to 80° C. The resulting reaction mother solution had a pH of 10.5. To this reaction mother solution were simultaneously added 9000 g of an aqueous solution containing sodium silicate in an amount of 0.98% by weight in terms of $SiO_2$ and 9000 g of an aqueous solution containing sodium aluminate in an amount of 1.02% by weight in terms of $Al_2O_3$. During the addition, the temperature of the reaction solution was kept at 80° C. The pH of the reaction solution rose to 12.5 immediately after addition of those solutions, and during addition, the pH hardly changed. After the completion of the addition, the reaction solution was cooled to room temperature and washed with a ultrafiltration membrane, whereby a $SiO_2$—$Al_2O_3$ core particle dispersion solution having a solid concentration of 20% by weight was prepared. (Process (a))

The resulting core particle dispersion solution of 500 g was added with 1700 g of pure water, heated to 98° C., and further added with 3000 g of a silicic acid solution (having a $SiO_2$ concentration of 3.5% by weight) obtained by dealkalization of a sodium silicate aqueous solution with a cation exchange resin, while keeping that temperature, thereby obtaining a dispersion solution of core particles with a first silica covered layer. (Process (b))

Next, the dispersion solution of the core particles with a first silica covered layer was washed with an ultrafiltration membrane so as to have a solid concentration of 13% by weight. The resulting core particle dispersion of 500 g was added with 1125 g of pure water, further dropwise added with concentrated hydrochloric acid (35.5%) to give a pH of 1.0, whereby dealumination treatment was conducted. Subsequently, dissolved aluminum salts were separated employing an ultrafiltration membrane, while adding 10 L of a hydrochloric acid aqueous solution having a pH of 3 and 5 L of pure water. Thus, a dispersion solution of $SiO_2$—$Al_2O_3$ porous particles, in which a part of constituents of the core particles with a first silica covered layer was removed, was prepared. (Process (c))

A mixture solution of 1500 g of the above porous particle dispersion solution, 500 g of pure water, 1750 g of ethanol and 626 g of a 28% aqueous ammonia was heated to 35° C., and added with 104 g of ethyl silicate (28% by weight of $SiO_2$), whereby the surface of the porous particles with the first silica covered layer was covered with a hydrolysis polycondensate of the ethyl silicate to form a second silica covered layer.

Subsequently, the solvent of the resulting solution was substituted with ethanol by the use of an ultrafiltration membrane, whereby a silica type particle dispersion solution having a solid concentration of 20% by weight was prepared.

The thickness of the first silica covered layer, the average particle size, $MO_x/SiO_2$ (mol ratio) and the refractive index of the silica type particles are indicated in Table 5. Herein, the average particle size was measured by a dynamic light scattering method, and the refractive index was measured according to the following procedures, employing Series A, AA produced by CARGILL Co. Ltd. as a reference refractive liquid.

(Method of Measuring Refractive Index of Particles)

(1) The particle dispersion solution is incorporated in an evaporator and the dispersion medium is evaporated.

(2) The resulting residue is dried at 120° C. to obtain a powder.

(3) A few droplets of a reference refractive liquid having a known refractive index are dropped onto a glass plate and mixed with the powder obtained above.

(4) The operation (3) above is carried out employing various reference refractive liquids, and the refractive index of a reference index liquid providing a transparent mixture is defined as a refractive index of the colloidal particles.

TABLE 5

| | | Silica Covering Layer | | | Silica Particle | | |
|---|---|---|---|---|---|---|---|
| | Core Particle | Thickness | Thickness | Outer | | Average | |
| No. | Kinds | $MO_x/SiO_2$ mol ratio | of $1^{st}$ Layer (nm) | of $2^{nd}$ Layer (nm) | Shell Thickness (nm) | $MO_x/SiO_2$ mol ratio | particle diameter (nm) | Refractive Index |
| P-1 | Al/Si | 0.5 | 3 | 5 | 8 | 0.0017 | 47 | 1.28 |

(Formation of Low Refractive Index Layer)

In a matrix in which 95% by mol of $Si(OC_2H_5)_4$ and 5% by mol of $C_3F_7$—$(OC_3F_6)_{24}$—O—$(CF_2)_2$—$C_2H_4$—O—$CH_2Si(OCH_3)_3$ were mixed, 35% by weight of the above silica type particles S-1 having an average particle size of 60 nm was added. The resulting mixture was added with 1.0N HCl as a catalyst, and further diluted with a solvent to obtain a low refractive index coating solution. The coating solution was coated on the above actinic ray cured resin layer or the high refractive index layer through a die coater method to give a thickness of 100 nm, dried at 120° C. for one minute, and subjected to ultraviolet ray irradiation. Thus, a low refractive index layer having a refractive index of 1.37 was formed.

Thus, antireflection films G-1 through G-3, G-5 through G-8, G-10 through G-12, G-14 through G-18, G-20 through G-22, G-24 through G-27, G-29 through G-31, and G-33 through G-45 were prepared from cellulose ester optical films F-1 through F-3, F-5 through F-8, F-10 through F-12, F-14 through F-18, F-20 through F-22, F-24 through F-27, F-29 through F-31, and F-33 through F-45 prepared in Example 1, respectively.

[Evaluation of Antireflection Film]

In order to check the layer strength of the antireflection films obtained above, scratch resistance was evaluated according to the following method. The results are shown in Table 6.

(Scratch Resistance)

Each film sample was stored at 23° C. and at 55% RH, and steel wool (SW) of #0000 with a 200 g/cm² load applied was put on the surface on the anti-reflection layer side of the resulting sample. The number per 1 cm width of scratches produced on the layer surface after the steel wool was reciprocated 10 times was counted. The scratch number was counted at portions where the most scratches were produced, and evaluated according to the following criteria.

A: Zero to five scratches per cm occurred.
B: Six to ten scratches per cm occurred.
C: Eleven to twenty scratches per cm occurred.
D: Twenty-one or more scratches per cm occurred.

In the above, ratings A and B were judged as be practically non-problematic.

TABLE 6

| Antireflection film sample No. | Scratch Resistance | Remarks |
|---|---|---|
| G-1 | A | Invention |
| G-2 | A | Invention |
| G-3 | A | Invention |
| G-5 | A | Invention |
| G-6 | A | Invention |
| G-7 | A | Invention |
| G-8 | A | Invention |
| G-10 | A | Invention |
| G-11 | A | Invention |
| G-12 | A | Invention |

TABLE 6-continued

| Antireflection film sample No. | Scratch Resistance | Remarks |
|---|---|---|
| G-13 | A | Invention |
| G-14 | A | Invention |
| G-15 | B | Invention |
| G-16 | A | Invention |
| G-17 | B | Invention |
| G-18 | B | Invention |
| G-20 | B | Invention |
| G-21 | B | Invention |
| G-22 | A | Invention |
| G-24 | A | Invention |
| G-25 | B | Invention |
| G-26 | A | Invention |
| G-27 | A | Invention |
| G-29 | A | Invention |
| G-30 | A | Invention |
| G-31 | B | Invention |
| G-33 | B | Invention |
| G-34 | B | Invention |
| G-35 | A | Invention |
| G-36 | A | Invention |
| G-37 | A | Invention |
| G-38 | B | Invention |
| G-39 | D | Comparative |
| G-40 | D | Comparative |
| G-41 | D | Comparative |
| G-42 | C | Comparative |
| G-43 | D | Comparative |
| G-44 | C | Comparative |
| G-45 | C | Comparative |

It has proved that antireflection films G-1 through G-3, G-5 through G-8, G-10 through G-12, G-14 through G-18, G-20 through G-22, G-24 through G-27, G-29 through G-31, and G-33 through G-38, which were prepared from inventive optical films F-1 through F-3, F-5 through F-8, F-10 through F-12, F-14 through F-18, F-20 through F-22, F-24 through F-27, F-29 through F-31, and F-33 through F-38, exhibit excellent scratch resistance. In contrast, antireflection films G-39 through G-45, which were prepared from comparative optical films F-39 through F-45 in Example 1, exhibit poor scratch resistance.

Subsequently, a polyvinyl alcohol film having a thickness of 120 μm was subjected to uniaxial stretching (temperature of 110° C., draw magnification of 5 times). The resulting film was immersed in an aqueous solution composed of 0.075 g of iodine, 5 g of potassium iodide and 100 g of water for 60 seconds, then further immersed in an aqueous solution composed of 6 g of potassium iodide, 7.5 g of boric acid and 100 g of water at 68° C., washed with water and dried, whereby a polarizing film was obtained.

Next, in accordance with the following processes 1 to 5, the above antireflection film was laminated on the polarizing film, and a cellulose ester optical film on the back side of the polarizing film, whereby a polarizing plate was prepared. As the polarizing plate protective film on the back side of the polarizing film, commercially available cellulose ester optical film Konica Minolta TAC KC8UCR-4 (produced by Konica Minolta Opt Co., Ltd.) was used.

Process 1: The above antireflection film was immersed in a 2 mol/L sodium hydroxide solution at 60° C. for 90 seconds, washed with water and dried. Thus, an antireflection film having a saponified surface was obtained, the polarizing film being to be adhered to the saponified surface.

Process 2: The polarizing film was immersed in a bath of a polyvinyl alcohol adhesive having a solid component of 2% by weight for 1 to 2 seconds.

Process 3: An excessive amount of the adhesive remaining on the polarizing film processed in Process 2 was removed by being lightly wiped and the polarizing film was laminated on the optical film processed in Process 1.

Process 4: The laminate of the antireflection film and the polarizing film obtained in Process 3 and a cellulose ester optical film were pasted with a pressure of 20 to 30 N/cm$^2$ and a conveying speed of about 2 m/minute.

Process 5: The laminate sample of the polarizing film, the cellulose ester optical film and the antireflection film obtained in Process 4 were dried at 80° C. for 2 minutes in a drying device, whereby a polarizing plate was prepared.

[Preparation of Liquid Crystal Display]

A liquid crystal panel to conduct a view angle measurement was prepared as follows and performance as a liquid crystal display was evaluated.

Two polarizing plates provided in a 15 type Display VL-150SD manufactured by Fujitsu Co., Ltd. were peeled off, and the above-obtained polarizing plates were laminated on a glass surface on each side of a liquid crystal cell, respectively.

At this time, the lamination of the polarizing plates was carried out so that the surface of the above antireflection film was on the side viewing the liquid crystal display and the absorption axis was in the direction same as that of the original polarizing plates. Thus, each liquid crystal display was prepared.

The polarizing plates and liquid crystal displays, which were prepared employing inventive antireflection films G-1 through G-3, G-5 through G-8, G-10 through G-12, G-14 through G-18, G-20 through G-22, G-24 through G-27, G-29 through G-31, and G-33 through G-38, exhibited displaying properties without unevenness of reflection color and with excellent contrast. While the polarizing plates and liquid crystal displays, which were prepared employing comparative antireflection films G-39 through G-45, produced unevenness of reflection color.

Example 3

A hard coat layer and an antistatic layer were coated on one side of each of optical films F-1 through F-3, F-5 through F-8, F-10 through F-12, F-14 through F-18, F-20 through F-22, F-24 through F-27, F-29 through F-31, and F-33 through F-45, prepared in Example 1 to obtain a hard coat film. Further, a polarizing plate was prepared employing the hard coat film.

(Coating Compositions)

| (Antistatic layer coating composition) | |
|---|---|
| Polymethyl methacrylate (weight average molecular weight: 550,000; Tg: 90° C.) | 0.5 parts |
| Propylene glycol monomethyl ether | 60 parts |
| Methyl ethyl ketone | 16 parts |
| Ethyl lactate | 5 parts |
| Methanol | 8 parts |
| Conductive polymer resin P-1 described later (Particle size: 0.1-0.3 μm) | 0.5 parts |

| (Hard coat layer coating composition (2)) | |
|---|---|
| Dipentaerythritol hexacrylate monomer | 60 parts |
| Dipentaerythritol hexacrylate dimer | 20 parts |
| Dipentaerythritol hexacrylate oligomer (with three or more of dipentaerythritol hexacrylate unit) | 20 parts |
| Diethoxybenzophenone photoinitiator | 6 parts |
| Silicon-contained surface active agent | 1 part |
| Propylene glycol monomethyl ether | 75 parts |
| Methyl ethyl ketone | 75 parts |

| (Anti-curl layer coating composition) | |
|---|---|
| Acetone | 35 parts |
| Ethyl acetate | 45 parts |
| Isopropyl alcohol | 5 parts |
| Diacetyl cellulose | 0.5 parts |
| 2% superfine silica particle acetone dispersion (Aerosil 200 V, manufactured by Nippon Aerosil Co., Ltd.) | 0.1 parts |

Conductive polymer resin P-1

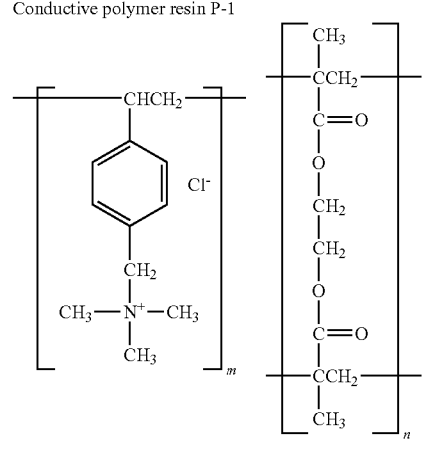

m:n = 93:7

Hard coat film samples were prepared according to the following procedures.

Onto one surface of each of the cellulose ester optical film sample, which were prepared in Example 1, the anti-curl layer coating composition was applied using a gravure coating method so that the wet coating thickness was 13 μm, and then dried at a drying temperature of 80±5° C. to form an anti-curl layer. The surface of the resulting cellulose ester optical film opposite the anti-curl layer was coated with the antistatic layer coating composition at 28° C. and 82% RH, at a film conveyance speed of 30 m/min, and at a coating width of 1 m so that the wet coating thickness was 7 μm, and then dried at the drying section which was set at 80±5° C. to form an anti-static layer with a dry coating thickness of 0.2 μm. Further, the hard coat layer coating composition (2) was coated on the antistatic layer so that the wet thickness was 13 μm, then dried at a drying temperature of 90° C., and then subjected to ultraviolet ray irradiation at 150 mJ/m$^2$ to form a clear hard coat layer with a dry thickness of 5 μm. Thus, hard coat film samples H-1 through H-3, H-5 through H-8, H-10 through H-12, H-14 through H-18, H-20 through H-22, H-24 through H-27, H-29 through H-31, and H-33 through H-45 were prepared.

Inventive optical films F-1 through F-3, F-5 through F-8, F-10 through F-12, F-14 through F-18, F-20 through F-22, F-24 through F-27, F-29 through F-31, and F-33 through F-38, which were prepared in Example 1, exhibited favorable coating properties. However, antireflection films prepared employing comparative optical films F-39 through F-45, when coating was carried out under high humidity, caused brushing and produced minute cracks after drying.

[Evaluation of Hard Coat Film]

In the same manner as Example 2, the hard coat layer side surface of each of the hard coat films H-1 through H-3, H-5 through H-8, H-10 through H-12, H-14 through H-18, H-20 through H-22, H-24 through H-27, H-29 through H-31, and H-33 through H-45 obtained above were evaluated for scratch resistance in order to check the layer strength of the respective films. The results are shown in Table 7.

TABLE 7

| Antireflection film sample No. | Scratch Resistance | Remarks |
|---|---|---|
| H-1 | A | Invention |
| H-2 | A | Invention |
| H-3 | A | Invention |
| H-5 | A | Invention |
| H-6 | A | Invention |
| H-7 | A | Invention |
| H-8 | A | Invention |
| H-10 | A | Invention |
| H-11 | A | Invention |
| H-12 | A | Invention |
| H-13 | A | Invention |
| H-14 | A | Invention |
| H-15 | B | Invention |
| H-16 | B | Invention |
| H-17 | A | Invention |
| H-18 | A | Invention |
| H-20 | A | Invention |
| H-21 | A | Invention |
| H-22 | B | Invention |
| H-24 | B | Invention |
| H-25 | B | Invention |
| H-26 | A | Invention |
| H-27 | A | Invention |
| H-29 | A | Invention |
| H-30 | A | Invention |
| H-31 | A | Invention |
| H-33 | A | Invention |
| H-34 | A | Invention |
| H-35 | A | Invention |
| H-36 | A | Invention |
| H-37 | A | Invention |
| H-38 | B | Invention |

TABLE 7-continued

| Antireflection film sample No. | Scratch Resistance | Remarks |
|---|---|---|
| H-39 | D | Comparative |
| H-40 | D | Comparative |
| H-41 | D | Comparative |
| H-42 | C | Comparative |
| H-43 | D | Comparative |
| H-44 | C | Comparative |
| H-45 | C | Comparative |

It has proved that hard coat films H-1 through H-3, H-5 through H-8, H-10 through H-12, H-14 through H-18, H-20 through H-22, H-24 through H-27, H-29 through H-31, and H-33 through H-38, which were prepared from inventive optical films F-1 through F-3, F-5 through F-8, F-10 through F-12, F-14 through F-18, F-20 through F-22, F-24 through F-27, F-29 through F-31, and F-33 through F-38, exhibit excellent scratch resistance. In contrast, hard coat films H-39 through H-45, which were prepared from comparative optical films F-39 through F-45 in Example 1, exhibit poor scratch resistance.

Subsequently, polarizing plates were prepared in the same manner as in Example 2, employing the hard coat films above.

[Preparation of Liquid Crystal Display]

A liquid crystal panel to conduct a view angle measurement was prepared as follows, and performance as a liquid crystal display was evaluated.

Two polarizing plates provided in a liquid crystal display, a 32 type TV AQ-32AD5 manufactured by Sharp Co., Ltd. were peeled off, and the above-obtained polarizing plates were laminated on a glass surface on each side of the liquid crystal cell, respectively.

At this time, the lamination of the polarizing plates was carried out so that the surface on the hard coat layer side of the above hard coat films was on the side viewing the liquid crystal display and the absorption axis was in the direction same as that of the original polarizing plates. Thus, each liquid crystal display was prepared. Then, the displaying performance was evaluated.

The liquid crystal displays comprising the polarizing plates manufactured employing inventive hard coat films H-1 through H-3, H-5 through H-8, H-10 through H-12, H-14 through H-18, H-20 through H-22, H-24 through H-27, H-29 through H-31, and H-33 through H-38 exhibited high contrast and excellent display quality, as compared with those comprising the polarizing plates manufactured employing comparative hard coat films H-39 through H-45. Thus, it has been confirmed that the polarizing plate employing the cellulose ester optical film of the invention is excellent as a polarizing plate used for an image displaying device such as a liquid crystal display.

Example 4

Preparation of Polarizing Plate and Liquid Crystal Display

A polarizing plate and a liquid crystal display were prepared in the same manner as in Example 2, except that phase difference film F-4, F-9, F-13, F-19, F-23, F-28 or F-32 prepared in Example 1 was used instead of Konica Minolta TAC KC8UCR-4 (produced by Konica Minolta Opt Co., Ltd.) employed in Example 2 as a polarizing plate protective film on the back side of the polarizing film, and Konica Minolta TAC KC8UX (produced by Konica Minolta Opt Co., Ltd.) was employed as a polarizing plate protective film on the front side of the polarizing film.

The resulting samples were evaluated in the same manner as in Example 2. As a result, the polarizing plates and liquid crystal displays, which were prepared employing inventive cellulose ester optical films, exhibited displaying properties without unevenness of reflection color and with excellent contrast.

INDUSTRIAL APPLICABILITY

The present invention provides a cellulose ester optical film excellent in a slitting property, durability after saponification and layer strength, and a polarizing plate and crystal liquid display using the cellulose ester optical film. Further, the present invention provides a method of manufacturing a cellulose ester optical film which minimizes a manufacturing load, a facility load and an environmental load, each resulting from evaporation or recovery of solvents on film manufacture.

The invention claimed is:

1. A cellulose ester optical film containing cellulose ester, a polymer (a) below in an amount of 4.00 to 50 parts by weight per 100 parts by weight of cellulose ester and a compound (b) below in an amount of 0.6 to 2.6 parts by weight per 100 parts by weight of cellulose ester:
    (a) a polymer obtained by copolymerization of a first ethylenically unsaturated monomer selected from the group consisting of N-vinyl pyrrolidone, N-acryloyl morpholine or mixtures thereof with at least one second ethylenically unsaturated monomer selected from the group consisting of acrylic acid esters, methacrylic acid esters, alkyl vinyl esters, styrene and styrene derivatives, and a content ratio by weight in the polymer of the first ethylenically unsaturated monomer to the second ethylenically unsaturated monomer is from 10:90 to 80:20,
    (b) at least one compound selected from the group consisting of a compound represented by formula (2) below and a compound represented by formula (3) below, $$Q_1\text{-}Q_2\text{-}OH \qquad \text{Formula (2)}$$

wherein $Q_1$ represents a substituted or unsubstituted benzotriazole ring, or triazine ring, and
    $Q_2$ represents a substituted or unsubstituted a benzene ring or naphthalene ring,

    Formula (3)

wherein
    $Q_{11}$ and $Q_{12}$ independently represent a substituted or unsubstituted benzene ring.

2. The cellulose ester optical film of claim 1, wherein the weight average molecular weight of the polymer (a) is from 1000 to 70000.

3. The cellulose ester optical film of claim 1, wherein the cellulose ester optical film contains at least one kind of plasticizers.

4. The cellulose ester optical film of claim 1, wherein the cellulose ester satisfies the following relationship:

$$2.4 \leq A+B \leq 3.0 \qquad \text{Relationship (1)}$$

$$0 \leq A \leq 2.1 \qquad \text{Relationship (2)}$$

$$0 < B \leq 3.0 \qquad \text{Relationship (3)}$$

wherein A represents a degree of substitution of an acetyl group, and B represents the sum of a degree of substitution of an acyl group having a carbon atom number of from 3 to 5.

5. The cellulose ester optical film of claim 1, wherein the cellulose ester optical film contains at least one kind of fine particles.

6. A polarizing plate comprising the cellulose ester optical film of claim 1 and a polarizing film.

7. A liquid crystal display comprising the polarizing plate of claim 6 and a liquid crystal cell.

8. A method of manufacturing a cellulose ester optical film, the method comprising the steps of:
    melting a composition containing cellulose ester, a polymer (a) below in an amount of 4.00 to 50 parts by weight per 100 parts by weight of cellulose ester and a compound (b) below in an amount of 0.6 to 2.6 parts by weight per 100 parts by weight of cellulose ester; and
    extruding the melted composition to form a cellulose ester optical film,
    (a) a polymer obtained by copolymerization of a first ethylenically unsaturated monomer selected from the group consisting of N-vinyl pyrrolidone, N-acroyl morpholine or a mixture thereof with at least one second ethylenically unsaturated monomer selected from the group consisting of acrylic acid esters, methacrylic acid esters, alkyl vinyl esters, styrene and styrene derivatives, and a content ratio by weight in the polymer of the first ethylenically unsaturated monomer to the second ethylenically unsaturated monomer is from 10:90 to 80:20,
    (b) at least one compound selected from the group consisting of a compound represented by formula (2) below and a compound represented by formula (3) below, $$Q_1\text{-}Q_2\text{-}OH \qquad \text{Formula (2)}$$

wherein $Q_1$ represents a substituted or unsubstituted a benzotriazole ring, or triazine ring, and
    $Q_2$ represents a substituted or unsubstituted benzene ring or naphthalene ring,

    Formula (3)

wherein
    $Q_{11}$ and $Q_{12}$ independently represent substituted or unsubstituted benzene ring.

9. The method of manufacturing a cellulose ester optical film of claim 8, wherein the cellulose ester optical film contains at least one kind of plasticizers.

10. The method of manufacturing a cellulose ester optical film of claim 8, wherein the method comprises stretching the cellulose ester optical film formed after extrusion in one direction at a stretching magnification of 1.0 to 4.0 and in the direction perpendicular to the one direction at a stretching magnification of 1.01 to 4.0.

* * * * *